(12) United States Patent
Josephson et al.

(10) Patent No.: US 11,663,820 B2
(45) Date of Patent: *May 30, 2023

(54) INTERFACES, SYSTEMS AND APPARATUSES FOR CONSTRUCTING 3D AR ENVIRONMENT OVERLAYS, AND METHODS FOR MAKING AND USING SAME

(71) Applicant: Quantum Interface, LLC, Austin, TX (US)

(72) Inventors: Jonathan Josephson, Austin, TX (US); Robert W. Strozier, Houston, TX (US)

(73) Assignee: Quantum Interface LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,698

(22) Filed: Nov. 1, 2021

(65) Prior Publication Data
US 2022/0230432 A1    Jul. 21, 2022

Related U.S. Application Data

(63) Continuation of application No. 16/245,206, filed on Jan. 10, 2019, now Pat. No. 11,205,075.
(Continued)

(51) Int. Cl.
*G06V 20/20* (2022.01)
*G06T 19/00* (2011.01)
(Continued)

(52) U.S. Cl.
CPC .......... *G06V 20/20* (2022.01); *G06F 16/5866* (2019.01); *G06T 7/70* (2017.01);
(Continued)

(58) Field of Classification Search
None
See application file for complete search history.

(56) References Cited

U.S. PATENT DOCUMENTS

| 7,831,392 | B2 | 11/2010 | Josephson et al. |
| 7,861,188 | B2 | 12/2010 | Josephson et al. |

(Continued)

FOREIGN PATENT DOCUMENTS

| JP | 2010019643 A | 1/2010 |
| JP | 2012068854 A | 4/2012 |

(Continued)

OTHER PUBLICATIONS

Argelaguet et al., "A survey of 3D object selection techniques for virtual environments," Computers & Graphics 37.3 (2013): 121-136 (Year: 2013).*

(Continued)

*Primary Examiner* — Anh-Tuan V Nguyen
(74) *Attorney, Agent, or Firm* — Robert W. Strozier

(57) ABSTRACT

Systems, apparatuses, interfaces, and methods for implementing the systems, apparatuses, and interfaces include capturing an image, displaying the image on a display devise, scanning and identifying objects and/or attributes associated with the image and/or objects therein, generating a 3D AR environment within the display overlaid on the image, generating a ray pointer for improved interaction with the image and the generated 3D AR environment, where the environment includes virtual constructs corresponding to the image objects and/or attributes, and selecting, activating, animating, and/or manipulating the virtual constructs within the 3D AR environment.

23 Claims, 24 Drawing Sheets

Related U.S. Application Data

(60) Provisional application No. 62/615,544, filed on Jan. 10, 2018.

(51) Int. Cl.
*G06F 16/58* (2019.01)
*G06T 7/70* (2017.01)
*H04W 4/029* (2018.01)
*H04W 4/38* (2018.01)
*H04W 4/021* (2018.01)

(52) U.S. Cl.
CPC ........... *G06T 19/006* (2013.01); *H04W 4/021* (2013.01); *H04W 4/029* (2018.02); *H04W 4/38* (2018.02)

(56) References Cited

U.S. PATENT DOCUMENTS

| | | | |
|---|---|---|---|
| 8,788,966 | B2 | 7/2014 | Josephson et al. |
| 9,345,957 | B2 | 5/2016 | Geisner et al. |
| 9,703,388 | B2 | 7/2017 | Josephson et al. |
| 9,746,935 | B2 | 8/2017 | Josephson et al. |
| 9,971,492 | B2 | 5/2018 | Chandler et al. |
| 2002/0122072 | A1 | 9/2002 | Selker |
| 2008/0034331 | A1 | 2/2008 | Josephson et al. |
| 2010/0134425 | A1 | 6/2010 | Storrusten |
| 2010/0214218 | A1* | 8/2010 | Vaisanen ............... G06F 3/0488 345/173 |
| 2010/0333030 | A1 | 12/2010 | Johns |
| 2011/0043443 | A1 | 2/2011 | Kawano et al. |
| 2011/0055773 | A1 | 3/2011 | Agarawala et al. |
| 2011/0066981 | A1 | 3/2011 | Chmielewski et al. |
| 2011/0221974 | A1 | 9/2011 | Stern et al. |
| 2011/0289456 | A1 | 11/2011 | Reville et al. |
| 2011/0316888 | A1 | 12/2011 | Sachs et al. |
| 2012/0050157 | A1 | 3/2012 | Latta et al. |
| 2012/0216143 | A1 | 8/2012 | Shiplacoff et al. |
| 2012/0249310 | A1 | 10/2012 | Hotaling |
| 2012/0299849 | A1 | 11/2012 | Homma et al. |
| 2013/0104079 | A1 | 4/2013 | Yasui et al. |
| 2013/0135194 | A1 | 5/2013 | Josephson |
| 2013/0135195 | A1 | 5/2013 | Josephson et al. |
| 2014/0368842 | A1 | 12/2014 | Tawara et al. |
| 2015/0135132 | A1 | 5/2015 | Josephson et al. |
| 2015/0254903 | A1 | 9/2015 | Sumner et al. |
| 2015/0268744 | A1* | 9/2015 | Au ..................... G06F 3/04845 345/173 |
| 2016/0320860 | A1 | 11/2016 | Josephson et al. |
| 2016/0378294 | A1* | 12/2016 | Wright ............... G06F 3/04815 715/851 |
| 2017/0139556 | A1 | 5/2017 | Josephson et al. |
| 2017/0180336 | A1 | 6/2017 | Josephson et al. |
| 2017/0269705 | A1 | 9/2017 | Josephson et al. |
| 2018/0004283 | A1 | 1/2018 | Mathey-Owens et al. |

FOREIGN PATENT DOCUMENTS

| | | |
|---|---|---|
| JP | 2012108842 A | 6/2012 |
| WO | 2007128035 A1 | 11/2007 |
| WO | 2013049864 A1 | 4/2013 |
| WO | 2013095677 A1 | 6/2013 |

OTHER PUBLICATIONS

Mehmet Kesim and Yasin Ozarslan / Procedia—Social and Behavioral Sciences 47 ( 2012 ) 297-302.

* cited by examiner

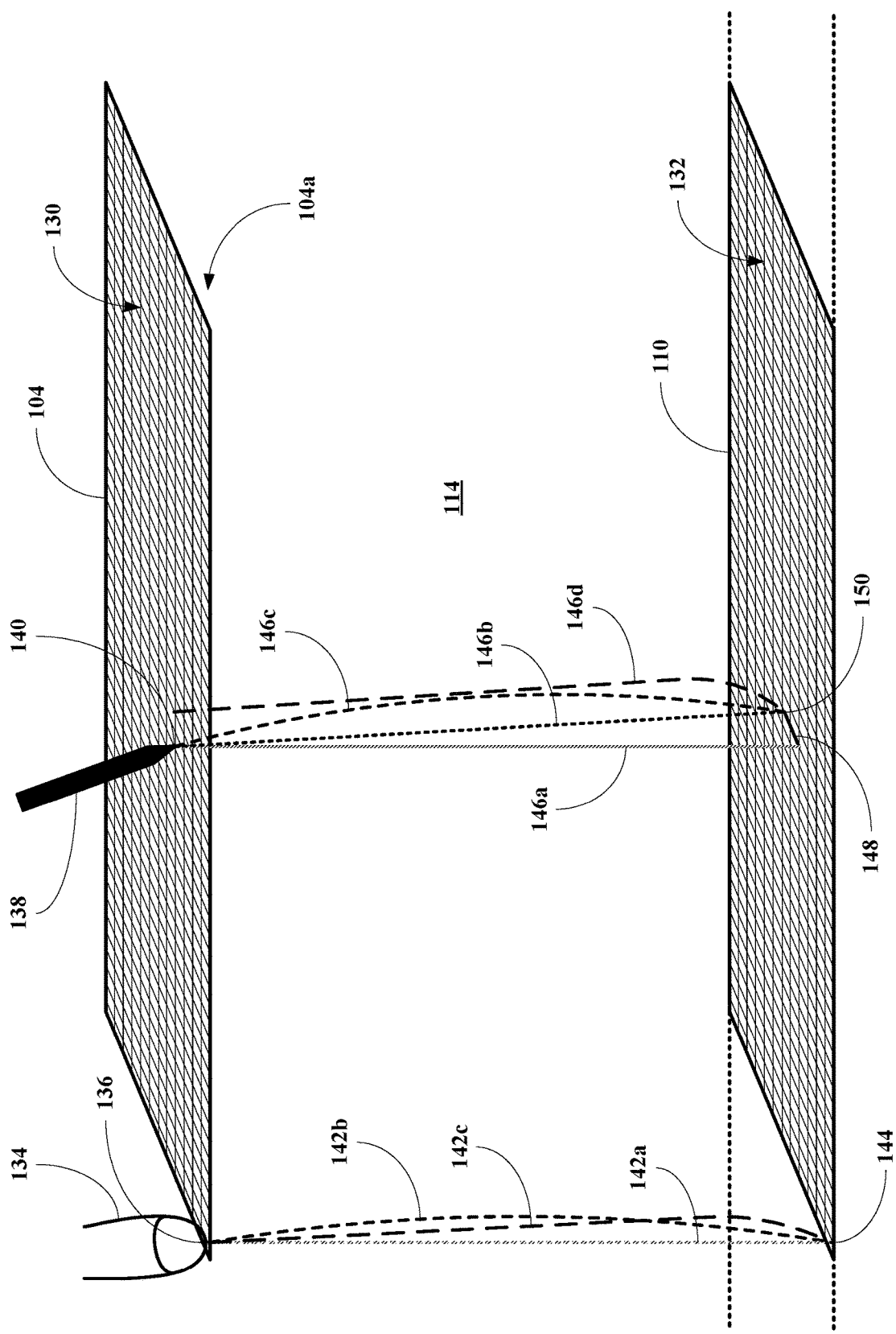

INTERFACES, SYSTEMS AND APPARATUSES FOR CONSTRUCTING 3D AR ENVIRONMENT OVERLAYS, AND METHODS FOR MAKING AND USING SAME

RELATED APPLICATIONS

This application is a continuation of U.S. patent application Ser. No. 16/245,206 filed 10 Jan. 2019, which claims the benefit of and provisional priority of U.S. Provisional Patent Application Ser. No. 62/615,544 filed 10 Jan. 2018.

U.S. patent application Ser. Nos.: (a) Ser. No. 14/504,391 filed 1 Oct. 2014; (b) Ser. No. 14/504,393 filed 1 Oct. 2014; (c) Ser. No. 15/210,832 filed 14 Jul. 2016; (d) Ser. No. 15/255,107 filed 1 Sep. 2016; (e) Ser. No. 15/615,342 filed 6 Jun. 2017; (f) Ser. No. 15/781,050 filed 1 Jun. 2018; (g) Ser. No. 15/781,057 filed 1 Jun. 2018; (h) Ser. No. 15/781,061 filed 1 Jun. 2018; and (i) Ser. No. 16/148,971 filed 1 Oct. 2018 are incorporated by reference operation of the closing paragraph. U.S. Pat. Nos.: (a) U.S. Pat. No. 9,971,492 issued 18 May 2018; (b) U.S. Pat. No. 9,746,935 issued 29 Aug. 2017; (c) U.S. Pat. No. 9,703,388 issued 77 Jul. 2017; (d) U.S. Pat. No. 8,788,966 issued 22 Jul. 2014, (e) U.S. Pat. No. 7,861,188 issued 28 Dec. 2010; and (f) U.S. Pat. No. 7,831,932 issued 9 Nov. 2010. All incorporated by reference per closing paragraph are incorporated by reference operation of the closing paragraph.

BACKGROUND OF THE INVENTION

1. Field of the Invention

Embodiments of this invention relate to systems, interfaces, apparatuses including the interfaces, and methods for implementing the systems, apparatuses, and interfaces, where the systems and interfaces are selection attractive.

More particularly, embodiments of this invention relate to systems, interfaces, apparatuses including the interfaces, and methods for implementing the systems and interfaces, where selection attractive or manipulation systems and interfaces use movement of a selection object(s) to discriminate between displayed objects and attract a target object, objects or groups of objects, or fields of objects or object attributes toward, away or at angles to or from the selection object, where the direction and speed of motion controls discrimination and attraction. The selection object may be a group of objects or a field created by any kind of waveform as well.

2. Description of the Related Art

Selection interfaces are ubiquitous throughout computer software and user interface software. Most of these interfaces require motion and selection operations controlled by hard selection protocols such as tapping, clicking, double tapping, double clicking, keys strokes, gestures, or other so-called hard selection protocols.

In previous applications, the inventor and inventors have described motion based systems and interfaces that utilize motion and changes in motion direction to invoke command functions such as scrolling and simultaneously selection and activation commands. See for example U.S. Pat. Nos. 7,831,932 and 7,861,188, incorporated herein by operation of the closing paragraph of the specification.

More recently, the inventor has described motion based systems and interfaces that utilize velocity and/or acceleration as well as motion direction to invoke command functions such as scrolling and simultaneously selection and activation commands. See for example U.S. Provisional Patent Application Ser. No. 61/885,453 filed Oct. 1, 2013 (1 Oct. 2013).

While there are many systems and interfaces for permitting users to select and activate a target object(s) from lists and/or sublists of target object(s) using movement attributes, where the movement attributes act to discriminate and attract or manipulate or influence the target object(s) or attributes of target object(s). Multiple layers of objects may have attributes changes, where the attribute of one layer may be different or to a different degree than other layers, but they are all affected and relational in some way.

SUMMARY OF THE INVENTION

General Aspects Systems, Apparatuses, Interfaces, and Methods

Embodiments of this invention relate to systems, apparatuses, interfaces, and methods of this invention for implementing the systems, apparatuses, and/or interfaces are based on attractive or manipulative selection invoked solely and partially by motion sensed by motion sensors associated with the systems, apparatuses, and/or interfaces. The manipulative selection actions may be attractive, repulsive, or a relative affect due to other objects being moved in an attractive manner, a repulsive manner, or a combination thereof, or based upon an angle or proximity to a desired object or objects. The systems and apparatuses account for the manipulative effects based upon proximity, direction, speed and/or acceleration of the selection object toward a desired object or set of objects. The objects may comprise real or virtual objects, realworld devices, software, software components, attributes, active areas of sensors, software, or fields of emf or other waveforms and may be remotely controlled. The motion of the selection object or objects may be a machine, an animal or body parts or parts, a human or body part or parts, or a real-world object, field, or waveform under the control of a human, machine, an animal, or software program or system.

Apparatuses and Systems

Embodiments of this invention provide apparatuses or systems for selecting and activating virtual and/or real objects and/or attributes associated therewith. The apparatuses include at least one user interface. The interfaces include at least one (one or a plurality of) user feedback unit, at least one motion sensors having active sensing zones or active view fields, and at least one processing unit in communication with the user feedback units, and the motion sensors. The interfaces may also include at least one power supply, at least one battery backup, and communications software and hardware for remote control and/or remote monitoring. The motion sensors detect motion or movement within their active sensing zones, generate sensor output signals, and send or forward the output signals to the processing units. The processing units convert the output signals into command and control outputs. Of course, these components, user interfaces, user feedback units, motion sensors, and processing units, may all be combined in whole or part. The apparatus may also include at least one object, real or virtual, under the control of the apparatus via the processing units. The command and control outputs may include start commands, which activate the user interface, the user feedback units and may generate a user discernible selection or cursor object, by user discernible the inventor means that the selection or cursor object is capable of being sensed by one of the five senses of an animal or a human, e.g., visual, audio, audiovisual, tactile or touch, hot or cold, smell or odor, taste or flavor, or any combination thereof. However, the selection or cursor object may also be invisible and/or non-discernible—just a virtual element used internally in applying the sensed motion or movement.

Once activated, the user interfaces via the user feedback units may also display at least one selectable object. Alternatively, once activated, movement of the selection object will cause a selectable object or a group of selectable objects or a pre-selected selectable object or a group of pre-selected selectable objects to move toward the selection object, or to move at an angle to the selection object, or away from the selection object for the purpose of eventually choosing a particular selectable object or a particular group of selectable objects or selectable attributes associated with particular object(s) or controllable attributes associate with particular object(s). The pre-selected selectable object or the group of pre-selected selectable objects are the display object(s) that are most closely aligned with a direction of motion of the selection object. For examples, if the sensed initial motion or movement was in the +y direction, then the user interface would cause the user feedback unit(s) to evidence those selectable object that are associated with the +y direction and attract those in the specific direction toward the selection object.

Another aspect of the interfaces of this invention is that the faster the selection object moves toward the pre-selected selectable object or the group of pre-selected selectable objects, the faster the pre-selected selectable object or the group of preselected selectable objects move toward the selection object.

Another aspect of the interfaces of this invention is that as the pre-selected selectable object or the group of pre-selected selectable objects move toward the selection object, the pre-selected selectable object or the group of pre-selected selectable objects may also increase in size, change color, become highlighted, have other effects change, or mixtures or combinations thereof.

Another aspect of the interfaces of this invention is that each object that has at least one adjustable attribute includes adjustable active areas associated with each adjustable attribute associated with the objects that become displayed as the selectable object is augmented by the motion. Moreover, as the selectable object becomes more certain of selection, the adjustable active areas may increase in size as the selection object moves toward the selectable object or "gravity" pulls the selectable object toward the selection object. The active area permits selection to be made prior to any actual contact with the object, and allows selection to be made merely by moving in the direction of the desired object. The active area may be thought of as a halo effect surrounding the object activated by motion toward the object.

Another aspect of the interfaces of this invention is that as motion continues, the motion will start to discriminate between members of a group of pre-selected objects until the motion results in the selection of a single displayed (discernible) object or a group of displayed (discernible) objects. As the motion continues, the display will begin to discriminate between objects that are aligned with the motion and objects that are not, emphasizing the selectable objects aligned with the motion (i.e., objects in the direction of motion) and de-emphasizing the non-selectable objects not aligned with the motion (i.e., objects away from the direction of motion), where the emphasis may be any change in object(s) properties, changes in object(s) positions, or a combination thereof and the de-emphasis may be any change in the object(s) properties, changes in object(s) positions, or combination thereof.

Another aspect of the interfaces of this invention is the display, movement, and positioning of sublist members or attributes associated with object(s) may be simultaneous and synchronous or asynchronous with the movement and display of the selectable object(s) or display object(s) being influenced by the motion of the selection object(s). Once the selection object and a selectable display object touch or the selection object and a selectable display object active area touch or the selection object and a selectable display object is predicted with a threshold degree of certainty, a triggering threshold event (this may be the distance of proximity or probability without ever touching), the selectable object(s) is selected and non-selected display object are removed from the display or fade away or become less prominent or change in such a way that they are recognizable as the non-selected object(s) and the selected object is centered within the display or at a predetermined position, is adjusted to a desired amount if an adjustable attribute, or is executed if the selected object(s) is an attribute or selection command, or any combination of these. If the object is an executable object such as taking a photo, turning on a device, etc., then the execution is simultaneous or acts in a predetermined way with selection. If the object has a submenu, sublist or list of attributes associated with the selected object, then the submenu members, sublist members or attributes may become displayed on the screen is a spaced apart or differentiated format either after selection or during the selection process, with their distribution becoming more defined as the selection becomes more and more certain. The same procedure used to select the selected object is then used to select a member of the submenu, sublist or attribute list. This same effect may occur with a combination of executable, submenu, sublist, and listing attributes. Thus, the interfaces have a gravity or attractive like action on displayed selectable objects. As the selection object moves, it attracts an object or objects in alignment with the direction of the selection object's motion pulling those object toward it, and may simultaneously repel other objects not aligned with the selection object's motion, causing them to move away or be identified as non-selected objects. As motion continues or a velocity or acceleration of the motion increase, the pull increases on the object(s) most aligned with the direction of motion, further accelerating the object toward the selection object until they touch, merge, or cause a triggering selection event, or a combination thereof. If two objects are along the same line or zone, and the closer of the two is attracted or selected as motion occurs toward the user, and motion continues in line, the first object may be treated like a non-wanted object and the second desired object is selected. If motion is stopped or slowed to a predetermined threshold amount at the first object, it is considered selected. If motion continues at the first object, it is considered not selected. The touch, merge or triggering event causes the processing unit to select and activate the object, active an object sublist or menu, or active an attribute for control, or a combination thereof.

Methods

Embodiments of this invention provide methods for implementing the selection protocol using the user interfaces of this invention. The methods include selecting and activating selectable objects, selecting and activating members of a selectable list of virtual and/or real objects, selecting and activating selectable attributes associated with the objects, selecting and activating and adjusting selectable attributes, or combinations thereof, where the interfaces include at least one display or other user feedback unit, at least one motion sensor, and at least one processing unit in communication with the user feedback units and the motion sensors. The interfaces also may include power supplies, battery backups, and communications software and hardware for remote control and/or remote monitoring. The methods include sensing motion or movement sensed by the motion sensor(s), generating an output signal and sending the output signal to the processing unit. The methods also include converting the output signal into a command output via the processing unit. The command output may be a start command, which activates the feedback unit or activates the feedback unit and generates at least one selection or cursor object or activates the feedback unit and generates at least one selectable object or activates the feedback unit and generates at least one selection or cursor object and at least one selectable object. The selection object may be discernible or not (displayed or not). The motion may be generated by an animal or body part or parts, a human or body part or parts, a machine, or a real-world object under control of an animal, a human, or a robot or robotic system, especially when the motion being sensed is within a 3D active sensing volume or zone. Once activated, the methods monitor sensed motion or movement within the active zone(s) of the motion sensor(s), which is used to move the selection object on or within the user feedback unit in accord with the motion properties (direction, velocity, acceleration, and changes of one or more of these properties) toward a selectable object or a group of selectable objects or a pre-selected object or a group of pre-selected objects. At the same time, the methods either move the non-selected objects away from the selection object(s), cause the non-selected object to fade, disappear or other change other properties of the non-selected objects, or combinations thereof. The pre-selected object or the group of pre-selected objects are the selectable object(s) that are most closely aligned with the direction of motion of the selection object.

Another aspect of the methods of this invention is that movement towards an executable area, such as a close/expand/maximize/minimize function area(s) or object(s) of a software window in an upper right corner may cause an executable function(s) to occur, such as causing the object(s) to expand or move apart so as to provide more space between them and to make it easier to select each individual object or a group of objects.

Another aspect of the methods of this invention include interfaces is that object selection or menu selection may be grouped together such that as movement is made towards a group of objects, the group of objects simultaneous rearrange themselves so as to make individual object selection or menu selection easier, including moving arcuately or to corners of a designated area so as to make discrimination of the desired selection easier.

Another aspect of the interface is that proximity to the selection object may cause the selectable objects most aligned with the properties of the sensed motion to expand, separate, or otherwise move in such a way so as to make object discrimination easier, which in turn may cause associated subobjects or submenus to be able to be selected by moving the subobjects or submenus towards the selection object. Additionally, they could be selected or activated by moving into an active area designated by distance, area or volume from or around such objects, thereby selecting the object functions, menus or subobjects or submenus. The movement or attribute change of the subobjects or submenus may occur synchronously or asynchronously with the movement of the primary object(s).

Another aspect of the interfaces is that the faster the selection object moves toward the pre-selected object or the group of preselected objects, the faster the pre-selected object or the group of preselected objects move toward the selection object(s), and/or the faster the unselected objects may move away from the selection object(s).

Another aspect of the interfaces is that as the pre-selected (meaning the objects that are most closely aligned with the properties of the motion) object or the group of pre-selected objects move toward the selection object, the pre-selected object or the group of preselected objects may either increase in size, change color, become highlighted, change some other effect, change some characteristic or attribute, or a combination thereof. These same, similar or opposite changes may occur to the unselected objects or unselected group of objects. Another aspect is that, based upon a user's previous choices, habits, motions or predicted motions, the attributes of the objects may be changes such that they move faster, increase in size or zone, or change in such a way that the object with the highest percentage of user intent is the easiest and most likely to be selected.

Another aspect of the interfaces is that as motion continues, the motion will start to discriminate between members of the group of pre-selected object until the motion results in the selection of a single selectable or displayed object or a single group of selectable objects. Once the selection object and a selectable object active area touch or the selection object and a selectable display object is predicted with a threshold degree of certainty, a triggering threshold event (this may be the distance of proximity or probability without ever touching), the selectable object is selected and non-selected object are removed from the display or fade away or become less prominent or change in such a way that they are recognizable as non-selected object(s). Once selected, the selected object may become centered within the display or at a predetermined position within the display. If the selected object has a single adjustable attribute, then motion may adjust the attribute a desired or pre-defined amount. If the selected object is executable, then the selected object is invoked. If the selected object is an attribute or selection command, then the attribute may be adjusted by additional motion or the selection may invoke a command function. Of course, the systems may do all or any combination of these processes. If the object is an executable object such as taking a photo, turning on a device, etc., then the execution is simultaneous or acts in a predetermined way with the selection. If the object is a submenu, sublist or list of attributes associated with the selected object, then the submenu members, sublist members or attributes are displayed on the screen in a spaced apart format or appear as the selection becomes more certain and then persist once selection is certain or confirmed. The same procedure used to select the selected object is then used to select a member of the submenu, a member of the sublist or a particular attribute. Thus, the interfaces have a gravity like action on displayed selectable objects that move them toward the selection objection as certainty increases. As the selection object moves, it attracts an object or objects in alignment or relation with the properties of the sensed motions (direction, speed, acceleration, or changes in any of these primary properties) of the selection object pulling the object(s) meeting this criterion toward the selection object. Simultaneously, synchronously or asynchronously, submenus or subobjects may become visible if they were not so to begin with and may also move or change in relation to the movement or changes of the selected objects. Simultaneously, synchronously, or asynchronously, the non-selected objects may move or change away from the selection object(s). As motion continues, the pull increases on the object most aligned with the properties (e.g., direction) of motion or movement, further moving or accelerating the object toward the selection object until they touch, merge, or reach a triggering event—close enough to touch an active area or to predicted the selection to a threshold certainty. The touch, merge, or triggering event causes the processing unit to select and activate the object. The object(s) may also be defined as an area in between objects, giving a gate-like effect to provide selection of sub-menu or sub-objects that are aligned with the motion of the selection object and are located between, behind, or at the same angle but a different distance than this gate. Furthermore, a back object or area may be incorporated to undo or reverse effects or changes or motions that have occurred to objects, whether selectable or not.

BRIEF DESCRIPTION OF THE DRAWINGS

The invention can be better understood with reference to the following detailed description together with the appended illustrative drawings in which like elements are numbered the same.

AR Environments

Blob Data

Figure 1A:
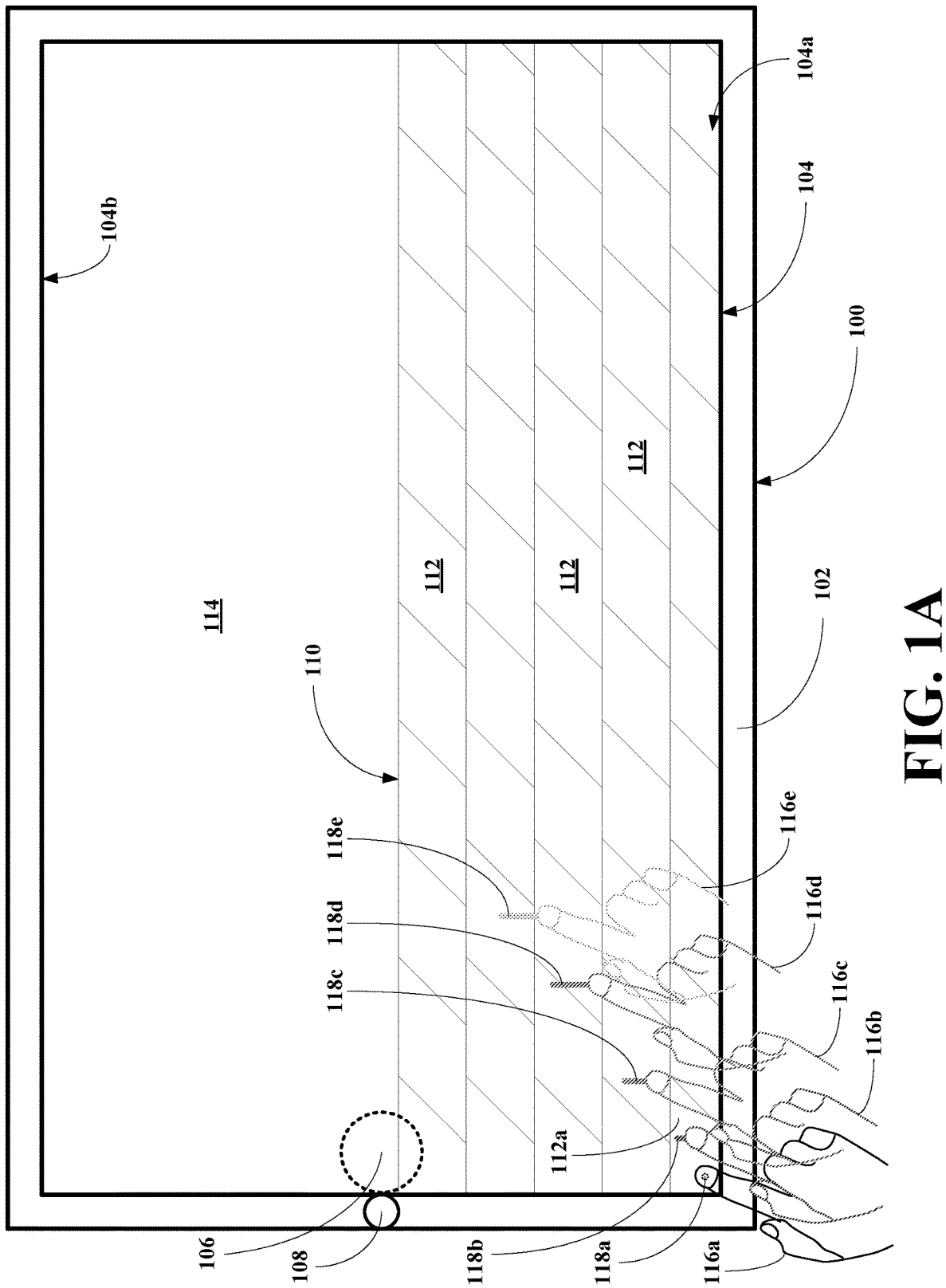
FIGS. 1A-N depict an embodiment of systems, apparatuses, and/or interfaces of this disclosure using a rear facing, front facing, or multi-angle camera to image an object/scene and displaying the image and generating a 3D interactive environment overlaid on the image for selecting, activating, animating, and/or manipulating objects and/or their associated attributes derived and constructed from the image. This applies to video environments, and triggered attributes with designated frames and frame rates.

FIGS. 2A-J depict an embodiment of systems, apparatuses, and/or interfaces of this disclosure using blob data to control a real and/or virtual object and/or objects.

FIGS. 3A-J depict another embodiment of systems, apparatuses, and/or interfaces of this disclosure using blob data to control a real and/or virtual object and/or objects.

DEFINITIONS USED IN THE INVENTION

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within +20% of the stated value. In other embodiments, the value is within +15% of the stated value. In other embodiments, the value is within +10% of the stated value. In other embodiments, the value is within +5% of the stated value. In other embodiments, the value is within +2.5% of the stated value. In other embodiments, the value is within +1% of the stated value.

The term "substantially" means that a value of a given quantity is within ±10% of the stated value. In other embodiments, the value is within +5% of the stated value. In other embodiments, the value is within +2.5% of the stated value. In other embodiments, the value is within +1% of the stated value.

The term "motion" and "movement" are often used interchangeably and mean motion or movement that is capable of being detected by a motion sensor within an active zone of the sensor. Thus, if the sensor is a forward viewing sensor and is capable of sensing motion within a forward extending conical active zone, then movement of anything within that active zone that meets certain threshold detection criteria, will result in a motion sensor output, where the output may include at least direction, velocity, and/or acceleration. Of course, the sensors do not need to have threshold detection criteria, but may simply generate output anytime motion or any kind is detected. The processing units can then determine whether the motion is an actionable motion or movement and a non-actionable motion or movement.

The term "motion sensor" or "motion sensing component" means any sensor or component capable of sensing motion of any kind by anything with an active zone—area or volume, regardless of whether the sensor's or component's primary function is motion sensing.

The term "real object" or "realworld object" means any realworld device or article that is capable of being controlled by a processing unit. Real objects include objects or articles that have realworld presence including physical, mechanical, electro-mechanical, magnetic, electro-magnetic, electrical, or electronic devices or any other realworld device that can be controlled by a processing unit.

The term "virtual object" means any construct generated in a virtual world or by a computer and displayed by a display device and that are capable of being controlled by a processing unit. Virtual objects include objects that have no realworld presence, but are still controllable by a processing unit. These objects include elements within a software system, product or program such as icons, list elements, menu elements, generated graphic objects, 2D and 3D graphic images or objects, generated realworld objects such as generated people, generated animals, generated devices, generated plants, generated landscapes and landscape objects, generate seascapes and seascape objects, generated skyscapes or skyscape objects, or any other generated realworld or imaginary objects.

The term "entity" means a human or an animal or robot or robotic system (autonomous or non-autonomous.

The term "entity object" means a human or a part of a human (fingers, hands, toes, feet, arms, legs, eyes, head, body, etc.), an animal or a port of an animal (fingers, hands, toes, feet, arms, legs, eyes, head, body, etc.), or a realworld object under the control of a human or an animal or a robot and include such articles as pointers, sticks, or any other realworld object that can be directly or indirectly controlled by a human or animal or a robot.

DETAILED DESCRIPTION OF THE INVENTION GENERAL MOTION BASED PROCESSING

The inventor has found that selection attractive or manipulative apparatuses, systems, and/or interfaces may be constructed that use motion or movement within an active sensor zone of a motion sensor translated to motion or movement of a selection object on or within a user feedback device: 1) to discriminate between selectable objects based on the motion, 2) to attract target selectable objects towards the selection object based on properties of the sensed motion including direction, speed, acceleration, or changes thereof, and 3) to select and simultaneously activate a particular or target selectable object or a specific group of selectable objects or controllable area or an attribute or attributes upon "contact" of the selection object with the target selectable object(s), where contact means that: 1) the selection object actually touches or moves inside the target selectable object, 2) touches or moves inside an active zone (area or volume) surrounding the target selectable object, 3) the selection object and the target selectable object merge, 4) a triggering event occurs based on a close approach to the target selectable object or its associated active zone or 5) a triggering event based on a predicted selection meeting a threshold certainty. The touch, merge, or triggering event causes the processing unit to select and activate the object, select and active object attribute lists, select, activate and adjustments of an adjustable attribute. The objects may represent real and/or virtual objects including: 1) realworld devices under the control of the apparatuses, systems, or interfaces, 2) realworld device attributes and realworld device controllable attributes, 3) software including software products, software systems, software components, software objects, software attributes, active areas of sensors, 4) generated emf fields, Rf fields, microwave fields, or other generated fields, 5) electromagnetic waveforms, sonic waveforms, ultrasonic waveforms, and/or 6) mixture and combinations thereof. The apparatuses, systems and interfaces of this invention may also include remote control units in wired or wireless communication therewith. The inventor has also found that a velocity (speed and direction) of motion or movement can be used by the apparatuses, systems, or interfaces to pull or attract one or a group of selectable objects toward a selection object and increasing speed may be used to increase a rate of the attraction of the objects, while decreasing motion speed may be used to slower a rate of attraction of the objects. The inventors have also found that as the attracted object move toward the selection object, they may be augmented in some way such as changed size, changed color, changed shape, changed line thickness of the form of the object, highlighted, changed to blinking, or combinations thereof. Simultaneously, synchronously or asynchronously, submenus or subobjects may also move or change in relation to the movements or changes of the selected objects. Simultaneously, synchronously or asynchronously, the non-selected objects may move away from the selection object (s). It should be noted that whenever a word object is used, it also includes the meaning of objects, and these objects may be simultaneously performing separate, simultaneous, and/or combined command functions or used by the processing units to issue combinational functions.

in certain embodiments, as the selection object moves toward a target object, the target object will get bigger as it moves toward the selection object. It is important to conceptualize the effect we are looking for. The effect may be analogized to the effects of gravity on objects in space. Two objects in space are attracted to each other by gravity proportional to the product of their masses and inversely proportional to the square of the distance between the objects. As the objects move toward each other, the gravitational force increases pulling them toward each other faster and faster. The rate of attraction increases as the distance decreases, and they become larger as they get closer. Contrarily, if the objects are close and one is moved away, the gravitational force decreases and the objects get smaller. In the present invention, motion of the selection object away from a selectable object may act as a rest, returning the display back to the original selection screen or back to the last selection screen much like a "back" or "undo" event. Thus, if the user feedback unit (e.g., display) is one level down from the top display, then movement away from any selectable object, would restore the display back to the main level. If the display was at some sublevel, then movement away from selectable objects in this sublevel would move up a sublevel. Thus, motion away from selectable objects acts to drill up, while motion toward selectable objects that have sublevels results in a drill down operation. Of course, if the selectable object is directly activatable, then motion toward it selects and activates it. Thus, if the object is an executable routine such as taking a picture, then contact with the selection object, contact with its active area, or triggered by a predictive threshold certainty selection selects and simultaneously activates the object. Once the interface is activated, the selection object and a default menu of items may be activated on or within the user feedback unit. If the direction of motion towards the selectable object or proximity to the active area around the selectable object is such that the probability of selection is increased, the default menu of items may appear or move into a selectable position, or take the place of the initial object before the object is actually selected such that by moving into the active area or by moving in a direction such that a commit to the object occurs, and simultaneously causes the subobjects or submenus to move into a position ready to be selected by just moving in their direction to cause selection or activation or both, or by moving in their direction until reaching an active area in proximity to the objects such that selection, activation or a combination of the two occurs. The selection object and the selectable objects (menu objects) are each assigned a mass equivalent or gravitational value of 1. The difference between what happens as the selection object moves in the display area towards a selectable object in the present interface, as opposed to real life, is that the selectable objects only feel the gravitation effect from the selection object and not from the other selectable objects. Thus, in the present invention, the selectable object is an attractor, while the selectable objects are non-interactive, or possibly even repulsive to each other. So as the selection object is moved in response to motion by a user within the motion sensors active zone—such as motion of a finger in the active zone—the processing unit maps the motion and generates corresponding movement or motion of the selection object towards selectable objects in the general direction of the motion. The processing unit then determines the projected direction of motion and based on the projected direction of motion, allows the gravitational field or attractive force of the selection object to be felt by the predicted selectable object or objects that are most closely aligned with the direction of motion. These objects may also include submenus or subobjects that move in relation to the movement of the selected object(s). This effect would be much like a field moving and expanding or fields interacting with fields, where the objects inside the field(s) would spread apart and move such that unique angles from the selection object become present so movement towards a selectable object or group of objects can be discerned from movement towards a different object or group of objects, or continued motion in the direction of the second or more of objects in a line would cause the objects to not be selected that had been touched or had close proximity, but rather the selection would be made when the motion stops, or the last object in the direction of motion is reached, and it would be selected. The processing unit causes the display to move those object toward the selectable object. The manner in which the selectable object moves may be to move at a constant velocity towards a selection object or to accelerate toward the selection object with the magnitude of the acceleration increasing as the movement focuses in on the selectable object. The distance moved by the person and the speed or acceleration may further compound the rate of attraction or movement of the selectable object towards the selection object. In certain situations, a negative attractive force or gravitational effect may be used when it is more desired that the selected objects move away from the user. Such motion of the objects would be opposite of that described above as attractive. As motion continues, the processing unit is able to better discriminate between competing selectable objects and the one or ones more closely aligned are pulled closer and separated, while others recede back to their original positions or are removed or fade. If the motion is directly toward a particular selectable object with a certainty above a threshold value, which has a certainty of greater than 50%, then the selection and selectable objects merge and the selectable object is simultaneously selected and activated. Alternatively, the selectable object may be selected prior to merging with the selection object if the direction, speed and/or acceleration of the selection object is such that the probability of the selectable object is enough to cause selection, or if the movement is such that proximity to the activation area surrounding the selectable object is such that the threshold for selection, activation or both occurs. Motion continues until the processing unit is able to determine that a selectable object has a selection threshold of greater than 50%, meaning that it more likely than not the correct target object has been selected. In certain embodiments, the selection threshold will be at least 60%. In other embodiments, the selection threshold will be at least 70%. In other embodiments, the selection threshold will be at least 80%. In yet other embodiments, the selection threshold will be at least 90%.

in certain embodiments, the selection object will actually appear on the display screen, while in other embodiments, the selection object will exist only virtually in the processor software. For example, for motion sensors that require physical contact for activation such as touch screens, the selection object may be displayed and/or virtual, with motion on the screen used to determine which selectable objects from a default collection of selectable objects will be moved toward a perceived or predefined location of a virtual section object or toward the selection object in the case of a displayed selection object, while a virtual object simply exists in software such as at a center of the display or a default position to which selectable object are attracted, when the motion aligns with their locations on the default selection. In the case of motion sensors that have active zones such as cameras, IR sensors, sonic sensors, or other sensors capable of detecting motion within an active zone and creating an output representing that motion to a processing unit that is capable of determining direction, speed and/or acceleration properties of the sensed or detected motion, the selection object is generally virtual and motion of one or more body parts of a user is used to attract a selectable object or a group of selectable objects to the location of the selection object and predictive software is used to narrow the group of selectable objects and zero in on a particular selectable object, objects, objects and attributes, and/or attributes. In certain embodiments, the interface is activated from a sleep condition by movement of a user or user body part in to the active zone of the motion sensor or sensors associated with the interface. Once activated, the feedback unit such as a display associated with the interface displays or evidences in a user discernible manner a default set of selectable objects or a top level set of selectable objects. The selectable objects may be clustered in related groups of similar objects or evenly distributed about a centroid of attraction if no selection object is generated on the display or in or on another type of feedback unit. If one motion sensor is sensitive to eye motion, then motion of the eyes will be used to attract and discriminate between potential target objects on the feedback unit such as a display screen. If the interface is an eye only interface, then eye motion is used to attract and discriminate selectable objects to the centroid, with selection and activation occurring when a selection threshold is exceeded—greater than 50% confidence that one selectable object is more closely aligned with the direction of motion than all other objects. The speed and/or acceleration of the motion along with the direction are further used to enhance discrimination by pulling potential target objects toward the centroid quicker and increasing their size and/or increasing their relative separation. Proximity to the selectable object may also be used to confirm the selection. Alternatively, if the interface is an eye and other body part interface, then eye motion will act as the primary motion driver, with motion of the other body part acting as a confirmation of eye movement selections. Thus, if eye motion has narrowed the selectable objects to a group, motion of the other body part may be used by the processing unit to further discriminate and/or select/activate a particular object or if a particular object meets the threshold and is merging with the centroid, then motion of the object body part may be used to confirm or reject the selection regardless of the threshold confidence. In other embodiments, the motion sensor and processing unit may have a set of predetermined actions that are invoked by a given structure of a body part or a given combined motion of two or more body parts. For example, upon activation, if the motion sensor is capable of analyzing images, a hand holding up different number of figures from zero, a fist, to five, an open hand may cause the processing unit to display different base menus. For example, a fist may cause the processing unit to display the top level menu, while a single finger may cause the processing unit to display a particular submenu. Once a particular set of selectable objects is displayed, then motion attracts the target object, which is simultaneously selected and activated. In other embodiments, confirmation may include a noised generated by the uses such as a word, a vocal noise, a predefined vocal noise, a clap, a snap, or other audio controlled sound generated by the user; in other embodiments, confirmation may be visual, audio or haptic effects or a combination of such effects.

Embodiments of this invention provide methods and systems implementing the methods comprising the steps of sensing circular movement via a motion sensor, where the circular movement is sufficient to activate a scroll wheel, scrolling through a list associated with the scroll wheel, where movement close to the center causes a faster scroll, while movement further from the center causes a slower scroll and simultaneously faster circular movement causes a faster scroll while slower circular movement causes slower scroll. When the user stops the circular motion, even for a very brief time, the list becomes static so that the user may move to a particular object, hold over a particular object, or change motion direction at or near a particular object. The whole wheel or a partial amount of the wheel may be displayed, or just and arc may be displayed where scrolling moves up and down the arc. These actions cause the processing unit to select the particular object, to simultaneously select and activate the particular object, or to simultaneously select, activate, and control an attribute of the object. By beginning the circular motion again, anywhere on the screen, scrolling recommences immediately. Of course, scrolling could be through a list of values, or actually be controlling values as well.

Embodiments of the present invention also provide methods and systems implementing the methods including the steps of displaying an arcuate menu layouts of selectable objects on a display field, sensing movement toward an object pulling the object toward the center based on a direction, a speed and/or an acceleration of the movement, as the selected object moves toward the center, displaying subobjects appear distributed in an arcuate spaced apart configuration about the selected object. The apparatus, system and methods can repeat the sensing and displaying operations.

Embodiments of this invention relate to methods and systems for implementing the methods comprising the steps of predicting an object's selection based on the properties of the sensed movement, where the properties include direction, speed, acceleration, changes thereof, or combinations thereof. For example, faster speed may increase predictability, while slower speed may decrease predictability or vis a versa. Alternatively, moving averages may be used to extrapolate the desired object desired. Along with this is the "gravitational", "electric" and/or "magnetic" attractive or repulsive effects utilized by the methods and systems, whereby the selectable objects move towards the user or selection object and accelerates towards the user or selection object as the user or selection object and selectable objects come closer together. This may also occur by the user beginning motion towards a particular selectable object, the particular selectable object begins to accelerate towards the user or the selection object, and the user and the selection object stops moving, but the particular selectable object continues to accelerate towards the user or selection object. In the certain embodiments, the opposite effect occurs as the user or selection objects moves away—starting close to each other, the particular selectable object moves away quickly, but slows down its rate of repulsion as distance is increased, making a very smooth look. In different uses, the particular selectable object might accelerate away or return immediately to it's original or predetermined position. In any of these circumstances, a dynamic interaction is occurring between the user or selection object and the particular selectable object(s), where selecting and controlling, and deselecting and controlling can occur, including selecting and controlling or deselecting and controlling associated submenus or subobjects and/or associated attributes, adjustable or invocable.

Embodiments of this invention relate to methods and systems for implementing the methods comprising the steps of detecting at least one bio-kinetic characteristic of a user such as a fingerprint, fingerprints, a palm print, retinal print, size, shape, and texture of fingers, palm, eye(s), hand(s), face, etc. or at least one EMF, acoustic, thermal or optical characteristic detectable by sonic sensors, thermal sensors, optical sensors, capacitive sensors, resistive sensors, or other sensor capable of detecting EMF fields or other characteristics, or combinations thereof emanating from a user, including specific movements and measurements of movements of body parts such as fingers or eyes that provide unique markers for each individual, determining an identity of the user from the bio-kinetic characteristics, and sensing movement as set forth herein. In this way, the existing sensor for motion may also recognize the user uniquely. This recognition may be further enhanced by using two or more body parts or bio-kinetic characteristics (e.g., two fingers), and even further by body parts performing a particular task such as being squeezed together, when the user enters in a sensor field. Other bio-kinetic and/or biometric characteristics may also be used for unique user identification such as skin characteristics and ratio to joint length and spacing. Further examples include the relationship between the finger(s), hands or other body parts and the interference pattern created by the body parts creates a unique constant and may be used as a unique digital signature. For instance, a finger in a 3D acoustic or EMF field would create unique null and peak points or a unique null and peak pattern, so the "noise" of interacting with a field may actually help to create unique identifiers. This may be further discriminated by moving a certain distance, where the motion may be uniquely identified by small tremors, variations, or the like, further magnified by interference patterns in the noise. This type of unique identification is most apparent when using a touchless sensor or array of touchless sensors, where interference patterns (for example using acoustic sensors) may be present due to the size and shape of the hands or fingers, or the like. Further uniqueness may be determined by including motion as another unique variable, which may help in security verification.

Embodiments of this invention relate to methods and systems for implementing the methods comprising the steps of sensing movement of a first body part such as an eye, etc., tracking the first body part movement until is pauses on an object, preliminarily selecting the object, sensing movement of a second body part such as finger, hand, foot, etc., confirming the preliminary selection and selecting the object. The selection may then cause the processing unit to invoke one of the command and control functions including issuing a scroll function, a simultaneous select and scroll function, a simultaneous select and activate function, a simultaneous select, activate, and attribute adjustment function, or a combination thereof, and controlling attributes by further movement of the first or second body parts or activating the objects if the object is subject to direct activation. These selection procedures may be expanded to the eye moving to an object (scrolling through a list or over a list), the finger or hand moving in a direction to confirm the selection and selecting an object or a group of objects or an attribute or a group of attributes. In certain embodiments, if object configuration is predetermined such that an object in the middle of several objects, then the eye may move somewhere else, but hand motion continues to scroll or control attributes or combinations thereof, independent of the eyes. Hand and eyes may work together or independently, or a combination in and out of the two. Thus, movements may be compound, sequential, simultaneous, partially compound, compound in part, or combinations thereof.

Embodiments of this invention relate to methods and systems for implementing the methods comprising the steps of capturing a movement of a user during a selection procedure or a plurality of selection procedures to produce a raw movement dataset. The methods and systems also include the step of reducing the raw movement dataset to produce a refined movement dataset, where the refinement may include reducing the movement to a plurality of linked vectors, to a fit curve, to a spline fit curve, to any other curve fitting format having reduced storage size, or to any other fitting format. The methods and systems also include the step of storing the refined movement dataset. The methods and systems also include the step of analyzing the refined movement dataset to produce a predictive tool for improving the prediction of a users selection procedure using the motion based system or to produce a forensic tool for identifying the past behavior of the user or to process a training tools for training the user interface to improve user interaction with the interface.

Embodiments of this invention relate to methods and systems for implementing the methods comprising the steps of sensing movement of a plurality of body parts simultaneously or substantially simultaneously and converting the sensed movement into control functions for simultaneously controlling an object or a plurality of objects. The methods and systems also include controlling an attribute or a plurality of attributes, or activating an object or a plurality of objects, or any combination thereof. For example, placing a hand on a top of a domed surface for controlling a UAV, sensing movement of the hand on the dome, where a direction of movement correlates with a direction of flight, sensing changes in the movement on the top of the domed surface, where the changes correlate with changes in direction, speed, or acceleration of functions, and simultaneously sensing movement of one or more fingers, where movement of the fingers may control other features of the UAV such as pitch, yaw, roll, camera focusing, missile firing, etc. with an independent finger(s) movement, while the hand is controlling the UAV, either through remaining stationary (continuing last known command) or while the hand is moving, accelerating, or changing direction of acceleration. In certain embodiments where the display device is flexible device such as a flexible screen or flexible dome, the movement may also include deforming the surface of the flexible device, changing a pressure on the surface, or similar surface deformations. These deformations may be used in conjunction with the other motions.

Embodiments of this invention relate to methods and systems for implementing the methods comprising the steps of populating a display field with displayed primary objects and hidden secondary objects, where the primary objects include menus, programs, devices, etc. and secondary objects include submenus, attributes, preferences, etc. The methods and systems also include sensing movement, highlighting one or more primary objects most closely aligned with a direction of the movement, predicting a primary object based on the movement, and simultaneously: (a) selecting the primary object, (b) displaying secondary objects most closely aligned with the direction of motion in a spaced apart configuration, (c) pulling the primary and secondary objects toward a center of the display field or to a pre-determined area of the display field, and (d) removing, fading, or making inactive the unselected primary and secondary objects until making active again.

Alternately, zones in between primary and/or secondary objects may act as activating areas or subroutines that would act the same as the objects. For instance, if someone were to move in between two objects in 3D space, objects in the background could be rotated to the front and the front objects could be rotated towards the back, or to a different level.

Embodiments of this invention relate to methods and systems for implementing the methods comprising the steps of populating a display field with displayed primary objects and offset active fields associated with the displayed primary objects, where the primary objects include menus, object lists, alphabetic characters, numeric characters, symbol characters, other text based characters. The methods and systems also include sensing movement, highlighting one or more primary objects most closely aligned with a direction of the movement, predicting a primary object based on the movement, and simultaneously: (a) selecting the primary object, (b) displaying secondary (tertiary or deeper) objects most closely aligned with the direction of motion in a spaced apart configuration, (c) pulling the primary and secondary or deeper objects toward a center of the display field or to a pre-determined area of the display field, and/or (d) removing, making inactive, or fading or otherwise indicating non-selection status of the unselected primary, secondary, and deeper level objects.

Embodiments of this invention relate to methods and systems for implementing the methods comprising the steps of sensing movement of an eye and simultaneously moving elements of a list within a fixed window or viewing pane of a display field or a display or an active object hidden or visible through elements arranged in a 2D or 3D matrix within the display field, where eye movement anywhere, in any direction in a display field regardless of the arrangement of elements such as icons moves through the set of selectable objects. Of course the window may be moved with the movement of the eye to accomplish the same scrolling through a set of lists or objects, or a different result may occur by the use of both eye position in relation to a display or volume (perspective), as other motions occur, simultaneously or sequentially. Thus, scrolling does not have to be in a linear fashion, the intent is to select an object and/or attribute and/or other selectavble items regardless of the manner of motion—linear, arcuate, angular, circular, spiral, random, or the like. Once an object of interest is to be selected, then selection is accomplished either by movement of the eye in a different direction, holding the eye in place for a period of time over an object, movement of a different body part, or any other movement or movement type that affects the selection of an object or audio event, facial posture, or biometric or bio-kinetic event.

Embodiments of this invention relate to methods and systems for implementing the methods comprising the steps of sensing movement of an eye, selecting an object, an object attribute or both by moving the eye in a pre-described change of direction such that the change of direction would be known and be different than a random eye movement, or a movement associated with the scroll (scroll being defined by moving the eye all over the screen or volume of objects with the intent to choose).

Embodiments of this invention relate to methods and systems for implementing the methods comprising the steps of sensing eye movement via a motion sensor, selecting an object displayed in a display field when the eye pauses at an object for a dwell time sufficient for the motion sensor to detect the pause and simultaneously activating the selected object, repeating the sensing and selecting until the object is either activatable or an attribute capable of direct control. In certain embodiments, the methods also comprise predicting the object to be selected from characteristics of the movement and/or characteristics of the manner in which the user moves. In other embodiments, eye tracking—using gaze instead of motion for selection/control via eye focusing (dwell time or gaze time) on an object and a body motion (finger, hand, etc.) scrolls through an associated attribute list associated with the object, or selects a submenu associated with the object. Eye gaze selects a submenu object and body motion confirms selection (selection does not occur without body motion), so body motion actually affects object selection.

In other embodiments, eye tracking—using motion for selection/control—eye movement is used to select a first word in a sentence of a word document. Selection is confirmed by body motion of a finger (e.g., right finger) which holds the position. Eye movement is then tracked to the last word in the sentence and another finger (e.g., the left finger) confirms selection. Selected sentence is highlighted due to second motion defining the boundary of selection. The same effect may be had by moving the same finger towards the second eye position (the end of the sentence or word). Movement of one of the fingers towards the side of the monitor (movement is in different direction than the confirmation movement) sends a command to delete the sentence. Alternatively, movement of eye to a different location, followed by both fingers moving generally towards that location results in the sentence being copied to the location at which the eyes stopped. This may also be used in combination with a gesture or with combinations of motions and gestures such as eye movement and other body movements concurrently—multiple inputs at once such as UAV controls described below.

In other embodiments, looking at the center of picture or article and then moving one finger away from center of picture or center of body enlarges the picture or article (zoom in). Moving finger towards center of picture makes picture smaller (zoom out). What is important to understand here is that an eye gaze point, a direction of gaze, or a motion of the eye provides a reference point for body motion and location to be compared. For instance, moving a body part (say a finger) a certain distance away from the center of a picture in a touch or touchless, 2D or 3D environment (area or volume as well), may provide a different view. For example, if the eye(s) were looking at a central point in an area, one view would appear, while if the eye(s) were looking at an edge point in an area, a different view would appear. The relative distance of the motion would change, and the relative direction may change as well, and even a dynamic change involving both eye(s) and finger, could provide yet another change of motion. For example, by looking at the end of a stick and using the finger to move the other end of it, the pivot point would be the end the eyes were looking at. By looking at the middle of the stick, then using the finger to rotate the end, the stick would pivot around the middle. Each of these movement may be used to control different attributes of a picture, screen, display, window, or volume of a 3D projection, etc. What now takes two fingers may be replaced by one due to the eye(s) acting as the missing finger.

These concepts are useable to manipulate the view of pictures, images, 3D data or higher dimensional data, 3D renderings, 3D building renderings, 3D plant and facility renderings, or any other type of 3D or higher dimensional pictures, images, or renderings. These manipulations of displays, pictures, screens, etc. may also be performed without the coincidental use of the eye, but rather by using the motion of a finger or object under the control or a user, such as by moving from one lower corner of a bezel, screen, or frame (virtual or real) diagonally to the opposite upper corner to control one attribute, such as zooming in, while moving from one upper corner diagonally to the other lower corner would perform a different function, for example zooming out. This motion may be performed as a gesture, where the attribute change might occur in at predefined levels, or may be controlled variably so the zoom in/out function may be a function of time, space, and/or distance. By moving from one side or edge to another, the same predefined level of change, or variable change may occur on the display, picture, frame, or the like. For example, a TV screen displaying a picture and zoom-in may be performed by moving from a bottom left corner of the frame or bezel, or an identifiable region (even off the screen) to an upper right portion. As the user moves, the picture is magnified (zoom-in). By starting in an upper right corner and moving toward a lower left, the system causes the picture to be reduced in size (zoom-out) in a relational manner to the distance or speed the user moves. If the user makes a quick diagonally downward movement from one upper corner to the other lower corner, the picture may be reduced by 50% (for example). This eliminates the need for using two fingers that is currently popular as a pinch/zoom function.

By the user moving from a right side of the frame or bezel or predefined location towards a left side, an aspect ratio of the picture may be changed so as to make the picture tall and skinny By moving from a top edge toward a bottom edge, the picture may cause the picture to appear short and wide. By moving two fingers from one upper corner diagonally towards a lower corner, or from side to side, a "cropping" function may be used to select certain aspects of the picture.

By taking one finger and placing it near the edge of a picture, frame, or bezel, but not so near as to be identified as desiring to use a size or crop control, and moving in a rotational or circular direction, the picture could be rotated variably, or if done in a quick gestural motion, the picture might rotate a predefined amount, for instance 90 degrees left or right, depending on the direction of the motion.

By moving within a central area of a picture, the picture may be moved "panned" variably by a desired amount or panned a preset amount, say 50% of the frame, by making a gestural motion in the direction of desired panning. Likewise, these same motions may be used in a 3D environment for simple manipulation of object attributes. These are not specific motions using predefined pivot points as is currently used in CAD programs, but is rather a way of using the body (eyes or fingers for example) in broad areas. These same motions may be applied to any display, projected display or other similar device. In a mobile device, where many icons (objects) exist on one screen, where the icons include folders of "nested" objects, by moving from one lower corner of the device or screen diagonally toward an upper corner, the display may zoom in, meaning the objects would appear magnified, but fewer would be displayed. By moving from an upper right corner diagonally downward, the icons would become smaller, and more could be seen on the same display. Moving in a circular motion near an edge of the display may cause rotation of the icons, providing scrolling through lists and pages of icons. Moving from one edge to an opposite edge would change the aspect ratio of the displayed objects, making the screen of icons appear shorter and wider, or taller and skinny, based on the direction moved.

In other embodiments, looking at a menu object then moving a finger away from object or center of body opens up sub menus. If the object represents a software program such as excel, moving away opens up spreadsheet fully or variably depending on how much movement is made (expanding spreadsheet window).

In other embodiments, instead of being a program accessed through an icon, the program may occupy part of a 3D space that the user interacts with or a field coupled to the program acting as a sensor for the program through which the user to interacts with the program. In other embodiments, if object represents a software program such as Excel and several (say 4) spreadsheets are open at once, movement away from the object shows 4 spread sheet icons. The effect is much like pulling curtain away from a window to reveal the software programs that are opened. The software programs might be represented as "dynamic fields", each program with its own color, say red for excel, blue for word, etc. The objects or aspects or attributes of each field may be manipulated by using motion. For instance, if a center of the field is considered to be an origin of a volumetric space about the objects or value, moving at an exterior of the field cause a compound effect on the volume as a whole due to having a greater x value, a greater y value, or a great z value—say the maximum value of the field is 5 (x, y, or z), moving at a 5 point would be a multiplier effect of 5 compared to moving at a value of 1 (x, y, or z). The inverse may also be used, where moving at a greater distance from the origin may provide less of an effect on part or the whole of the field and corresponding values. Changes in color, shape, size, density, audio characteristics, or any combination of these and other forms of representation of values could occur, which may also help the user or users to understand the effects of motion on the fields. These may be preview panes of the spreadsheets or any other icons representing these. Moving back through each icon or moving the finger through each icon or preview pane, then moving away from the icon or center of the body selects the open programs and expands them equally on the desktop, or layers them on top of each other, etc.

In other embodiments, four Word Documents (or any program or web pages) are open at once. Movement from bottom right of the screen to top left reveals the document at bottom right of page, effect looks like pulling curtain back. Moving from top right to bottom left reveals a different document. Moving from across the top, and circling back across the bottom opens all, each in its quadrant, then moving through the desired documents and creating circle through the objects links them all together and merges the documents into one document. As another example, the user opens three spreadsheets and dynamically combines or separates the spreadsheets merely via motions or movements, variably per amount and direction of the motion or movement. Again, the software or virtual objects are dynamic fields, where moving in one area of the field may have a different result than moving in another area, and the combining or moving through the fields causes a combining of the software programs, and may be done dynamically. Furthermore, using the eyes to help identify specific points in the fields (2D or 3D) would aid in defining the appropriate layer or area of the software program (field) to be manipulated or interacted with. Dynamic layers within these fields may be represented and interacted with spatially in this manner. Some or all the objects may be affected proportionately or in some manner by the movement of one or more other objects in or near the field. Of course, the eyes may work in the same manner as a body part, or in combination with other objects or body parts.

In other embodiments, the eye selects (acts like a cursor hovering over an object and object may or may not respond, such as changing color to identify it has been selected), then a motion or gesture of eye or a different body part confirms and disengages the eyes for further processing.

In other embodiments, the eye selects or tracks and a motion or movement or gesture of second body part causes a change in an attribute of the tracked object—such as popping or destroying the object, zooming, changing the color of the object, etc. finger is still in control of the object.

In other embodiments, eye selects, and when body motion and eye motion are used, working simultaneously or sequentially, a different result occurs compared to when eye motion is independent of body motion, e.g., eye(s) tracks a bubble, finger moves to zoom, movement of the finger selects the bubble and now eye movement will rotate the bubble based upon the point of gaze or change an attribute of the bubble, or the eye may gaze and select and/or control a different object while the finger continues selection and/or control of the first object or a sequential combination could occur, such as first pointing with the finger, then gazing at a section of the bubble may produce a different result than looking first and then moving a finger; again a further difference may occur by using eyes, then a finger, then two fingers than would occur by using the same body parts in a different order.

Other embodiments of this invention relate to methods and systems for implementing the methods comprising the steps of: controlling helicopter with one hand on a domed interface, where several fingers and hand all move together and move separately. In this way, the whole movement of the hand controls the movement of the helicopter in yaw, pitch and roll, while the fingers may also move simultaneously to control cameras, artillery, or other controls or attributes, or both. This is movement of multiple inputs simultaneously congruently or independently.

Note—we have not discussed the perspective of the user as gravitational effects and object selections are made in 3D space. For instance, as we move in 3D space towards subobjects, using our previously submitted gravitational and predictive effects, each selection may change the entire perspective of the user so the next choices are in the center of view or in the best perspective. This may include rotational aspects of perspective, the goal being to keep the required movement of the user small and as centered as possible in the interface real estate. This is really showing the aspect of the user, and is relative. Since we are saying the objects and fields may be moved, or saying the user may move around the field, it is really a relative.

Other embodiments of this invention relate to methods and systems for implementing the methods comprising the steps of sensing movement of a button or knob with motion controls associated therewith, either on top of or in 3D, 3 space, on sides (whatever the shape), predicting which gestures are called by direction and speed of motion (maybe amendment to gravitational/predictive application). By definition, a gesture has a pose-movement-pose then lookup table, then command if values equal values in lookup table. We can start with a pose, and predict the gesture by beginning to move in the direction of the final pose. As we continue to move, we would be scrolling through a list of predicted gestures until we can find the most probable desired gesture, causing the command of the gesture to be triggered before the gesture is completed. Predicted gestures could be dynamically shown in a list of choices and represented by objects or text or colors or by some other means in a display. As we continue to move, predicted end results of gestures would be dynamically displayed and located in such a place that once the correct one appears, movement towards that object, representing the correct gesture, would select and activate the gestural command. In this way, a gesture could be predicted and executed before the totality of the gesture is completed, increasing speed and providing more variables for the user.

For example, in a keyboard application, current software use shapes of gestures to predict words. Google uses zones of letters (a group of letters), and combinations of zones (gestures) to predict words. We would use the same gesture-based system, except we be able to predict which zone the user is moving towards based upon direction of motion, meaning we would not have to actually move into the zone to finish the gesture, but moving towards the zone would bring up choice bubbles, and moving towards the bubble would select that bubble.

In another example, instead of using a gesture such as "a pinch" gesture to select something in a touchless environment, movement towards making that gesture would actually trigger the same command. So instead of having to actually touch the finger to the thumb, just moving the finger towards the thumb would cause the same effect to occur.

Most helpful in combination gestures where a finger pointing gesture is followed by a pinching gesture to then move a virtual object. By predicting the gesture, after the point gesture, the beginning movement of the pinch gesture would be faster than having to finalize the pinching motion.

Other embodiments of this invention relate to methods and systems for implementing the methods comprising the steps of: sensing movement via a motion sensor within a display field displaying a list of letters from an alphabet, predicting a letter or a group of letters based on the motion, if movement is aligned with a single letter, simultaneously select the letter or simultaneously moving the group of letter forward until a discrimination between letters in the group is predictively certain and simultaneously select the letter, sensing a change in a direction of motion, predicting a second letter or a second group of letter based on the motion, if movement is aligned with a single letter, simultaneously select the letter or simultaneously moving the group of letter forward until a discrimination between letters in the group is predictively certain and simultaneously select the letter, either after the first letter selection or the second letter selection or both, display a list of potential words beginning with either the first letter or the second letter, selecting a word from the word list by movement of a second body part simultaneously selected the word and resetting the original letter display, and repeating the steps until a message is completed.

Thus, the current design selects a letter simply by changing a direction of movement at or near a letter. A faster process would be to use movement toward a letter, then changing a direction of movement before reaching the letter and moving towards a next letter and changing direction of movement again before getting to the next letter would better predict words, and might change the first letter selection. Selection bubbles would appear and be changing while moving, so speed and direction would be used to predict the word, not necessarily having to move over the exact letter or very close to it, though moving over the exact letter would be a positive selection of that letter and this effect could be better verified by a slight pausing or slowing down of movement. (Of course, this could be combined with current button like actions or lift-off events (touch-up events), and more than one finger or hand may be used, both simultaneously or sequentially to provide the spelling and typing actions.) This is most effective in a touchless environment where relative motion can be leveraged to predict words on a keyboard rather than the actual distance required to move from key to key. The distance from a projected keyboard and movement of finger uses angles of motion to predict letters. Predictive word bubbles can be selected with a Z movement. B) Move below the letters of a keyboard to select, or shape the letter buttons in such a way that they extend downward (like a tear drop) so actual letters can be seen while selecting instead of covering the letters (the touch or active zones are offset from the actual keys. This can also be used with predictive motions to create a very fast keyboard where relative motions are used to predict keys and words while more easily being able to see the key letters. Bubbles could also appear above or besides the keys, or around them, including in a arcuate or radial fashion to further select predicted results by moving towards the suggested words.

Other embodiments of this invention relate to methods and systems for implementing the methods comprising the steps of: maintaining all software applications in an instant on configuration—on, but inactive, resident, but not active, so that once selected the application which is merely dormant, is fully activate instantaneously (or may be described as a different focus of the object), sensing movement via a motion sensor with a display field including application objects distributed on the display in a spaced apart configuration, preferably, in a maximally spaced apart configuration so that the movement results in a fast predict selection of an application object, pulling an application object or a group of application objects toward a center of the display field, if movement is aligned with a single application, simultaneously select and instant on the application, or continue monitoring the movement until a discrimination between application objects is predictively certain and simultaneously selecting and activating the application object.

Thus, the industry must begin to start looking at everything as always on and what is on is always interactive, and may have different levels of interactivity. For instance, software should be an interactive field. Excel and word should be interactive fields where motion through them can combine or select areas, which correspond to cells and texts being intertwined with the motion. Excel sheets should be part of the same 3D field, not separate pages, and should have depth so their aspects can be combined in volume. The software desktop experience needs a depth where the desktop is the cover of a volume, and rolling back the desktop from different corners reveals different programs that are active and have different colors, such as word being revealed when moving from bottom right to top left and being a blue field, excel being revealed when moving from top left to bottom right and being red; moving right to left lifts desktop cover and reveals all applications in volume, each application with its own field and color in 3D space.

Other embodiments of this invention relate to methods and systems of this invention, where the active screen area includes a delete or backspace region. When the user moves the active object (cursor) toward the delete or backspace region, then the selected objects will be released one at a time or in groups or completely depending on attributes of movement toward the delete of backspace region. Thus, if the movement is slow and steady, then the selected objects are released one at a time. If the movement is fast, then multiple selected objects are released. Thus, the delete or backspace region is variable. For example, if the active display region represents a cell phone dialing pad (with the number distributed in any desired configuration from a traditional grid configuration to a arcuate configuration about the active object, or in any other desirable configuration), when by moving the active object toward the delete or backspace region, numbers will be removed from the number, which may be displayed in a number display region of the display. Alternatively, touching the backspace region would back up one letter; moving from right to left in the backspace region would delete (backspace) a corresponding amount of letters based on the distance (and/or speed) of the movement, The deletion could occur when the motion is stopped, paused, or a lift off event is detected. Alternatively, a swiping motion (jerk, or fast acceleration) could result in the deletion (backspace) the entire word. All these may or may not require a lift off event, but the motion dictates the amount deleted or released objects such as letters, numbers, or other types of objects. The same is true with the delete key, except the direction would be forward instead of backwards. Lastly, the same could be true in a radial menu (or linear or spatial), where the initial direction of motion towards an object or on an object, or in a zone associated with an object, that has a variable attribute. The motion associated with or towards that object would provide immediate control.

Other embodiments of this invention relate to methods and systems of this invention, where eye movement is used to select and body part movement is used to confirm or activate the selection. Thus, eye movement is used as the selective movement, while the object remains in the selected state, then the body part movement confirms the selection and activates the selected object. Thus, specifically stated the eye or eyes look in a different direction or area, and the last selected object would remain selected until a different object is selected by motion of the eyes or body, or until a time-out deselects the object. An object may be also selected by an eye gaze, and this selection would continue even when the eye or eyes are no longer looking at the object. The object would remain selected unless a different selectable object is looked at, or unless a timeout deselects the object occurs.

In all of the embodiments set forth above, the motion or movement may also comprise lift off event, where a finger or other body part or parts are in direct contract with a touch sensitive feedback device such as a touch screen, then the acceptable forms of motion or movement will comprise touching the screen, moving on or across the screen, lifting off from the screen (lift off events), holding still on the screen at a particular location, holding still after first contact, holding still after scroll commencement, holding still after attribute adjustment to continue an particular adjustment, holding still for different periods of time, moving fast or slow, moving fast or slow or different periods of time, accelerating or decelerating, accelerating or decelerating for different periods of time, changing direction, changing speed, changing velocity, changing acceleration, changing direction for different periods of time, changing speed for different periods of time, changing velocity for different periods of time, changing acceleration for different periods of time, or any combinations of these motions may be used by the systems and methods to invoke command and control over realworld or virtual world controllable objects using on the motion only. Of course, if certain objects that are invoked by the motion sensitive processing of the systems and methods of this invention require hard select protocols—mouse clicks, finger touches, etc., the invoked object's internal function will not be augmented by the systems or methods of this invention unless the invoked object permits or supports system integration.

The systems and methods are disclosed herein where command functions for selection and/or control of real and/or virtual objects may be generated based on a change in velocity at constant direction, a change in direction at constant velocity, a change in both direction and velocity, a change in a rate of velocity, or a change in a rate of acceleration. Once detected by an detector or sensor, these changes may be used by a processing unit to issue commands for controlling real and/or virtual objects. A selection or combination scroll, selection, and attribute selection may occur upon the first movement. Such motion may be associated with doors opening and closing in any direction, golf swings, virtual or realworld games, light moving ahead of a runner, but staying with a walker, or any other motion having compound properties such as direction, velocity, acceleration, and changes in any one or all of these primary properties; thus, direction, velocity, and acceleration may be considered primary motion properties, while changes in these primary properties may be considered secondary motion properties. The system may then be capable of differentially handling of primary and secondary motion properties. Thus, the primary properties may cause primary functions to be issued, while secondary properties may cause primary function to be issued, but may also cause the modification of primary function and/or secondary functions to be issued. For example, if a primary function comprises a predetermined selection format, the secondary motion properties may expand or contract the selection format.

In another example of this primary/secondary format for causing the system to generate command functions may involve an object display. Thus, by moving the object in a direction away from the user's eyes, the state of the display may change, such as from a graphic to a combination graphic and text, to a text display only, while moving side to side or moving a finger or eyes from side to side could scroll the displayed objects or change the font or graphic size, while moving the head to a different position in space might reveal or control attributes or submenus of the object. Thus, these changes in motions may be discrete, compounded, or include changes in velocity, acceleration and rates of these changes to provide different results for the user. These examples illustrate two concepts: 1) the ability to have compound motions which provide different results that the motions separately or sequentially, and (2) the ability to change states or attributes, such as graphics to text solely or in combination with single or compound motions, or with multiple inputs, such as verbal, touch, facial expressions, or bio-kinetically, all working together to give different results, or to provide the same results in different ways.

It must be recognized that the present invention while based on the use of sensed velocity, acceleration, and changes and rates of changes in these properties to effect control of realworld objects and/or virtual objects, the present invention may also use other properties of the sensed motion in combination with sensed velocity, acceleration, and changes in these properties to effect control of realworld and/or virtual objects, where the other properties include direction and change in direction of motion, where the motion has a constant velocity. For example, if the motion sensor(s) senses velocity, acceleration, changes in velocity, changes in acceleration, and/or combinations thereof that is used for primary control of the objects via motion of a primary sensed human, animal, part thereof, realworld object under the control of a human or animal, or robots under control of the human or animal, then sensing motion of a second body part may be used to confirm primary selection protocols or may be used to fine tune the selected command and control function. Thus, if the selection is for a group of objects, then the secondary motion properties may be used to differentially control object attributes to achieve a desired final state of the objects.

For example, suppose the apparatuses of this invention control lighting in a building. There are banks of lights on or in all four walls (recessed or mounted) and on or in the ceiling (recessed or mounted). The user has already selected and activated lights from a selection menu using motion to activate the apparatus and motion to select and activate the lights from a list of selectable menu items such as sound system, lights, cameras, video system, etc. Now that lights has been selected from the menu, movement to the right would select and activate the lights on the right wall. Movement straight down would turn all of the lights of the right wall down—dim the lights. Movement straight up would turn all of the lights on the right wall up—brighten. The velocity of the movement down or up would control the rate that the lights were dimmed or brighten. Stopping movement would stop the adjustment or removing the body, body part or object under the user control within the motion sensing area would stop the adjustment.

For even more sophisticated control using motion properties, the user may move within the motion sensor active area to map out a downward concave arc, which would cause the lights on the right wall to dim proportionally to the arc distance from the lights. Thus, the right lights would be more dimmed in the center of the wall and less dimmed toward the ends of the wall.

Alternatively, if the movement was convex downward, then the light would dim with the center being dimmed the least and the ends the most. Concave up and convex up would cause differential brightening of the lights in accord with the nature of the curve.

Now, the apparatus may also use the velocity of the movement of the mapping out the concave or convex movement to further change the dimming or brightening of the lights. Using velocity, starting off slowly and increasing speed in a downward motion would cause the lights on the wall to be dimmed more as the motion moved down. Thus, the lights at one end of the wall would be dimmed less than the lights at the other end of the wall.

Now, suppose that the motion is a S-shape, then the light would be dimmed or brightened in a S-shaped configuration. Again, velocity may be used to change the amount of dimming or brightening in different lights simply by changing the velocity of movement. Thus, by slowing the movement, those lights would be dimmed or brightened less than when the movement is speed up. By changing the rate of velocity—acceleration—further refinements of the lighting configuration may be obtained.

Now suppose that all the lights in the room have been selected, then circular or spiral motion would permit the user to adjust all of the lights, with direction, velocity and acceleration properties being used to dim and/or brighten all the lights in accord with the movement relative to the lights in the room. For the ceiling lights, the circular motion may move up or down in the z direction to affect the luminosity of the ceiling lights. Thus, through the sensing of motion or movement within an active sensor zone—area and especially volume, a user can use simple or complex motion to differentially control large numbers of devices simultaneously.

This differential control through the use of sensed complex motion permits a user to nearly instantaneously change lighting configurations, sound configurations, TV configurations, or any configuration of systems having a plurality of devices being simultaneously controlled or of a single system having a plurality of objects or attributes capable of simultaneous control. For examples, in a computer game including large numbers of virtual objects such as troops, tanks, airplanes, etc., sensed complex motion would permit the user to quickly deploy, redeploy, rearrangement, manipulated and generally quickly reconfigure all controllable objects and/or attributes by simply conforming the movement of the objects to the movement of the user sensed by the motion detector. This same differential device and/or object control would find utility in military and law enforcement, where command personnel by motion or movement within a sensing zone of a motion sensor quickly deploy, redeploy, rearrangement, manipulated and generally quickly reconfigure all assets to address a rapidly changing situation.

Embodiments of systems of this invention include a motion sensor or sensor array, where each sensor includes an active zone and where each sensor senses movement, movement direction, movement velocity, and/or movement acceleration, and/or changes in movement direction, changes in movement velocity, and/or changes in movement acceleration, and/or changes in a rate of a change in direction, changes in a rate of a change in velocity and/or changes in a rate of a change in acceleration within the active zone by one or a plurality of body parts or objects and produces an output signal. The systems also include at least one processing unit including communication software and hardware, where the processing units convert the output signal or signals from the motion sensor or sensors into command and control functions, and one or a plurality of real objects and/or virtual objects in communication with the processing units. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions. The processing unit or units (1) processes a scroll function or a plurality of scroll functions, (2) selects and processes a scroll function or a plurality of scroll functions, (3) selects and activates an object or a plurality of objects in communication with the processing unit, or (4) selects and activates an attribute or a plurality of attributes associated with an object or a plurality of objects in communication with the processing unit or units, or any combination thereof. The objects comprise electrical devices, electrical systems, sensors, hardware devices, hardware systems, environmental devices and systems, energy and energy distribution devices and systems, software systems, software programs, software objects, or combinations thereof. The attributes comprise adjustable attributes associated with the devices, systems, programs and/or objects. In certain embodiments, the sensor(s) is(are) capable of discerning a change in movement, velocity and/or acceleration of ±5%. In other embodiments, the sensor(s) is(are) capable of discerning a change in movement, velocity and/or acceleration of ±10°. In other embodiments, the system further comprising a remote control unit or remote control system in communication with the processing unit to provide remote control of the processing unit and all real and/or virtual objects under the control of the processing unit. In other embodiments, the motion sensor is selected from the group consisting of digital cameras, optical scanners, optical roller ball devices, touch pads, inductive pads, capacitive pads, holographic devices, laser tracking devices, thermal devices, touch or touchless sensors, acoustic devices, and any other device capable of sensing motion, arrays of such devices, and mixtures and combinations thereof. In other embodiments, the objects include environmental controls, lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical or manufacturing plant control systems, computer operating systems and other software systems, remote control systems, mobile devices, electrical systems, sensors, hardware devices, hardware systems, environmental devices and systems, energy and energy distribution devices and systems, software programs or objects or mixtures and combinations thereof.

Embodiments of methods of this invention for controlling objects include the step of sensing movement, movement direction, movement velocity, and/or movement acceleration, and/or changes in movement direction, changes in movement velocity, and/or changes in movement acceleration, and/or changes in a rate of a change in direction, changes in a rate of a change in velocity and/or changes in a rate of a change in acceleration within the active zone by one or a plurality of body parts or objects within an active sensing zone of a motion sensor or within active sensing zones of an array of motion sensors. The methods also include the step of producing an output signal or a plurality of output signals from the sensor or sensors and converting the output signal or signals into a command function or a plurality of command functions. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions. In certain embodiments, the objects comprise electrical devices, electrical systems, sensors, hardware devices, hardware systems, environmental devices and systems, energy and energy distribution devices and systems, software systems, software programs, software objects, or combinations thereof. In other embodiments, the attributes comprise adjustable attributes associated with the devices, systems, programs and/or objects. In other embodiments, the timed hold is brief or the brief cessation of movement causing the attribute to be adjusted to a preset level, causing a selection to be made, causing a scroll function to be implemented, or a combination thereof. In other embodiments, the timed hold is continued causing the attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value or scroll function in a direction of the initial motion until the timed hold is removed. In other embodiments, the motion sensor is selected from the group consisting of sensors of any kind including digital cameras, optical scanners, optical roller ball devices, touch pads, inductive pads, capacitive pads, holographic devices, laser tracking devices, thermal devices, touch or touchless sensors, acoustic devices, and any other device capable of sensing motion or changes in any waveform due to motion or arrays of such devices, and mixtures and combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems and other software systems, remote control systems, sensors, or mixtures and combinations thereof.

The all of these scenarios set forth above are designed to illustrate the control of a large number of devices using properties and/or characteristics of the sensed motion including, without limitation, relative distance of the motion for each object (real like a person in a room using his/her hand as the object for which motion is being sensed or virtual representations of the objects in a virtual or rendered room on a display apparatus), direction of motion, speed of motion, acceleration of motion, changes an any of these properties, rates of changes in any of these properties, or mixtures and combinations thereof to control a single controllable attribute of the object such as lights. However, the systems, apparatuses, and methods of this invention are also capable of using motion properties and/or characteristics to control two, three, or more attributes of an object. Additionally, the systems, apparatuses, and methods of this invention are also capable of using motion properties and/or characteristics from a plurality of moving objects within a motion sensing zone to control different attributes of a collection of objects. For example, if the lights in the above figures are capable of color as well as brighten, then the motion properties and/or characteristics may be used to simultaneously change color and intensity of the lights or one sensed motion could control intensity, while another sensed motion could control color. For example, if an artist wanted to paint a picture on a computer generated canvas, then motion properties and/or characteristics would allow the artist to control the pixel properties of each pixel on the display using the properties of the sensed motion from one, two, three, etc. sensed motions. Thus, the systems, apparatuses, and methods of this invention are capable of converting the motion properties associated with each and every object being controlled based on the instantaneous properties values as the motion traverse the object in real space or virtual space.

The systems, apparatuses and methods of this invention activate upon motion being sensed by one or more motion sensors. This sensed motion then activates the systems and apparatuses causing the systems and apparatuses to process the motion and its properties activating a selection object and a plurality of selectable objects. Once activated, the motion properties cause movement of the selection object accordingly, which will cause a pre-selected object or a group of pre-selected objects, to move toward the selection object, where the pre-selected object or the group of pre-selected objects are the selectable object(s) that are most closely aligned with the direction of motion, which may be evidenced by the user feedback units by corresponding motion of the selection object. Another aspect of the systems or apparatuses of this invention is that the faster the selection object moves toward the pre-selected object or the group of preselected objects, the faster the pre-selected object or the group of preselected objects move toward the selection object. Another aspect of the systems or apparatuses of this invention is that as the pre-selected object or the group of pre-selected objects move toward the selection object, the pre-selected object or the group of pre-selected objects may increase in size, change color, become highlighted, provide other forms of feedback, or a combination thereof. Another aspect of the systems or apparatuses of this invention is that movement away from the objects or groups of objects may result in the objects moving away at a greater or accelerated speed from the selection object(s). Another aspect of the systems or apparatuses of this invention is that as motion continues, the motion will start to discriminate between members of the group of pre-selected object(s) until the motion results in the selection of a single selectable object or a coupled group of selectable objects. Once the selection object and the target selectable object touch, active areas surrounding the objection touch, a threshold distance between the object is achieved, or a probability of selection exceeds an activation threshold, the target object is selected and non-selected display objects are removed from the display, change color or shape, or fade away or any such attribute so as to recognize them as not selected. The systems or apparatuses of this invention may center the selected object in a center of the user feedback unit or center the selected object at or near a location where the motion was first sensed. The selected object may be in a corner of a display—on the side the thumb is on when using a phone, and the next level menu is displayed slightly further away, from the selected object, possibly arcuately, so the next motion is close to the first, usually working the user back and forth in the general area of the center of the display. If the object is an executable object such as taking a photo, turning on a device, etc, then the execution is simultaneous with selection. If the object is a submenu, sublist or list of attributes associated with the selected object, then the submenu members, sublist members or attributes are displayed on the screen in a spaced apart format. The same procedure used to select the selected object is then used to select a member of the submenu, sublist or attribute list. Thus, the interfaces have a gravity like or anti-gravity like action on display objects. As the selection object(s) moves, it attracts an object or objects in alignment with the direction of the selection object's motion pulling those object(s) toward it and may simultaneously or sequentially repel non-selected items away or indicate non-selection in any other manner so as to discriminate between selected and non-selected objects. As motion continues, the pull increases on the object most aligned with the direction of motion, further accelerating the object toward the selection object until they touch or merge or reach a threshold distance determined as an activation threshold. The touch or merge or threshold value being reached causes the processing unit to select and activate the object(s). Additionally, the sensed motion may be one or more motions detected by one or more movements within the active zones of the motion sensor(s) giving rise to multiple sensed motions and multiple command function that may be invoked simultaneously or sequentially. The sensors may be arrayed to form sensor arrays. If the object is an executable object such as taking a photo, turning on a device, etc, then the execution is simultaneous with selection. If the object is a submenu, sublist or list of attributes associated with the selected object, then the submenu members, sublist members or attributes are displayed on the screen is a spaced apart format. The same procedure used to select the selected object is then used to select a member of the submenu, sublist or attribute list. Thus, the interfaces have a gravity like action on display objects. As the selection object moves, it attracts an object or objects in alignment with the direction of the selection object's motion pulling those object toward it. As motion continues, the pull increases on the object most aligned with the direction of motion, further accelerating the object toward the selection object until they touch or merge or reach a threshold distance determined as an activation threshold to make a selection. The touch, merge or threshold event causes the processing unit to select and activate the object.

The sensed motion may result not only in activation of the systems or apparatuses of this invention, but may be result in select, attribute control, activation, actuation, scroll or combination thereof.

Different haptic (tactile) or audio or other feedback may be used to indicate different choices to the user, and these may be variable in intensity as motions are made. For example, if the user moving through radial zones different objects may produce different buzzes or sounds, and the intensity or pitch may change while moving in that zone to indicate whether the object is in front of or behind the user.

Compound motions may also be used so as to provide different control function than the motions made separately or sequentially. This includes combination attributes and changes of both state and attribute, such as tilting the device to see graphics, graphics and text or text, along with changing scale based on the state of the objects, while providing other controls simultaneously or independently, such as scrolling, zooming in/out, or selecting while changing state. These features may also be used to control chemicals being added to a vessel, while simultaneously controlling the amount. These features may also be used to change between Windows 8 and Windows 7 with a tilt while moving icons or scrolling through programs at the same time.

Audible or other communication medium may be used to confirm object selection or in conjunction with motion so as to provide desired commands (multimodal) or to provide the same control commands in different ways.

The present systems, apparatuses, and methods may also include artificial intelligence components that learn from user motion characteristics, environment characteristics (e.g., motion sensor types, processing unit types, or other environment properties), controllable object environment, etc. to improve or anticipate object selection responses.

Embodiments of this invention further relate to systems for selecting and activating virtual or real objects and their controllable attributes including at least one motion sensor having an active sensing zone, at least one processing unit, at least one power supply unit, and one object or a plurality of objects under the control of the processing units. The sensors, processing units, and power supply units are in electrical communication with each other. The motion sensors sense motion including motion properties within the active zones, generate at least one output signal, and send the output signals to the processing units. The processing units convert the output signals into at least one command function. The command functions include (1) a start function, (2) a scroll function, (3) a select function, (4) an attribute function, (5) an attribute control function, (6) a simultaneous control function including: (a) a select and scroll function, (b) a select, scroll and activate function, (c) a select, scroll, activate, and attribute control function, (d) a select and activate function, (e) a select and attribute control function, (f) a select, active, and attribute control function, or (g) combinations thereof, or (7) combinations thereof. The start functions activate at least one selection or cursor object and a plurality of selectable objects upon first sensing motion by the motion sensors and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects. The motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The objects comprise realworld objects, virtual objects and mixtures or combinations thereof, where the realworld objects include physical, mechanical, electro-mechanical, magnetic, electro-magnetic, electrical, or electronic devices or any other realworld device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion properties are changes discernible by the motion sensors and/or the processing units.

In certain embodiments, the start functions further activate the user feedback units and the selection objects and the selectable objects are discernible via the motion sensors in response to movement of an animal, human, robot, robotic system, part or parts thereof, or combinations thereof within the motion sensor active zones. In other embodiments, the system further includes at least on user feedback unit, at least one battery backup unit, communication hardware and software, at least one remote control unit, or mixtures and combinations thereof, where the sensors, processing units, power supply units, the user feedback units, the battery backup units, the remote control units are in electrical communication with each other. In other embodiments, faster motion causes a faster movement of the target object or objects toward the selection object or causes a greater differentiation of the target object or object from the non-target object or objects. In other embodiments, if the activated objects or objects have subobjects and/or attributes associated therewith, then as the objects move toward the selection object, the subobjects and/or attributes appear and become more discernible as object selection becomes more certain. In other embodiments, once the target object or objects have been selected, then further motion within the active zones of the motion sensors causes selectable subobjects or selectable attributes aligned with the motion direction to move towards the selection object(s) or become differentiated from non-aligned selectable subobjects or selectable attributes and motion continues until a target selectable subobject or attribute or a plurality of target selectable objects and/or attributes are discriminated from non-target selectable subobjects and/or attributes resulting in activation of the target subobject, attribute, subobjects, or attributes. In other embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, interne browsers, accounting systems, military systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the motion sensors sense a second motion including second motion properties within the active zones, generate at least one output signal, and send the output signals to the processing units, and the processing units convert the output signals into a confirmation command confirming the selection or at least one second command function for controlling different objects or different object attributes. In other embodiments, the motion sensors sense motions including motion properties of two or more animals, humans, robots, or parts thereof, or objects under the control of humans, animals, and/or robots within the active zones, generate output signals corresponding to the motions, and send the output signals to the processing units, and the processing units convert the output signals into command function or confirmation commands or combinations thereof implemented simultaneously or sequentially, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Embodiments of this invention further relates to methods for controlling objects include sensing motion including motion properties within an active sensing zone of at least one motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof and producing an output signal or a plurality of output signals corresponding to the sensed motion. The methods also include converting the output signal or signals via a processing unit in communication with the motion sensors into a command function or a plurality of command functions. The command functions include (1) a start function, (2) a scroll function, (3) a select function, (4) an attribute function, (5) an attribute control function, (6) a simultaneous control function including: (a) a select and scroll function, (b) a select, scroll and activate function, (c) a select, scroll, activate, and attribute control function, (d) a select and activate function, (e) a select and attribute control function, (f) a select, active, and attribute control function, or (g) combinations thereof, or (7) combinations thereof. The methods also include processing the command function or the command functions simultaneously or sequentially, where the start functions activate at least one selection or cursor object and a plurality of selectable objects upon first sensing motion by the motion sensor and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects, where the motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The objects comprise realworld objects, virtual objects or mixtures and combinations thereof, where the realworld objects include physical, mechanical, electro-mechanical, magnetic, electro-magnetic, electrical, or electronic devices or any other realworld device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion properties are changes discernible by the motion sensors and/or the processing units.

In certain embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the methods include sensing second motion including second motion properties within the active sensing zone of the motion sensors, producing a second output signal or a plurality of second output signals corresponding to the second sensed motion, converting the second output signal or signals via the processing units in communication with the motion sensors into a second command function or a plurality of second command functions, and confirming the selection based on the second output signals, or processing the second command function or the second command functions and moving selectable objects aligned with the second motion direction toward the selection object or become differentiated from non-aligned selectable objects and motion continues until a second target selectable object or a plurality of second target selectable objects are discriminated from non-target second selectable objects resulting in activation of the second target object or objects, where the motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. In other embodiments, the methods include sensing motions including motion properties of two or more animals, humans, robots, or parts thereof within the active zones of the motion sensors, producing output signals corresponding to the motions, converting the output signals into command function or confirmation commands or combinations thereof, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Augmented Reality (AR) Environments Using Motion Based Processing

Embodiments of this disclosure broadly relate to systems, apparatuses, interfaces and methods implementing them for constructing and manipulating virtual reality, augmented reality, and mixed reality environments. The systems, apparatuses, and interfaces include mobile or stationary devices having at least a rear facing camera, a display device, a processing unit, and a power supply. The devices may also include a forward facing camera, other sensors, mass storage devices and of course wireless communication hardware and software and an operating system. The power supply provides power to the other components and the processing unit is in communication with and controls the other components. The VR, AR. MR, or XR systems, apparatuses, and interfaces and methods implementing them involve pointing a rear facing camera, a front facing camera, or a multi-angle camera at an object, an image, a video, an environment, and/or a scene and displaying the object, image, video, scene, or environment on the display device as a 2D or 3D rendering thereof. The systems, apparatuses, and interfaces and methods implementing them then scan the object, image, video, scene, or environment and identify objects and/or features associated with the object, image, video, scene, or environment, where the objects may include physical or real-word objects or virtual objects and/or features, characteristics, and/or and attributes associated therewith. The objects and/or features, characteristics, and/or and attributes may be associated with pictures, books, book pages, newspapers, newspaper pages, magazine, magazine pages, other information content, and/or combinations thereof. For example, if real world object is a book opened to a particular page, then the systems, apparatuses, and interfaces and methods implementing them display an image of the pages taken by the rear facing camera, the front facing camera, and/or the multi-angle camera. The systems, apparatuses, and interfaces and methods implementing them then scan the object, image, video, scene, or environment and identify all objects and/or features, characteristics, and/or and attributes associated therewith, where the objects may include any real-world object or virtual object such as people, animals, animated characters, devices, sporting goods, furniture, clothing, lawns, fields, sky, stars, sun, moon, etc., while attributes may include page attributes and object attributes such as colors, textures, sizes, positions, distances between objects, configuration of objects, etc. Once the systems, apparatuses, and interfaces and methods implementing them have identified the all objects and/or features, characteristics, and/or and attributes associated therewith, the systems, apparatuses, and interfaces and methods implementing them overlay a 3D AR image or environment on the image so that the user may select, activate, animate, and/or manipulate the objects and/or features, characteristics, and/or and attributes associated therewith within the overlaid 3D AR environment.

However, there are problems with current technology relating to interactions with such AR environments (image and 3D AR overall). Current technology involves touching a touch sensitive screen, but touching the screen has certain disadvantages including obscuring part of the objects and/or features, characteristics, and/or and attributes associated therewith and the inability to select and activate objects and/or features, characteristics, and/or and attributes associated therewith that are not readily discriminated one from the other by simply touching a touch sensitive screen.

To overcome these problems, the systems, apparatuses, and interfaces and methods implementing them of this disclosure utilize a ray pointer that allows the user to use a distal end of the ray pointer to select, activate, animate, and/or manipulate objects and/or features, characteristics, and/or and attributes associated therewith within the AR 3D overlay. The ray pointer emanates from a contact point where the user touches the touch sensitive screen into the AR 3D environment or emanates from a body part or object under control of the body part (such as a stylus or pointing pen) based on movement of the body part or controlled object within an active zone of a motion sensor, which may be a front facing camera or any other motion sensing device.

In certain embodiments, the ray pointer has an offset such as a +y offset, where the +y direction is defined from a bottom of the display to a top of the display, while the +x direction is defined from a left side of the display to a right of the display. The offset allows the user to move on the touch screen with the pointer distal end offset from the point of contact so that the users hand does not obscure objects and/or features, properties, characteristics, and/or and attributes in the image, scene, or environment allowing highlighting and/or selecting objects and/or features, properties, characteristics, and/or and attributes and/or highlighting and/or selecting controllable constructs generated within the overlaid 3D AR environment. The offset may be variable or fixed or may be variable in certain regions of the image and/or the overlaid 3D AR environment and fixed in other regions. For example, the offset may be minimal if the touch point or movement is associated with the bottom of the display and increases as the touch point moves in the +y direction of the display until it becomes a constant y offset. The offset allows the user to select objects before the hand or figure obscures the objects. While the offset may be +y, the systems, apparatuses, and interfaces and methods implementing them allow the user to change the direction of the offset by rotating the finger at the touch point using blob data to determine an angle of rotation of the offset or rotating in the active zone and again using blob data to determine the angle of rotation or at least to make the angle determination more certain. The offsets may vary from a minimum value or minimal value to a maximum value or maximal value. In certain embodiments, the offsets rangte from zero percent (0%) to a maximum of ten present (10%) of the screen dimensions. For example, if the screen has a y dimension of 6" and an x dimension of 12", then the y offset may vary between 0% of the y dimension (0 inches) to a maximum of 10% of the y dimension (0.6 inches) and the x offset may vary between 0% of the x dimension (0 inches) to a maximum of 10% of they dimension (0.9 inches). For xy offsets, the values may range from the some of y and x offset values or any other combination of the values and the direction may be fixed or dynamically adjusted to minimize obstruction. It should be recognized that the offset ranges may be any range contained within the minimum and maximum. Additionally, the maximum offset may be greater the 10%, but generally less than 50% of the screen dimensions. Of course, as the location approaches one of the edges of the screen, the offset may change direction to maximize non-obstructed views of the image elements. In other embodiments, the offset may be a fixed value between 0% and 10% of the screen dimensions. In other embodiments, the offset is minimal as the bottom of the screen and proceeds to a maximum as the location progresses up the screen towards the top of screen, reaching a maximum value at a y value of 50% of the y dimension. In other embodiments, offset is minimal at the bottom edge, i.e., the ray points straight down from the location to the corresponding location on the image.

In another embodiment, the ray emanating from the touch point on the screen or emanating from a sensed movement within the active zone of the motion sensor will point directly down from the contact or movement. When the user moves on the screen or moves in the active zone of the motion sensor, the ray pointer will radiate in the direction of motion across the image or within the 3D AR environment. Velocity, acceleration, displacement, or other aspects of motion and time, including holds, may be used to change the angle and extrapolation of the vector or ray, to be able to change the interaction abilities. In any event, the distal end of the ray pointer acts as a cursor for selecting object and/or features, characteristics, and/or and attributes as it moves within the image or within the 3D AR overlaid environment. In a video environment, the actions may correspond to designating video frames, frame rates, or content in a single or multiple frames, including the combined actions or attributes of content within the frame(s).

In another embodiment, the use of a pen or pencil or other held device may be used to represent a ray. The axis of the device may be used to act as a ray emitter, where the ray projects from the device and into the "mid air", or area behind the surface. In this way, the intersection of the device with the surface is much like a flashlight or beam extending from the flashlight beam into water from a distance, interacting with the objects. By not moving the tip of the device, but changing the angle and axis of the device relative to the surface, a ray may be cast at almost any angle. This may be combined with the actual movement of the device on the surface to create more interactions, and even with events that happen above the surface, such as a pen being held above a display surface, and appearing to extend to the surface and below the surface, interacting with the environment or each part of the environment, or a combination of parts.

In another embodiments, the offset if actually a bending of the ray from the touch point or movement across the image or within the 3D AR overlaid environment. In another embodiment, the ray pointer is a beam that expands as it radiates from the touch point or movement across the image or within the 3D AR overlaid environment so that the distal end of the pointer covers an area or a volume of the image or the 3D AR overlaid environment so that all objects and/or features, characteristics, and/or attributes within the area or volume may be simultaneously selected, activated, animated, and/or manipulated. The expansion may be preset or dynamic based on the type of touch or type of sensed motion—greater touch down force or greater screen coverage area increases a size of the area or the volume, or faster movement increases a size of the area or the volume or faster acceleration increases a size of the area or the volume.

For the purposes of this disclosure, a 3D AR environment is 3D construct overlaid on an image captured by the rear facing camera and displayed on the display device of a mobile or stationary device. The 3D AR environment includes virtual object representations of objects and/or features, characteristics, and/or attributes identified by the systems, apparatuses, interfaces and methods implementing them in the image. For example, if the image is a book or pages of the book, then the 3D AR overlaid environment will include the objects identified on the book or book pages. In certain embodiments, the systems, apparatuses, interfaces and methods implementing them will allow a user to simultaneously interact seamlessly with both virtual objects and real objects or to simultaneously control both virtual objects and real objects and/or features, characteristics, and/or attributes, or real controls of virtual attributes, c.f., VR systems and methods allow the user to see and interact only with virtual objects within a VR environment. Systems, apparatuses, interfaces and methods implementing them that allow users to simultaneously interact with virtual objects and real objects are sometimes referred to as an AR environments or mixed reality (MR) environments.

In certain embodiments, the AR systems, apparatuses, interfaces and methods implementing them of this disclosure may be understood in an implementation on a tablet, phone or any mobile or wearable device—a device including a rear facing camera, optionally a front facing camera, at least one motion sensor, other sensors, at least one processing unit, and a display device and of course a power supply generally a battery. The user moves the tablet so that the rear facing camera is focused on a book or a page or pages thereof, i.e., the user moves the tablet so that it "sees" the book or book page or pages. In other embodiments, the tablet may be held above the book or book page or pages. This motion causes the processing unit to display the book or page or pages thereof on the display device, the tablet screen, so that the person sees an image of the real book, page or pages on the tablet screen. Once the image appears on the tablet screen, the user no longer interacts with the real book or page or pages thereof, but interacts with the image of the book, page or pages on the tablet screen. If the user moves to the side, the user is able to see both the image and the actual book, page or pages.

Using the motion based processing systems, apparatuses, interfaces, and methods implementing them of this disclosure, the motion sensor, here a camera or the display (touchscreen), senses motion sufficient to activate a 3D AR environment application. Once activated, the processing unit causes a 3D VR/AR environment to be constructed and overlaid on top of the image. The application then causes the processing unit to scan the image and identify objects and/or features, characteristics, and/or attributes associated with the book, page, or pages. Once identified and stored in a list or lists, a 3D AR environment is overlaid on the image, allowing the user to select, activate, animate, and/or manipulate the objects and/or features, characteristics, and/or attributes within the 3D AR overlaid environment. The identified objects and/or features, characteristics, and/or attributes become controllable virtual objects and/or features, characteristics, and/or attributes within the 3D AR overlaid environment.

Once the 3D AR environment is constructed, the user may begin to interact with the environment. When the user touches the screen or moves within an active zone of the motion sensor, the processing unit generates a ray pointer that emanates from the point of contact on the touchscreen or from the location of the initial movement of a body part such as a finger within the active zone of the motion sensor. The distal end of the ray pointer acts as a cursor for selection, activation, animation, and/or manipulation of the VR objects representing the scanned objects, and/or features, characteristics, and/or attributes. Selection of an AR/VR object results in the appearance of a 2D object coming to life as 3D images within the 3D AR environment. In certain embodiments, the selected AR/VR objects are typically animated, with the user able to control the AR/VR objects within the 3D AR overlaid environment using motion based processing so that the object undergoes the motion sensed by touching the screen or moving in the active zone of the motion sensor. The user uses the ray pointer to move the constructed VR objects within the 3D AR environment overlaid on the image. The VR objects are 3D constructs that may be manipulated and controlled within the 3D AR environment. As 3D constructs, the user will see the objects and/or features, characteristics, and/or attributes as 3D renderings that may be seen from the front, sides, back, etc. depending on the viewing perspective of the image and 3D AR overlaid environment. Currently, systems, apparatuses and interfaces use control buttons on the tablet surface and/or motion on the tablet screen to select, activate, animate and/or manipulates the VR constructs within the 3D AR environment overlaying the image. In most systems, apparatuses and interfaces virtual buttons appear on the surface to allow color changes, sound, sound changes, etc. Current systems, apparatuses and interfaces use pinch-zoom gesture to zoom in/out. The present systems, apparatuses, interfaces, and methods implementing them facilitate interactions that appear to occur below the level of the surface, where interactions may appear to occur at the locations of objects, below the surface.

In certain embodiments, the pointer emanating from the contact point or location of sensed motion within the active zone of the motion sensor as a ray or beam, where the distal end moves through the 3D AR environment. In other embodiments, the pointer may be a disturbance pattern emanating from the contact point or location of sensed motion within the active zone of the motion sensor, where the distal end evidenced by the disturbance pattern moves through the 3D AR environment. In other embodiments, the pointer may be an extension of the finger emanating from the contact point or location of sensed motion within the active zone of the motion sensor, where the distal end moves through the 3D AR environment. In other embodiments, the pointer may emanate from above a surface, while projecting to the surface, then acting like a surface interaction, or may go directly through the surface to the object. Again, the pointer may include an offset or may be directionally or velocity/acceleration/time/distance/displacement sensitive as described above and below. Of course, the pointer may be any construct that emanates from the contact point or location of sensed motion within the active zone of the motion sensor, where the distal end moves through the 3D AR environment. Once the 3D AR environment is constructed and populated with VR objects corresponding to the identified image objects and/or features, characteristics, and/or attributes, the motion-based control methods described herein may be used to select, activate, animate, and/or manipulate the objects and/or features, characteristics, and/or attributes. Thus, the pointer appears to extend into the 3D AR environment permitting the user to effectively interact with all objects and/or features, characteristics, and/or attributes populating the 3D AR environment.

This extension acts something like light refracted in water, except it is not a consistent angle. The "ray" typically (but not always) needs to appear above or to the side of the finger touching the screen, so the finger does not cover anything in the image. This means that moving near the bottom of the screen causes no refraction or no bending of the ray or minimal refraction or bending of the ray (a smaller angle of refraction between about 0° and 5°). As the finger moves towards a center area, the refraction angle increases to between 5° and about 10°. This effect is somewhat like a flashlight beam being shined in the water. This angle would change in a gradient manner, so it feels like a gradual change in extension angle, and adapts to the user's movement. For instance, as the user slides a finger faster towards the top of the display, the bend/refraction angle becomes greater, and then becomes less as the user slides more slowly. As the finger moves sideways, it may bend slightly more. Moving to the right may bend or offset the ray to the right of the finger, moving to the left may bend or offset the ray to the left. Typically, the ray would just remain above the finger and not move left or right, but this is all configurable.

When the ray comes in contact with a zone, volume, object or other thing, the object or interactive zone may respond providing feedback to the user that an interaction is available. The ray becomes an extension of the touch event, so moving the touch event location moves the extension, which interacts with the objects and environment. The ray may be any form, and may include an feedback to the user such as an audible, tactile, thermal, electrostatic, or any other type of feedback, or any combination thereof. The same thing may be performed without touching, and may use other sensors besides touch. In the systems, apparatuses, interfaces and methods implementing them, human motions are sensed by sensor(s), converted into output commands that are then represented by a generated displayed object (ray) moveable within the overlaid AR environment that acts as an interaction device for objects in the overlaid AR environment. Display interaction for the tablet or other display system may act independently than the extended interactions.

The ray may not be seen if desired, but the effect is the same.

The display device may be of any type—mobile, fixed, worn, or any other type. The sensors may be of any type. The body parts may be any body part, or any object under the control of the body part. This may be coupled with audible controls, so the user may virtually point to a VR object and say "turn", etc. The objects may be the VR environment, or any controllable object, feature, characteristic, and/or attributes within the environment. This extension and interaction may also apply to full virtual reality (VR), augmented reality (AR), mixed reality (MR), cross reality (XR), cinematic reality (CR), or other environments that blend real objects and virtual constructs.

Embodiments of this disclosure provide apparatuses, systems, and interfaces including: (a) a display device; (b) a camera configured to: (i) capture an image, and (ii) generate image output corresponding to the captured image; (c) a motion sensing device having an active zone and configured to: (i) detect movement within the active zone, and (ii) generate movement output corresponding to the movement, wherein the movement includes movement properties and wherein the movement properties may include a touch down event; (d) a processing unit configured to: (i) receive the image output, (ii) identify objects, object features, object characteristics, object properties, object attributes, and image features, image characteristics, image properties, and/or image attributes; (iii) generate a 3D AR construct corresponding to the capture image, (iv) generate virtual objects corresponding to the identified objects, object features, object characteristics, object properties, object attributes, and image features, image characteristics, image properties, and/or image attributes; (v) populate the AR 3D construct with the generated virtual objects, wherein the virtual objects correspond to their associated appearance in the image or repositioned to improve user interaction; (vi) cause the display device to display the captured image and the AR 3D construct including the virtual objects; and (vii) in response to the movement, (1) determine a location of the movement, (2) generate a ray from the location to a corresponding location on the captured image, wherein the ray includes an offset based on the location so that objects, features, properties, characteristics, and/or attributes are not obscured and wherein the offset varies from a minimal offset to a maximum offset depending on the location, (3) cause the display device to display the ray emanating from the location to a corresponding location on the captured image, and (4) indicate the object, feature, property, characteristic, and/or attribute in the 3D AR construct contacted by a distal end of the ray or closest to the distal end of the ray; and (vi) in response to further movement detected by the motion sensing devices, activate the indicated object feature, property, characteristic, and/or attribute.

In certain embodiments, the distal end of the ray may comprise an area or volume and the indications and selections are based on the number of virtual objects contacted by or closest to the area or volume. In other embodiments, the ray has a volume and the distal end comprise an area or volume and the indications and selections are based on the number of virtual objects contacted by or closest to the area or volume.

In other embodiments, the processing unit is further configured to: in response to further movement output from the motion sensing device, cause the display device to indicate one or more virtual objects that are aligned or substantially aligned with a direction of the first motion, and cause the display device to indicate a selection of a single virtual object of the virtual objects, but no other virtual object of the plurality of one or more virtual objects, in response to a second input indicating a further motion sensed by the motion sensing device, wherein the movement is from a first location to a second location on the captured image, and wherein the further movement is determined to be substantially towards the particular virtual object, is determined to intersect the particular virtual object, or predicted correspond to the particular virtual object.

In other embodiments, the indication comprises moving the one or more virtual objects in the direction of the first motion or in an opposite direction to the first motion and moving the one or more virtual objects away from each other so that the further motion will permit discrimination of the single virtual object from the one or more virtual objects. In other embodiments, a speed of the first motion controls a rate of moving the one or more virtual objects in the opposite direction to the first motion and controls a rate of moving the one or more virtual objects away from each other so that the further motion permits discrimination of the single virtual object from the one or more virtual objects.

In other embodiments, the indication further comprises fading at least one of VR/AR object not aligned with or substantially aligned with the direction of the first motion. In other embodiments, the indication further comprises moving the at least one faded virtual object away from the one or more virtual objects. In other embodiments, the indication further comprises fading all virtual objects not aligned with or substantially aligned with the direction of the first motion. In other embodiments, the indication further comprises moving the faded virtual objects away from the one or more virtual objects. In other embodiments, the processor is further configured to: confirm the selection of the single virtual object in response to a third input from the same motion sensing device or from a different device. In other embodiments, the third input is received after the output of the indication that the single virtual object is selected. In other embodiments, the motion sensing device and the different device comprises an eye tracking sensor, gloves, a body sensor, a camera, an optical sensor, a motion sensor, or a combination thereof.

Embodiments of this disclosure provide methods implemented on an apparatus comprising: (a) a display device, (b) a camera, (c) a motion sensing device or a motion sensing array, and (d) a processing unit, wherein each sensing device or array has an active zone. The methods include capturing, via the camera, an image; generating, via the camera, an image output corresponding to the captured image; identifying, via a processing unit, objects, object features, object characteristics, object properties, object attributes, and image features, image characteristics, image properties, and/or image attributes; generating, via a processing unit, a 3D AR construct corresponding to the capture image, generating, via a processing unit, virtual objects corresponding to the identified objects, object features, object characteristics, object properties, object attributes, and image features, image characteristics, image properties, and/or image attributes; populating, via a processing unit, the AR 3D construct with the generated virtual objects, wherein the virtual objects correspond to their associated appearance in the image or repositioned to improve user interaction; and causing, via a processing unit, the display device to display the captured image and the AR 3D construct including the virtual objects. The methods further include detecting, via the motion sensing device or array, a first movement within the active zone; generating, via a motion sensing device or array, a first movement output corresponding to the first movement, wherein the first movement includes motions properties and wherein the motion properties may include a touch down event; receiving, via a processing unit, the first movement output, in response to the first movement, determining, via a processing unit, a location of the movement, generating, via a processing unit, a ray from the location to a corresponding location on the captured image, wherein the ray includes an offset based on the location so that objects, features, properties, characteristics, and/or attributes are not obscured and wherein the offset varies from a minimal offset to a maximum offset depending on the location, causing, via a processing unit, the display device to display the ray emanating from the location to a corresponding location on the captured image, and indicating, via a processing unit, the object, feature, property, characteristic, and/or attribute in the 3D AR construct contacted by a distal end of the ray or closest to the distal end of the ray; in response to further movement detected by the motion sensing device or array, activating, via a processing unit, the indicated object feature, property, characteristic, and/or attribute.

In certain embodiments, the distal end of the ray may comprise an area or volume and the indications and selections are based on the number of virtual objects contacted by or closest to the area or volume. In other embodiments, the ray has a volume and the distal end comprise an area or volume and the indications and selections are based on the number of virtual objects contacted by or closest to the area or volume.

In other embodiments, the methods further include: in response to a further movement output from the motion sensing device or array, causing, via a processing unit, the display device to indicate one or more virtual objects that are aligned or substantially aligned with a direction of the first motion, and causing, via a processing unit, the display device to indicate a selection of a single virtual object of the virtual objects, but no other virtual object of the plurality of one or more virtual objects, in response to a second input indicating a further motion sensed by the motion sensing device, wherein the movement is from a first location to a second location on the captured image, and wherein the further movement is determined to be substantially towards the particular virtual object, is determined to intersect the particular virtual object, or predicted correspond to the particular virtual object.

In other embodiments, the indication comprises moving the one or more virtual objects in the direction of the first motion or in an opposite direction to the first motion and moving the one or more virtual objects away from each other so that the further motion will permit discrimination of the single virtual object from the one or more virtual objects.

In other embodiments, a speed of the first motion controls a rate of moving the one or more virtual objects in the opposite direction to the first motion and controls a rate of moving the one or more virtual objects away from each other so that the further motion permits discrimination of the single virtual object from the one or more virtual objects.

Systems, Apparatuses, and/or Interfaces and Methods Using Blob Data

Embodiments of this disclosure provide systems, apparatuses, and/or interfaces and methods for implementing them, where the systems, apparatuses, and/or interfaces include at least one sensor, at least one processing unit, at least one user cognizable feedback unit, and one or a plurality of real and/or virtual objects controllable by the at least one processing unit, where the at least one sensor senses blob (unfiltered or partially filtered) data associated with touch and/or movement on or within an active zone of the at least one sensor and generates an output and/or a plurality of outputs representing the blob data, and where the at least one processing unit converts that blob data outputs into a function or plurality of functions for controlling the real and/or virtual object and/or objects.

Embodiments of this disclosure provide methods for implementing systems, apparatuses, and/or interfaces including the steps of sensing blob data associated with touch and/or movement on or within an active zone of the at least one sensor, generating an output and/or a plurality of outputs representing the blob data, converting that blob data outputs or outputs into a function or plurality of functions via the at least one processing unit, and controlling a real and/or virtual object and/or a plurality of real and/or virtual objects via the processing unit executing the function and/or functions. Blob data may be used in comparison or combination with centroid, or center of mass data (filtered blob data reducing the blob data to an averaged point or small zone average of blob data).

The inventor has found that movement based systems, apparatuses, and/or interfaces and methods implement them, where the systems, apparatuses, and/or interfaces include at least one sensor, at least one processing unit, at least one user cognizable feedback unit, and one real and one real or virtual object or a plurality of real and/or virtual objects controllable by the at least one processing unit, where the at least one sensor senses blob data associated with touch and/or movement on or within an active zone of the at least one sensor and generates an output and/or a plurality of outputs representing the blob data, and where the at least one processing unit converts that blob data outputs into a function or plurality of functions for controlling the real and/or virtual object and/or objects.

Embodiments of the systems, apparatuses, and/or interfaces of this disclosure and methods implementing them broadly relate to using blob data as a source of movement data for analyzing, determining, and predicting movement and movement properties, where movement is understood to mean sensing movement meeting a threshold measure of motion by a motion sensor, a plurality of motion sensors or an array of motion sensor for use in motion based object control, manipulation, activation and/or adjustment. Blob data comprises raw motion sensor data representing sensor elements that have been activated by presence and/or movement within an active area, volume or zone of the proximity and/or motion sensor(s). In the case of a touch screen including a large plurality of touch elements, touching the screen produces raw output data corresponding to all touch elements activated by the area of contact with the screen and comprise the blob data for touch screen or other pressure sensors or field density sensor or sensor including activatable pixels or any other sensor that include elements that are activated when a threshold value associated with the element is exceeded (pressure, intensity, color, field strength, weight, etc.). The term "activate" as it relates to touch elements means that touch elements within the contact area produce touch element outputs above a threshold level set either by the manufacturer or set by the user. For other types of sensors, movement within an active sensing zone of the sensors (e.g., areas for 2D devices, volumes for 3D devices) will activate an area and/or a volume within the zone. These areas and volumes represent the "blob" data for each type of device and comprises elements having a value exceeding some threshold value for activating the elements. For image based sensors, the activate elements will generally comprise pixels having a threshold value of pixel values. For capacitive sensors or inductive sensors or electromagnetic field (EMF) sensors, the blob data will relate to areas or volumes corresponding to sensor elements that meet a threshold output for the sensors.

The blob data (activate element area or volume) will change with changes in contact, pressure, and/or movement of any kind. The blob data represents an additional type of data to control, manipulate, analyze, determine, and predict movement and movement properties. The blob data may be used to identify a particular finger, to differentiate between different fingers, to determine finger orientations, to determine differences in pressure distributions, to determine tilt orientations, and/or to determine any other type of change in the blob data.

In the biokinetic applications, the blob data with or without the addition of filtered data (center of contact, center of pressure, or other types of centroid data) may be used to create a proportionate and/or unique user identifier. Not only may blob and centroid data be biometric identifiers, but the relationship between the two is a more unique biometric, or electro-biometric identifier. The systems, apparatuses, and/or interfaces of this disclosure may also include sensing, determining, and analyzing the blob data and determining and analyzing filtered data or centroid data for use in analyzing, determining, and predicting movement and movement properties for use in motion based object control, manipulation, activation and/or adjustment of this disclosure. For example, a user places a thumb on a phone touch screen. In doing so, the blob data may be used to identify which thumb is being used or to confirm that the thumb belongs to a particular user. If the touch screen also may include temperature sensors, then the blob data may not only be used to differentiate and identify particular thumbs (or fingers, irises, retinas, palms, etc.) alone or in conjunction with other movement data based on a shape of the blob data or output signal and a direction to which the blob data or blob data and centroid data may be pointing or oriented. This technique may be used to directly turn a knob using a pivoting movement versus using movement of a centroid, where the thumb is represented as a point and movement of the centroid from one point to another is used to determine direction. Using blob data allows the user to select zones, control attributes, and/or select, scroll, activate, and/or any combination of these, the systems and methods of this disclosure simply by pivoting the thumb. Then moving the thumb in a direction may be used to activate different commands, where the blob data movements may be used to accentuate, to confirm, to enhance, and/or to leverage centroid data. For examples, pivoting the thumb while in contact with the touch screen results in blob data that may be used to determine finger orientation and/or tilt, allowing the user to select between groups or fields of objects (for example), or through pages of data or objects. Once the user scrolls and selects a particular group or field, further movement results in a different set of set of controls, instructions, commands, attributes, etc. The systems and methods may use the blob data to "see" or anticipate movement attributes (direction, pressure distribution, temperature distribution, speed (linear and angular), velocity (linear and angular), acceleration (linear and angular), etc. The systems and methods may use the blob data, the centroid data or a combination of the two types of data to analyze, determine and/or predict or anticipate user movement. The transition from blob data to centroid data may also be used to see or anticipate user intent. For example, as a user twists or pivots the thumb, then begins to move towards an object, zone or location, the thumb may begin to roll in a lifting motion, rolling up towards the tip of the thumb, providing less of a pattern and more of a typical centroid touch pattern on the screen. This transition may also provide user intent through not only movement in an x/y plane, but also providing shape distinctions that may be used for commands and other functions. The rocking of the thumb or finger (rocking from a flat orientation to a tip orientation) may also provide z-axis attributes or functions. This may also be combined with movement while rocking. In 3D environments, the blob and/or centroid data (along with other movement attributes such as direction, pressure distribution, temperatures distribution, etc.) maybe used, but instead of blob data, pixilation in 3D in any environment, or volumetric differences (sensed in any way) along axes (plural) may be used in the same way as blob and/or centroid data to analyze, determine, anticipate, and/or predict user intent. These aspects may also be seen or used as a "field" of influence determinative. In these embodiments, temperature may be used for a number of different purposes. First, the temperature data may be used to ensure that the motion sensor is detecting a living person. Second, the temperature data may be used as data to ensure that the user sensed within the active zones of the sensor or sensors is indeed the user that has access to the systems and methods on the particular device. Of course, temperature data is not the only data that the sensors may determine. The sensors may also capture other user specific data.

In certain embodiments, the systems and methods of this disclosure include controlling a hologram remotely or by interacting with it. Pivoting the hand in parallel with a field may provide one control, while changing an angle of the hand may be perceived as a "blob" data change, a transition to centroid data, or a combination thereof. This transition may also be represented on a display as going from a blob to a point, and the transition may be shown as a line or vector with or without gradient attributes. Putting these into the hologram example, changing from blob data to centroid data, and seeing a vector and a gradient of change of volume or area along the vector may be used to change the display in the hologram of a shoe (for example) so the shoe may change size and direction according to the movement of the user. This methodology may be performed in any conceivable predetermined or dynamically controllable way, where attributes may be any single or combination of intent, attribute, selection, object, command or design. These movements and/or movement attributes may be simultaneously or sequentially used in any environment, and in whole or part, and include gradients of attributes based on changes of perceived mass, pressures, temperature, volume, area, and/or influence. These changes may be sensed and defined by any sensor or software reproduction ability (software may be used to replicate movement or the effects of movement). This also allows for a 2D sensor to provide 3D controls. All this may also be used to determine unique BioKinetic identifiers as well and in combination with these attributes.

In certain embodiments, the systems and methods of this disclosure include using blob data to orient a menu appropriately, where the blob data comprises raw sensor output data based on a number of sensing elements being activated above the threshold activation. For example, in the case of a touch screen, when a user touches the screen with a finger tip or other part of a finger, the sensor generates a blob of data comprising all sensing elements activated (based on some threshold activation value). The data is generally used to determine a centroid of the contact and that value is then used in further processing. However, the blob data may be used not only to differentiate different users, but may also be used to predict or anticipate user movement and ascertain movement and changes in movement. By knowing which thumb or finger is located at what area of the screen, the displayed menu upon a touch or entry into a sensor area may be positioned to provide a best heuristics or positioning based on the touch area and or user movement. For instance, touching the right thumb on a right side of a phone screen in a lower quadrant may signal the systems or methods to display a menu along a radius just above the thumb, while an angle of the thumb when touching a middle of the screen may result in displaying a radial menu just below the thumb if the thumb was pointing upwards towards an opposite corner, or above the thumb if the thumb was pointing towards a bottom left corner.

In certain embodiments, the systems and methods of this disclosure include one menu appearing when touching an upper part of the screen and a different menu appearing when touching a different part of the screen such as a lower part of the screen. If the finger is flat and not angled when touching the screen, different menus may be activated. So the position of the finger, finger angle, finger direction, finger pressures distribution, and/or combinations thereof may result in different menu sets, object sets, attribute sets, command sets, etc., and/or mixtures of combinations thereof for further processing based on movement data. Of course, all of these concepts may be equally applied to 2D, 3D, 4D, or other multi-dimensional environments both real, augments and/or virtual.

Suitable Components for Use in the Invention

The motion sensors may also be used in conjunction with displays, keyboards, touch pads, touchless pads, sensors of any type, pens, pencils, remotes, or other devices associated with a computer, a notebook computer or a drawing tablet or any mobile or stationary device. The motion sensors may be optical sensors, acoustic sensors, thermal sensors, optoacoustic sensors, any other sensor or combination of sensors that senses movement or changes in movement, or mixtures or combinations thereof. The sensors may be digital, analog or a combination of digital and analog. For camera systems, the systems may sense motion within a zone, area or volume in front of the lens. Optical sensors may operate in any region of the electromagnetic spectrum including, without limitation, RF, microwave, near IR, IR, far IR, visible, UV or mixtures or combinations thereof. Acoustic sensor may operate over the entire sonic range which includes the human audio range, animal audio ranges, or combinations thereof. EMF sensors may be used and operate in any region of a discernable wavelength or magnitude where motion can be discerned. Moreover, LCD screen(s) may be incorporated to identify which devices are chosen or the temperature setting, etc. Moreover, the interface may project a virtual control surface and sense motion within the projected image and invoke actions based on the sensed motion. The motion sensor associated with the interfaces of this invention can also be acoustic motion sensor using any acceptable region of the sound spectrum. A volume of a liquid or gas, where a user's body part or object under the control of a user may be immersed, may be used, where sensors associated with the liquid or gas can discern motion. Any sensor being able to discern differences in transverse, longitudinal, pulse, compression or any other waveform could be used to discern motion and any sensor measuring gravitational, magnetic, electro-magnetic, or electrical changes relating to motion or contact while moving (resistive and capacitive screens) could be used. Of course, the interfaces can include mixtures or combinations of any known or yet to be invented motion sensors.

Suitable electrical devices, hardware devices and/or appliances capable of being controlled by the control systems and/or switches of this invention, include, without limitation, any electrical and/or hardware device or appliance having attributes which can be controlled by a switch, a joy stick or similar type controller, or software program(s)

and/or object(s) and/or elements, objects and attributes, and/or attributes. Exemplary examples of such attributes include, without limitation, ON, OFF, intensity and/or amplitude, impedance, capacitance, inductance, software attributes, lists or submenus of software programs or objects, virtual and/or real objects in a display, mobile device or gaming system, or any other controllable electrical and/or electro-mechanical function and/or attribute of the device. Exemplary examples of electrical devices and/or appliances include, without limitation, environmental controls, building systems and controls, lighting devices such as indoor and/or outdoor lights or light fixtures, cameras, ovens (conventional, convection, microwave, and/or etc.), dishwashers, stoves, sound systems, mobile devices, display systems (TVs, VCRs, DVDs, cable boxes, satellite boxes, and/or etc.), alarm systems, control systems, energy management systems, medical devices, robots, robotic control systems, UAV, equipment and machinery control systems, hot and cold water supply devices, air conditioning system, heating systems, ventilation systems, air handling systems, security systems, computers and computer systems, chemical plant control systems, manufacturing plant control systems, satellite control systems, computer operating systems and other software systems, objects or programs, remote control systems, or the like or mixtures or combinations thereof.

Suitable systems that are amenable to control by the interface of this invention include, without limitation, any analog or digital processing unit or units having single or a plurality of software products installed thereon and where each software product has one or more adjustable attributes associated therewith, or singular software programs or systems with one or more adjustable attributes, menus, lists or other functions or display outputs. Exemplary examples of such software products include, without limitation, operating systems, graphics systems, business software systems, word processor systems, business systems, online merchandising, online merchandising systems, purchasing and business transaction systems, Kiosks and educational or informational systems, databases, software programs and applications, interne browsers, accounting systems, inventory systems, inventory display systems, military systems, control systems, or the like, or mixtures or combinations thereof.

Suitable digital processing units (DPUs) include, without limitation, any digital processing unit capable of accepting input from a singular or plurality of devices, touches, or objects and converting at least some of the input into output designed to select and/or control attributes of one or more of the devices or objects. Exemplary examples of such DPUs include, without limitation, microprocessor, microcontrollers, or the like manufactured by Intel, Motorola, Erricsson, HP, Samsung, Hitachi, NRC, Applied Materials, AMD, Cyrix, Sun Microsystem, Philips, National Semiconductor, Via Electonics, Qualcomm, or any other manufacture of microprocessors or microcontrollers.

Suitable analog processing units (APUs) include, without limitation, any analog processing unit capable of accepting input from a singular or a plurality of devices, touches, or objects and converting at least some of the input into output designed to control attributes of one or more of the devices or objects. Such analog devices are available from manufacturers such as Analog Devices Inc.

Suitable motion sensing apparatus include, without limitation, motion sensors of any form such as digital cameras, optical scanners, optical roller ball devices, touch pads, inductive pads, capacitive pads, holographic devices, laser tracking devices, thermal devices, EMF sensors, wave form sensors, any other device capable of sensing motion, changes in EMF, changes in wave form, or the like or arrays of such devices or mixtures or combinations thereof.

DETAILED DESCRIPTION OF THE DRAWINGS

AR Environments

FIGS. 1A-G depict views of an embodiment of systems, apparatuses, and/or interfaces and methods implementing them of this disclosure uses a camera to capture an image an object/scene and display the captured image on the display device. The systems, apparatuses, and/or interfaces and methods implementing them uses a processing unit to construct a 3D AR interactive environment overlaid on the image including virtual objects corresponding to the objects. FIG. 1H-I depict other views of an embodiment of systems, apparatuses, and/or interfaces of this disclosure using a camera to image an object/scene and display the object/scene on the display device and construct a 3D AR interactive environment overlaid on the image. FIG. 1J-N depict views of another embodiment of systems, apparatuses, and/or interfaces of this disclosure using a camera to image an object/scene and display the object/scene on the display device and construct a 3D AR interactive environment overlaid on the image.

Description of FIGS. 1A-G

Looking at FIG. 1A, the systems, apparatuses, and/or interfaces, generally 100, is shown to include a tablet 102 including a touch screen 104, a rear facing camera 106 and a front facing camera 108. The touch screen 104 is shown to display a captured image 110 including a plurality of areas or zones 112—here the image 110 includes a grid of objects, areas, zones, and/or volumes, where the image is captured from one of the cameras. The systems, apparatuses, and/or interfaces 100 scans or displays the image 110 identifying the objects, areas, zone, and/or volumes and/or features, characteristics, properties, and/or attributes associated therewith and constructs a 3D AR environment 114 into which constructs of the objects, areas, zone, and/or volumes may be displayed and may be highlighted, selected, activated, animated, and/or manipulated. Of course, in certain embodiments, the object/scene that is imaged may be a smart object or scene meaning that upon capture, the object or scene may transmit to the systems, apparatuses, and/or interfaces 100 information on the object or scene including the object, scene objects, image features, image characteristics, image properties, image attributes, object features, object characteristics, object properties, and/or object attributes. It should be recognized that the captured image may include global and local features, characteristic, properties, and/or attributes which are represented in the 3D AR environment so that the features, characteristics, properties, and/or attributes may be manipulated, changed, deleted, and/or modified.

The systems, apparatuses, and/or interfaces 100 generate a ray or beam pointer that radiates from a point of contact on or near or proximate the touch screen 104 onto a corresponding point on the captured image or content within the 3D AR environment. The systems, apparatuses, and/or interfaces 100 utilize a static or variable offset so that the user's hand and/or finger and/or device under the user's control (e.g., pen, pencil, remote, or other handheld device) does not obscure objects, areas, zones, and/or volumes of the captured image and/or the 3D AR constructs. In this embodiment, the offset is zero or minimal at a bottom portion 104a of the touch screen 104 and increases as the point of contact moves from the bottom portion 104a towards a top portion 104b of the touch screen 104. The effect is illustrated here by a sequence of pointing finger hands 116a-e and ray pointers 118a-e. The first hand 116a is situated at the bottom portion 104a directly above an grid area 112a, where a ray pointer 118a points directly downward onto a corresponding point on the captured image and within the 3D AR environment. This provides the effect of the finger reaching beyond the surface of the tablet and into the virtual volume of space in the back of the tablet. As the user moves upwards, the offset may increase to a maximum value and then remains constant. The second hand position 116b is moved upward a little and the offset is small as illustrated by the ray 118b. The third hand position 116c is moved further upward and to the right and the offset increases as illustrated by the ray 118c. The fourth and fifth hand positions 106d&e are moved even further upward and to the right and the offset increases to a maximum and may remain at the maximum value regardless of how much further upward the contact point occurs as illustrated by rays 118d&e. In the systems, apparatuses, and/or interfaces 100, a distal end of the pointer acts like a cursor so that objects and attributes may be selected, activated, animated, and/or manipulated. In this case, the offset is shown as a pure y offset.

Figure 1B:
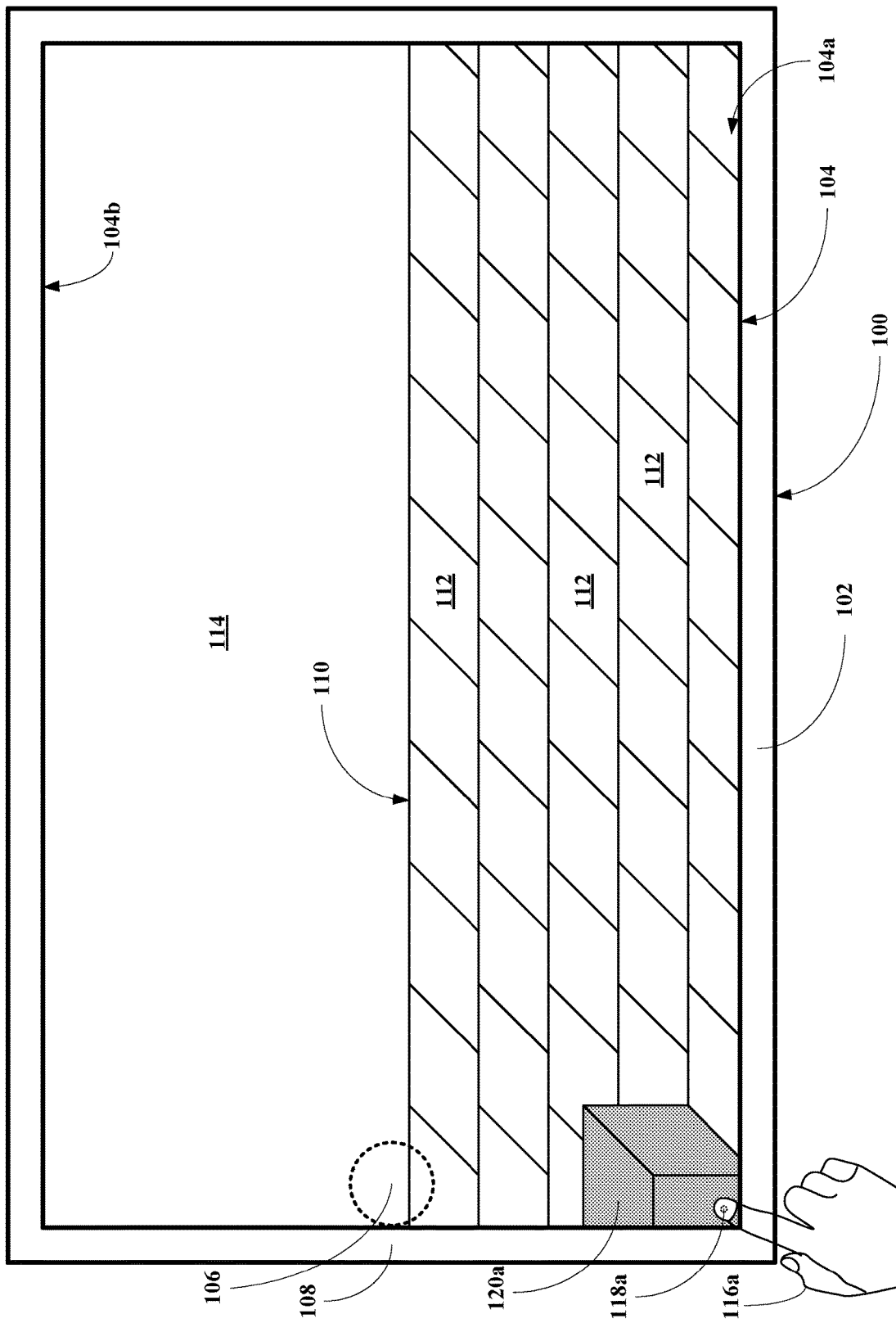
Figure 1C:
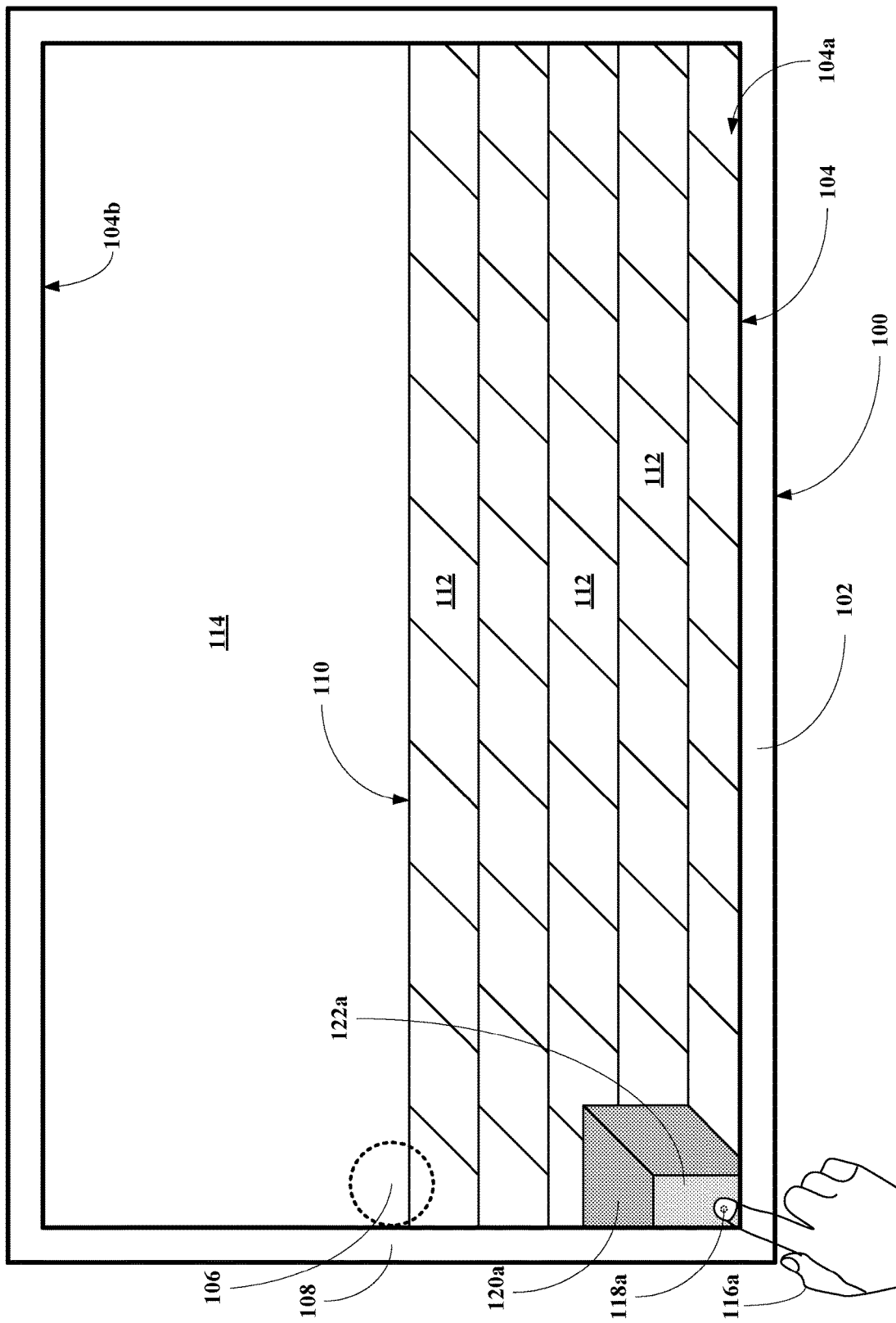

Looking at FIGS. 1B&C, the user touches the screen 104 as shown with the first hand 116a which causes the systems, apparatuses, and/or interfaces 100 to generate the ray pointer ray 118a pointing straight down (not visible in the display) causing a 3D AR construct 120a to be generated in the environment 114 corresponding to the object, area, zone, and/or volume 112a situated directly below the point of contact. The ray pointer 118a actually points to an attribute 122a to the 3D construct 120a, which becomes highlighted or animated or providing other feedback due to the distal end of the ray pointer 118a as shown in FIG. 1C.

Figure 1D:
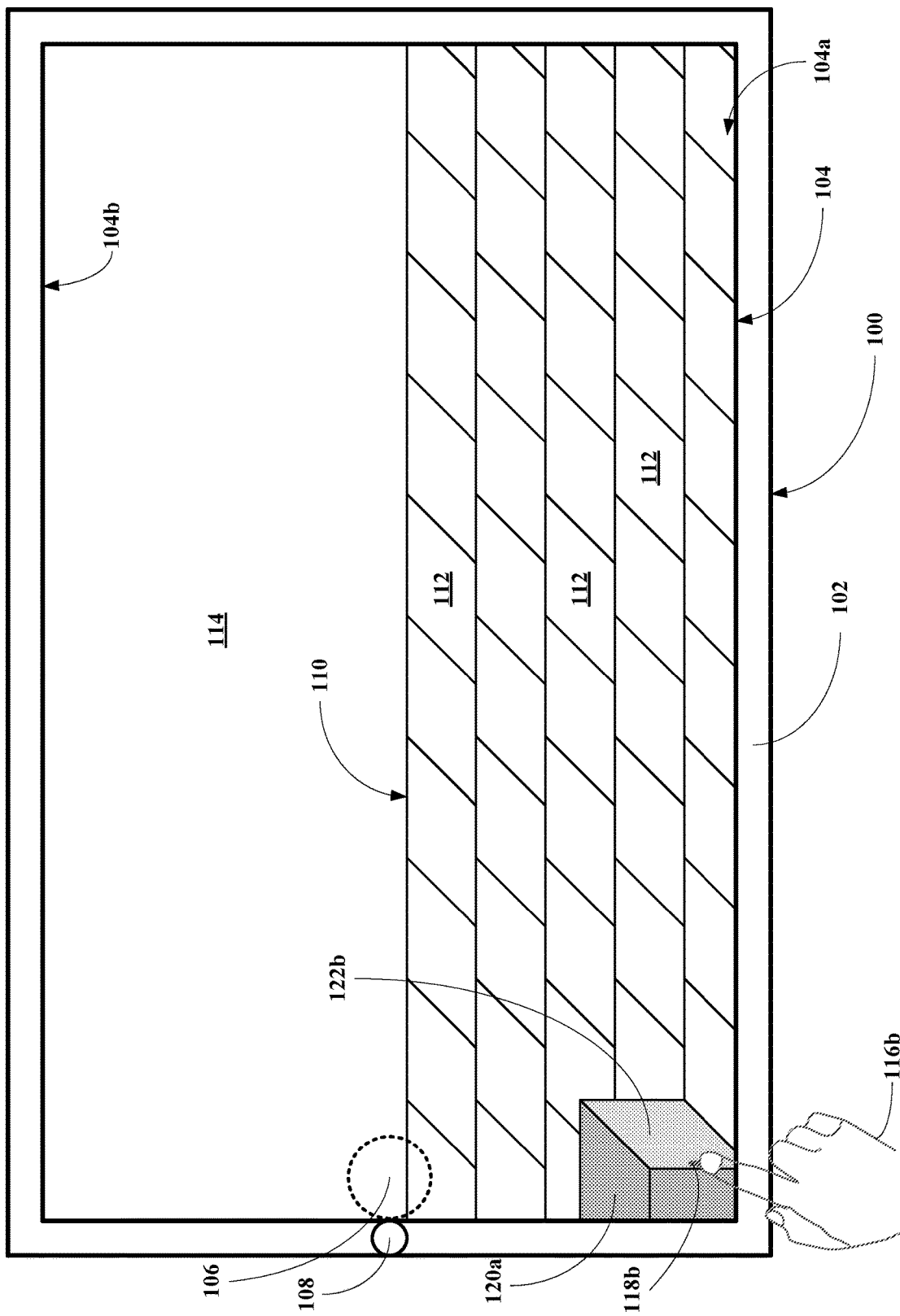

Looking at FIG. 1D, the user touches the screen 104 as shown by the second hand 116b which causes the systems, apparatuses, and/or interfaces 100 to generate the ray pointer ray 118b having an offset and causing another attribute 122b of the 3D AR construct 120a to be highlighted.

Figure 1E:
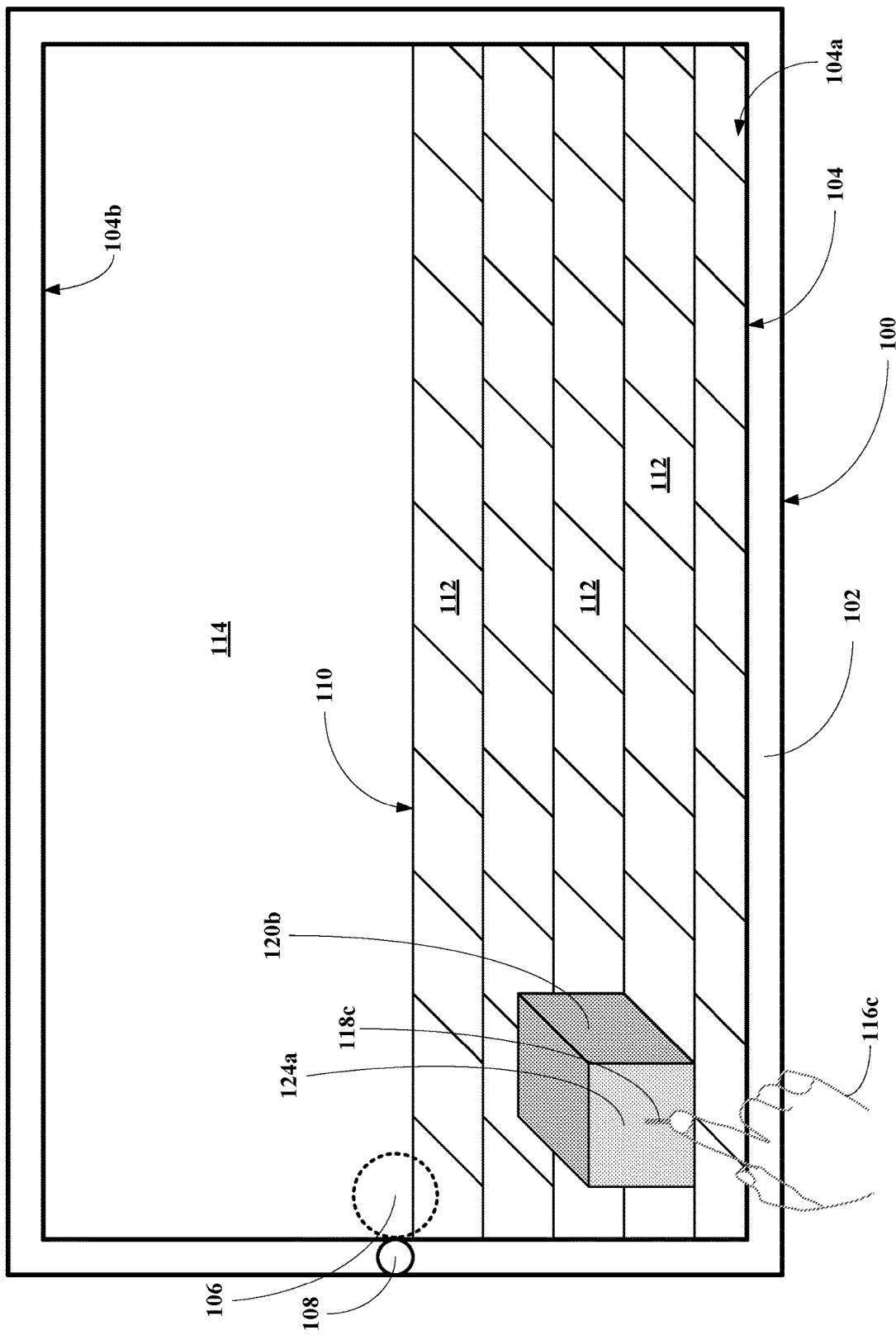

Looking at FIG. 1E, the user touches the screen 104 as shown with the third hand 116c which causes the systems, apparatuses, and/or interfaces 100 to generate the ray pointer ray 118c having a larger offset causing a 3D AR construct 120b to be generated in the environment 114 corresponding to the object, area, zone, and/or volume 112b contacted by the distal end of the pointer 118c. The ray pointer 118c actually points to an attribute 124a of the 3D AR construct 120b, which becomes highlighted due to the distal end of the ray pointer 118c as shown.

Figure 1F:
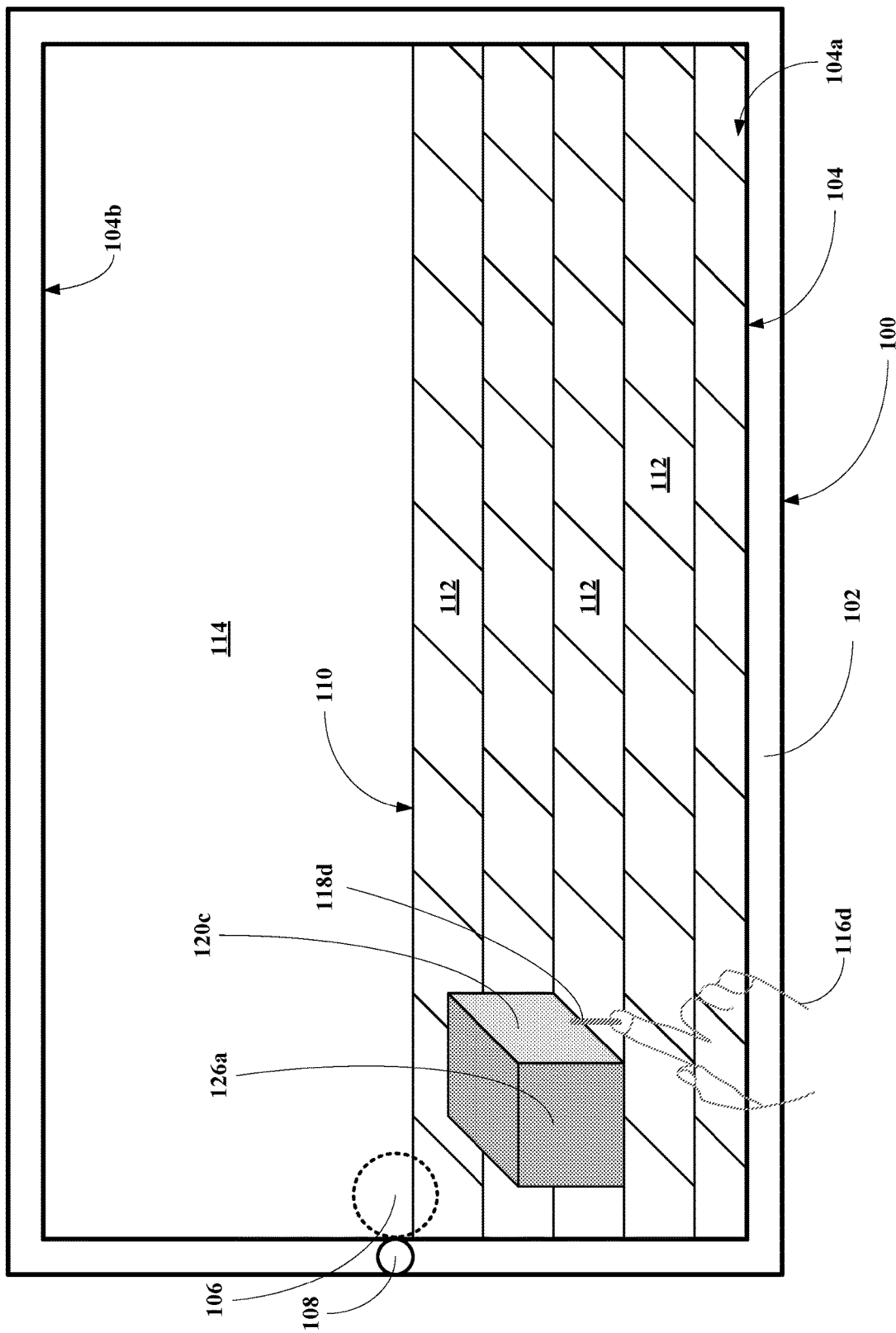

Looking at FIG. 1F, the user touches the screen 104 as shown with the fourth hand 116d which causes the systems, apparatuses, and/or interfaces 100 to generate the ray pointer ray 118d having the maximum offset causing a 3D AR construct 120c to be generated in the environment 114 corresponding to the object, area, zone, and/or volume 112c contacted by the distal end of the pointer 118d. The ray pointer 118d actually points to an attribute 126a to the 3D AR construct 120c, which becomes highlighted due to the distal end of the ray pointer 118d as shown.

Figure 1G:
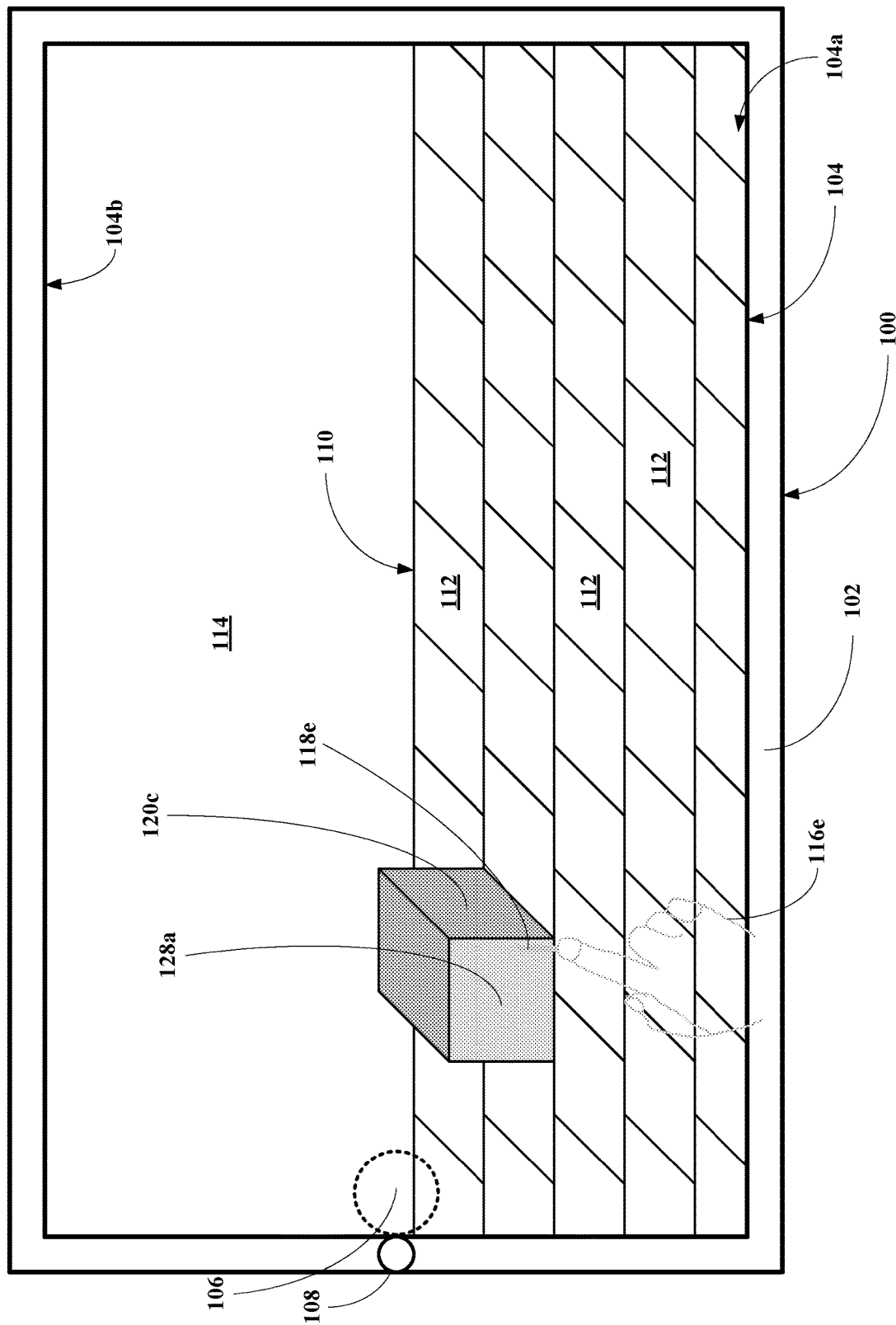
Figure 1I:
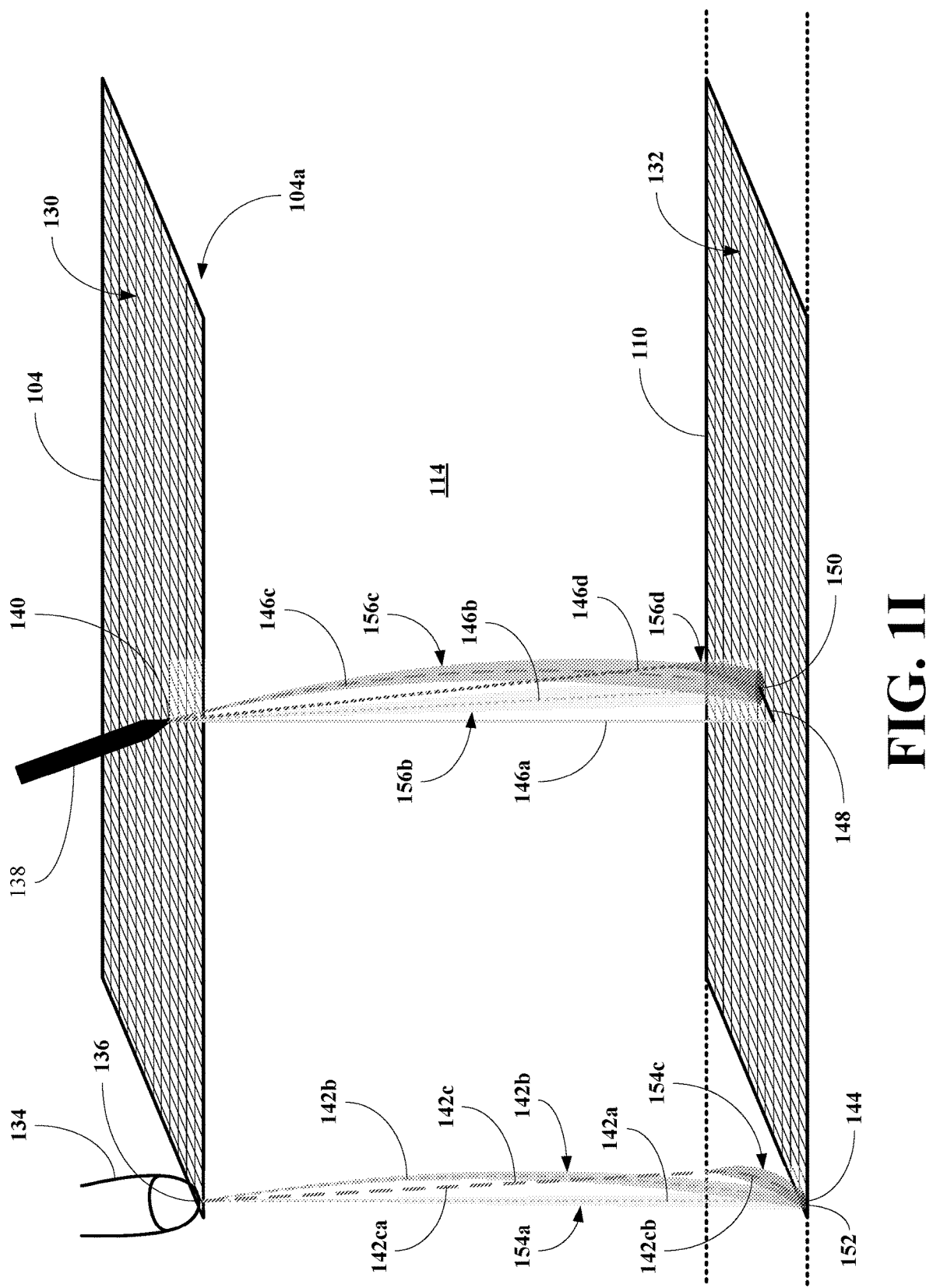

Looking at FIG. 1G, the user touches the screen 104 as shown with the fifth hand 116e which causes the systems, apparatuses, and/or interfaces 100 to generate the ray pointer ray 118e having the maximum offset causing a 3D AR construct 120d to be generated in the environment 114 corresponding to the object, area, zone, and/or volume 112d contacted by the distal end of the pointer 118e. The ray pointer 118e actually points to an attribute 128a to the 3D AR construct 120d, which becomes highlighted due to the distal end of the ray pointer 118e as shown.

It should be recognized that the offset may be y, x, or xy offsets. The length of the offsets may be preset, dynamic (based on the population of objects within the generated environment), or set on the fly by the user. It also should be recognized that the offset may appear on side having the greatest display space. It should also be recognized that if the distal end falls on an intersection of areas, the systems, apparatuses, and/or interfaces 100 may generate objects in all areas associated with the intersection or permit the user to move to resolve the border issue. It should also be recognized that if the distal end is an area or a volume, then the systems, apparatuses, and/or interfaces 100 may generate objects in the area or volume in which a greater percentage of the distal area resides, generate object in all areas touched by the area or volume, or again permit the user to select from the objects contacted by the distal end area or volume of the pointer.

Description of FIGS. 1H&I

Looking at FIG. 1H, a perspective view of the touch screen 104 shown with a grid 130 and the generated or overlaid on the captured image 110 shown with a corresponding grid 132. It should be recognized that the grids 130 and 132 are illustration purposes and may not actually appear on the display. The figure also shows a finger 134 touching a first location 136 of the screen 104 and a styles 138 touching a second location 140 of the screen 104. The first location 136 is located near the bottom portion 104a of the screen 104, which causes the processing unit to generate a ray pointer 142a emanating directly downward from the first location 136 to a corresponding first location 144 on the captured image 110 without an offset. The figure also shows two alternate ray pointer configurations 142b and 142c. The ray pointer configuration 142b describes an arcuate path, while the ray configuration 142c comprises a straight first segment and a curved second segment.

The second location 140 is associated with a central portion of the screen 104, which causes the processing unit to generate a ray pointer 146b having a +y offset 148 relative to a pointer 146a having no offset at a corresponding offset location 150 on the captured image 110. The figure also shows two alternate ray pointer configurations 146c and 146d. The ray pointer configuration 146c describes an arcuate path, while the ray configuration 146d comprises a straight first segment and a curved second segment, each with the offset 148.

Looking at FIG. 1I, another perspective view of the touch screen 104 shown with the grid 130 and the captured image 110 shown with the corresponding grid 132. The figure also shows the finger 134 touching the first location 136 of the screen 104 and the styles 138 touching the second location 140 of the screen 104.

The first location 136 is located near the bottom portion 104a of the screen 104, which causes the processing unit to generate the ray pointer 142a emanating directly downward from the first location 136 to the corresponding first location 144 on the captured image 110 without an offset. The figure also shows two alternate ray pointer configurations 142b and 142c. The ray pointer configuration 142b describes an arcuate path, while the ray configuration 142c comprises a straight proximal segment 142ca and a curved distal segment 142cb.

The second location 140 is associated with a central portion of the screen 104, which causes the processing unit to generate a ray pointer 146b having a +y offset 148 relative to a pointer 146a having no offset at a corresponding offset location 150 on the captured image 110. The figure also shows two alternate ray pointer configurations 146c and 146d. The ray pointer configuration 146c describes an arcuate path, while the ray configuration 146d comprises a straight first segment and a curved second segment, each with the offset 148.

The pointers 142a-c and 146b-d may also include illuminated volumes associated therewith resulting in an illuminated contact area/volume 152 on the captured image 110 and/or area/volume within the environment 114. The ray pointer 142a includes a triangular illuminated volume 154a; the ray point 142b includes an arcuate triangular illuminated volume 154b; and the ray point 142c includes a distal portion illuminated volume 154c associated with the distal segment 142cb. Similarly, the ray pointer 146b includes a triangular illuminated volume 156a; the ray point 156c includes an arcuate triangular illuminated volume 156b; and the ray point 146d includes a lower portion illuminated volume 156c. The area/volume 152 may be of any shape so that all objects, features, properties, characteristics, and/or attributes that fall within the area/volume 152 may be simultaneously selected, activated, animated, and/or manipulated.

Figure 1J:
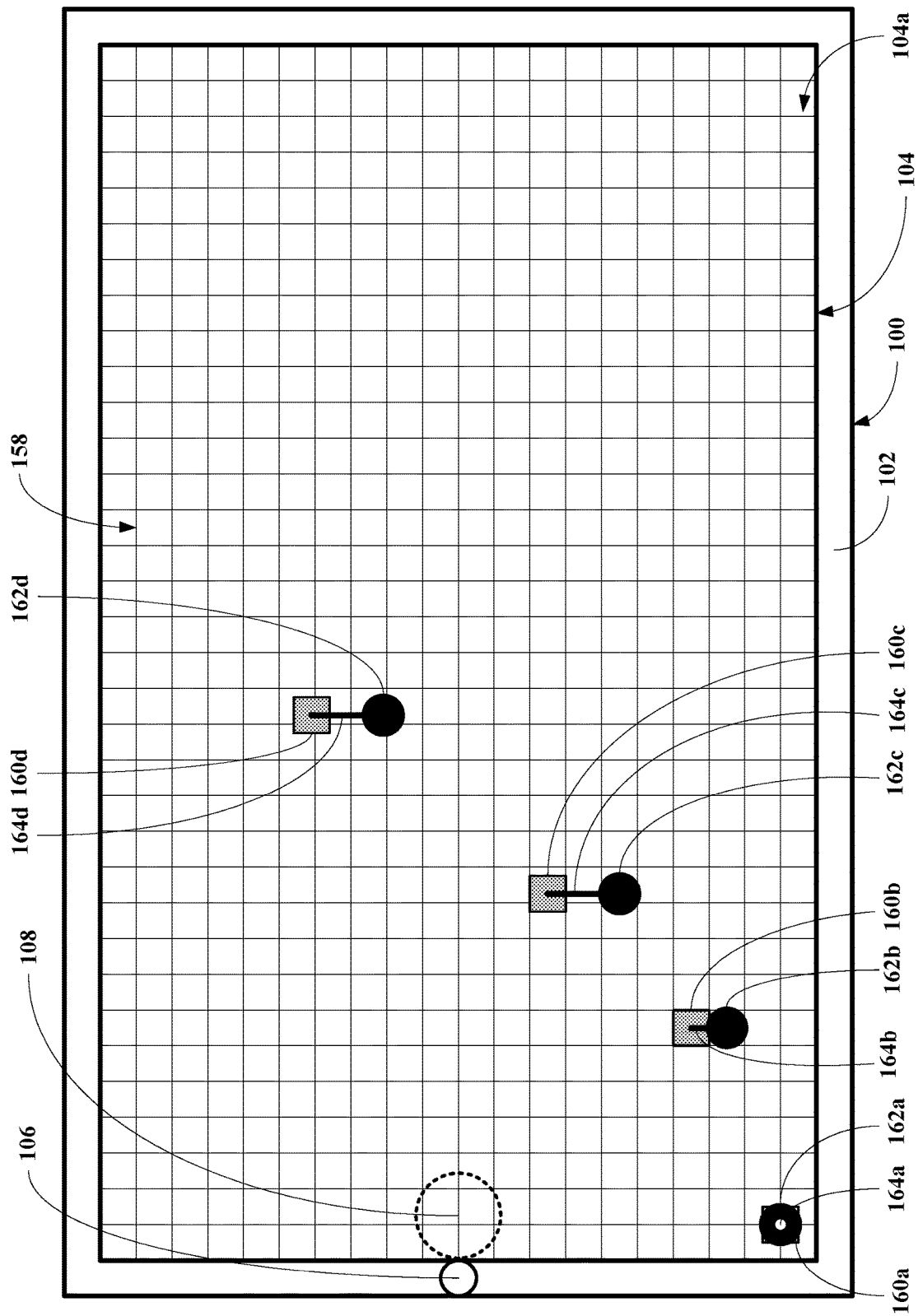

Description of FIGS. 1J&K

Figure 1K:
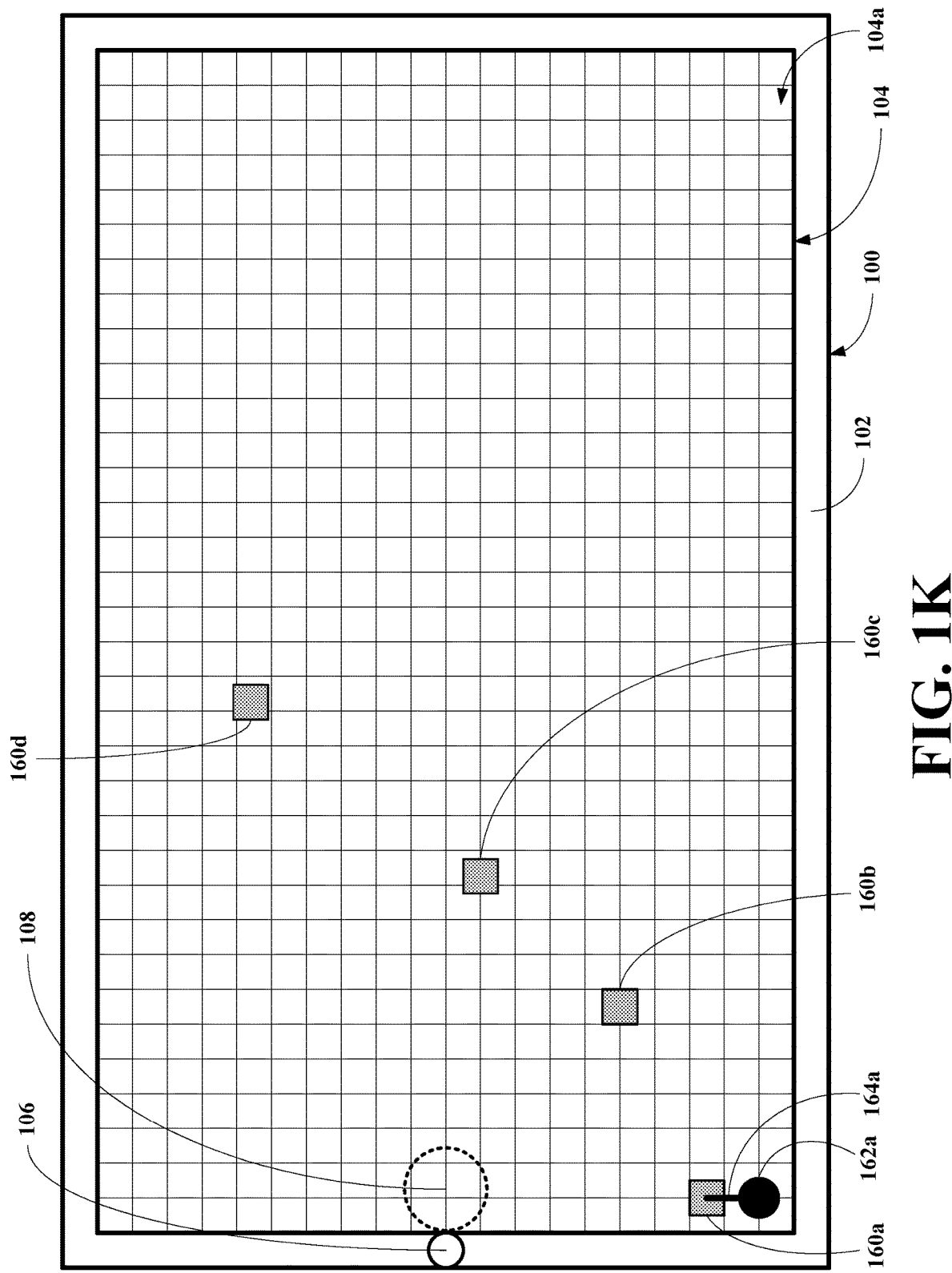

Looking at FIGS. 1J&K, the tablet 102 shown positioned so that the screen 104 is superimposed over the captured image 110 and is shown to include a grid 158. The displayed captured image 110 includes four objects 160a-d, four corresponding contact points 162a-d, and four ray pointers 164a-d. The first pointer 164a points straight down onto the first object 160a disposed near the bottom portion 104a of the screen 104, without an offset. Again, the first ray pointer 164a includes no offset. Because the first contact point 162a may result in the first object 160a being obscured by the finger or styles, in certain embodiments, the systems, apparatuses, and/or interfaces 100 may offset the captured image so that the ray point 164a and the object 160a may be visible as shown in FIG. 1K.

Figure 1L:
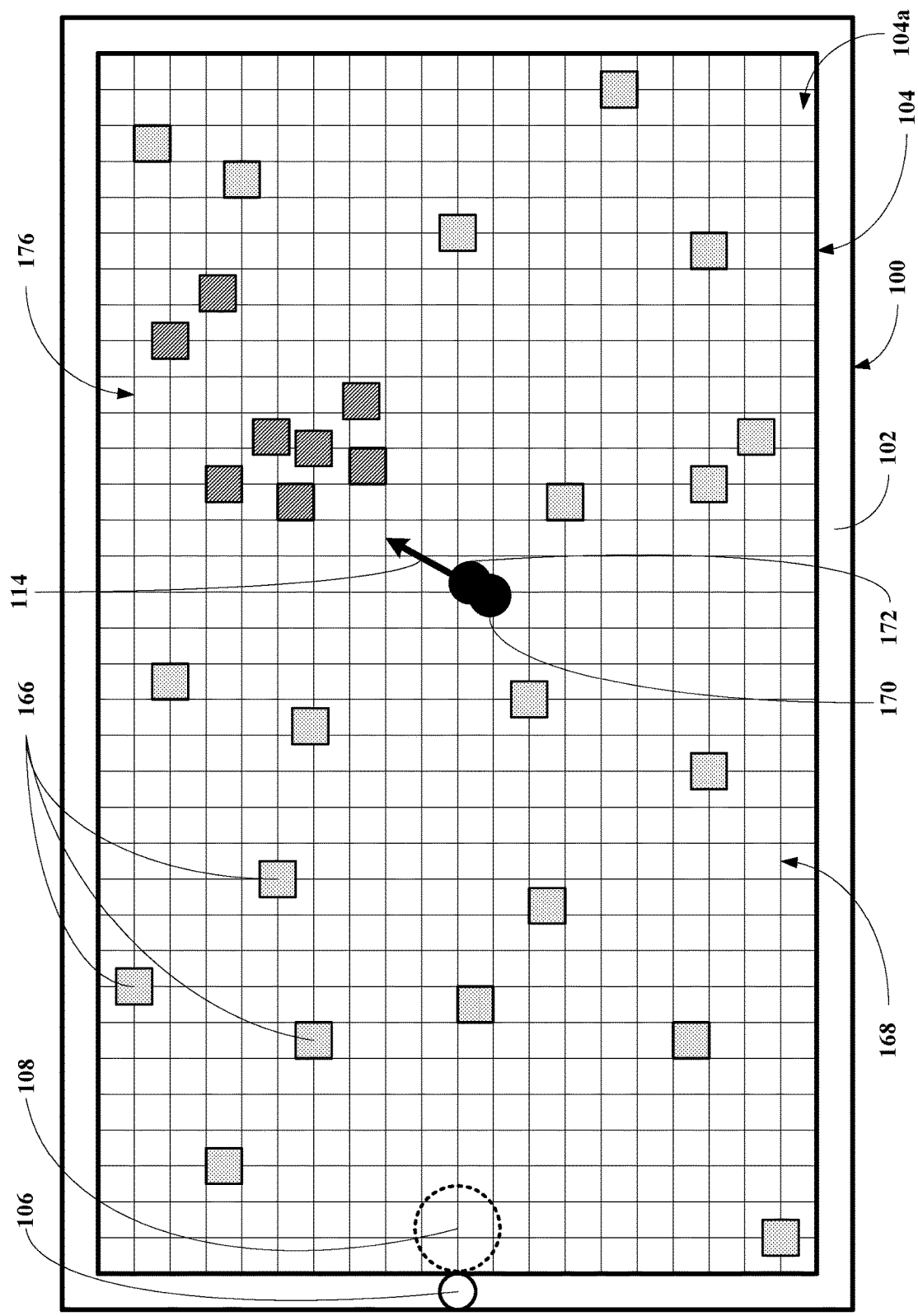
Figure 1M:
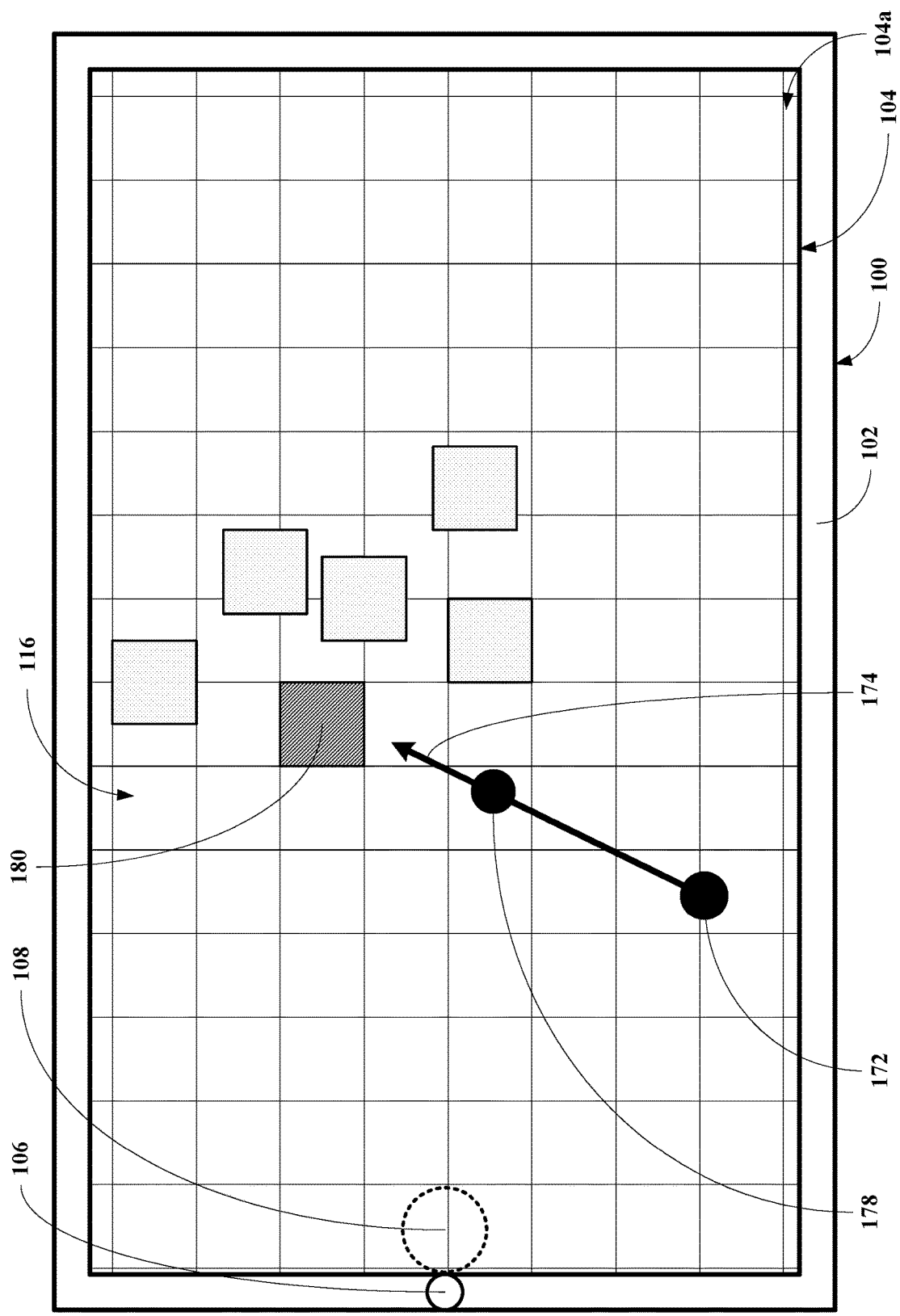
Figure 1N:
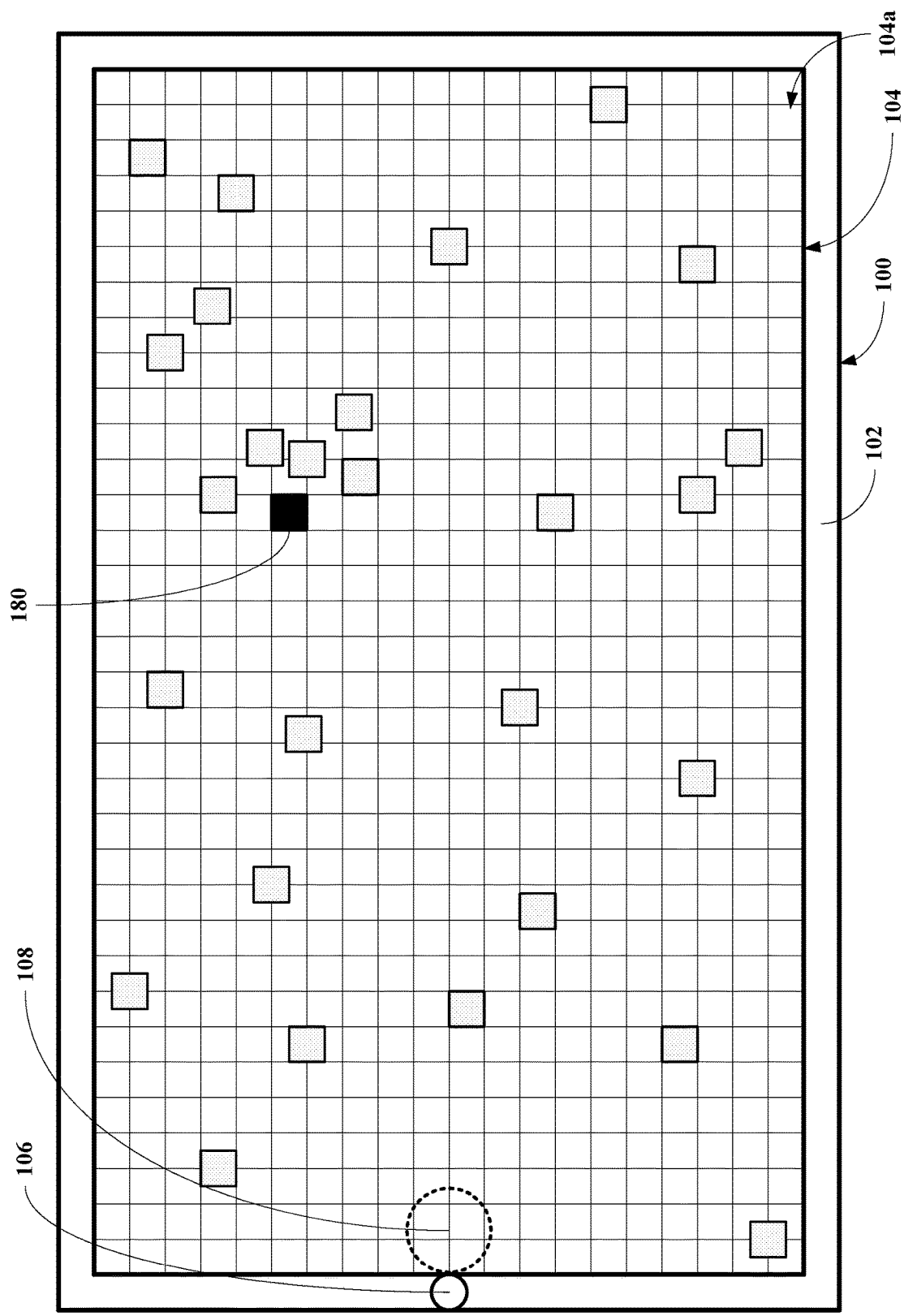

Description of FIGS. 1L-N

Looking at FIGS. 1L-N, the tablet 102 depicts a 3D AR environment overlaying a captured image, where the environment includes a plurality of VR constructed objects 166 corresponding to objects scanned and identified from the image captured by a camera associated within the tablet (rear or front facing depending on the scene to be captured. A grid 168 is overlaid on the captured image to illustrate the operation of a motion based system of this disclosure as it relates to selection, activation, animation, and/or manipulation of objects in the generated 3D AR environments.

Looking at FIG. 1L, the motion based selection methodology may be illustrated. The user initially touches the screen 104 at location 170 or moves within an active zone of a motion sensor corresponding to the location 170, which causes the processing unit to activate the selection methodology of this disclosure. As the initial point 170 of contact does not coincide with any of the VR objects 166, the systems, apparatuses, and interfaces are designed to sense motion either on the surface of the screen or within the active zone of the motion sensor. The sensed motion from the initial contact 170 is represented by a second location 172 giving rise to a direction 174. The direction 174 point towards a collection 176 of the objects 166 highlighted relative to non-aligned objects shown in faded format.

Looking at FIG. 1M, simultaneously or sequentially the motion causes the processing unit to zoom in, enlarging the region of the aligned objects 176. Further motion from the second location 172 to another location 178 refines the direction 174 so that it now points to a particular object 180 within the collection 176 highlighted in dark grey while non-aligned objects are faded to light grey. The motion results in the processing unit selecting and activating the particular object 180 as shown in FIG. 1N, where the particular object 180 in black fully activated and ready for animated manipulation within the 3D AR environment.

Blob Data

Figure 2A:
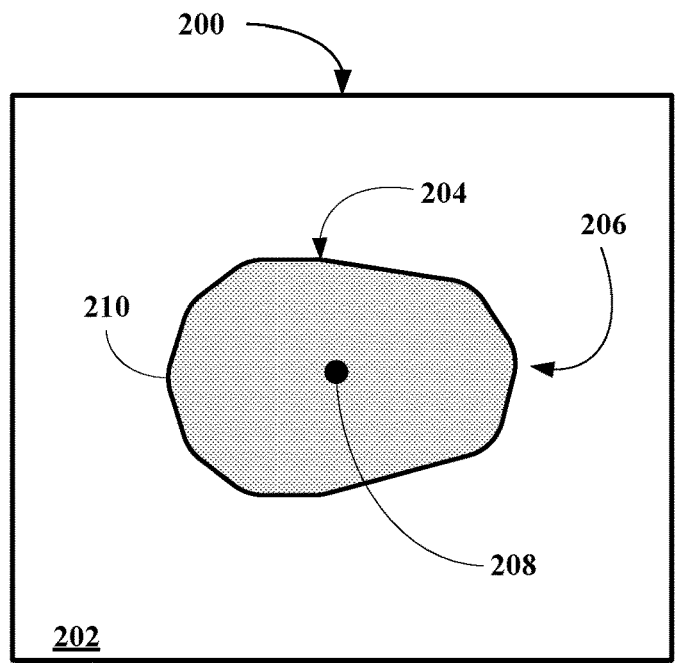

Referring now to FIG. 2A, an embodiment of a system, apparatus, and/or interface of this disclosure, generally 200, is shown to include a touch screen 202 having an active touch area 204 corresponding to a user's thumb or finger in contact with the screen 202 located in a central portion 206 of the screen 202. The active touch area 204 represents blob data associated with all touch screen elements activated within the touch area 204. The area 204 is shown to include a centroid 208, which represent data normally used in processing systems, apparatuses, and/or interfaces to determine movement and/or movement properties, and an outer edge 210. The blob data with or without the centroid data may represent a unique identifier for determining to whom the thumb or finger belongs. Depending on the sensitive of the touch screen (number of elements per unit of area and whether the elements are pressure sensitive—output varies with pressure), the blob data may not only include shape information, but may include pressure distribution information as well as the underlying skeletonal structure of the thumb or finger and/or skin surface textural features (fingerprint features) adding further unique identifiers aspects.

Figure 2B:
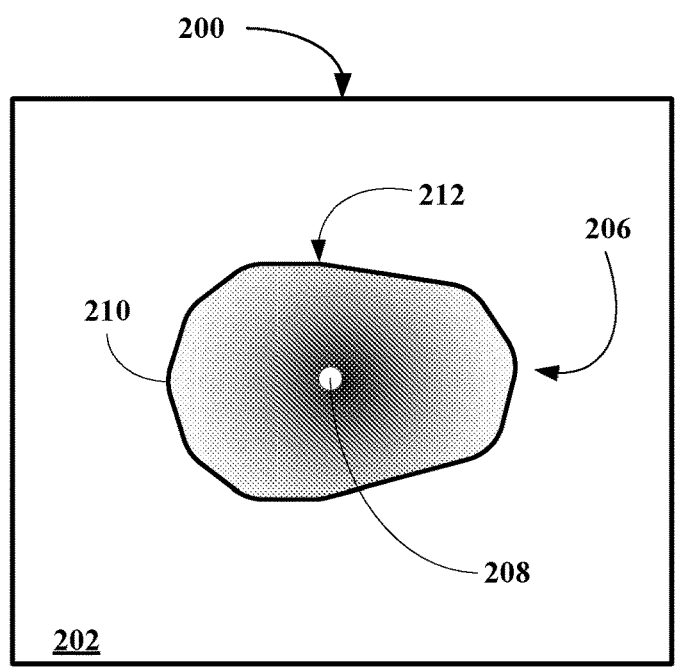
Figure 2C:
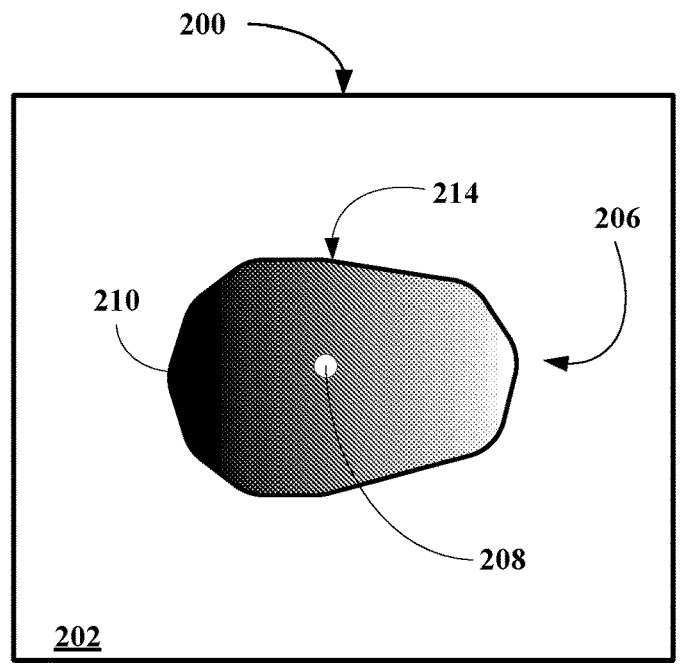
Figure 2D:
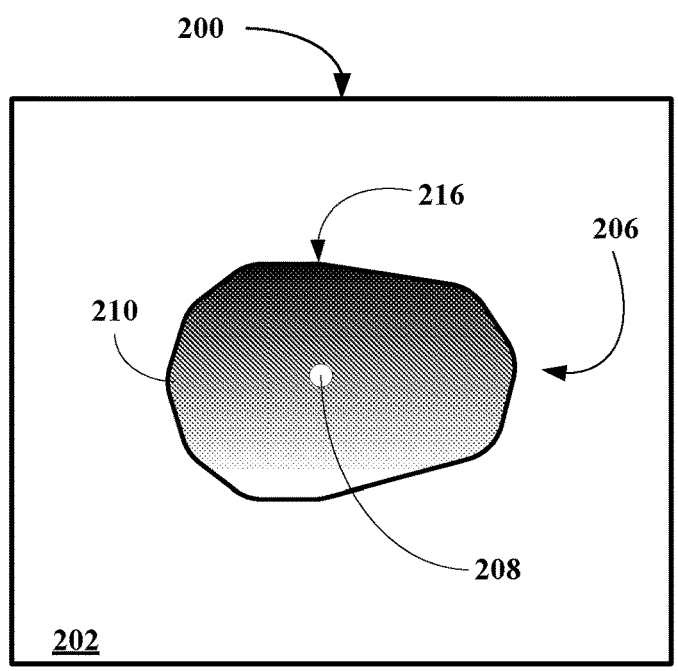

Looking at FIGS. 2B-D, the area 204 is shown to have three different pressure distributions 212, 214, and 216. Looking at FIG. 2B, a first or central pressure distribution 212 represents an initial contact pressure distribution of the thumb or finger on the screen 202, where the first pressure distribution is centered about the centroid 208 having the greatest pressure or density of a field or number of element of a sensor activated, etc., around the centroid 208 and decreasing radially towards an outer edge 210 of the area 204. Looking at FIG. 2C, a second or left edge pressure distribution 214 represents a change in the central pressure distribution 212 from a centroid based distribution to a left edge distribution, i.e., the second or left edge distribution has an increased pressure at the left edge and decreasing towards the right edge of the active area 204. Looking at FIG. 2D, a third pressure distribution 216 represents a change in the first pressure distribution 212 from a centroid based distribution or the second or left edge pressure distribution 214 to a top edge pressure distribution, i.e., the third or top edge distribution has an increased pressure at the top edge and decreasing towards the bottom edge of the active area 204.

The distribution 214 of FIG. 2C represents the user changing contact pressure from the center type contact pressure distribution 212 to the tip type contact pressure distribution 214. The distribution 216 of FIG. 2D represents the user changing contact pressure from the center type contact pressure distribution 212 to the top edge type contact pressure distribution 216. Each of these contact pressure distributions may cause the systems, apparatuses, and/or interfaces and methods of this disclosure to transition between menu levels, change the orientation of displayed menu items, transition between pre-defined menu levels, etc. Additionally, the transitions from the pressure distribution 212 to one of the other distributions 214 and 216 may be used in the motion based control systems, apparatuses, and/or interfaces of this disclosure.

Figure 2E:
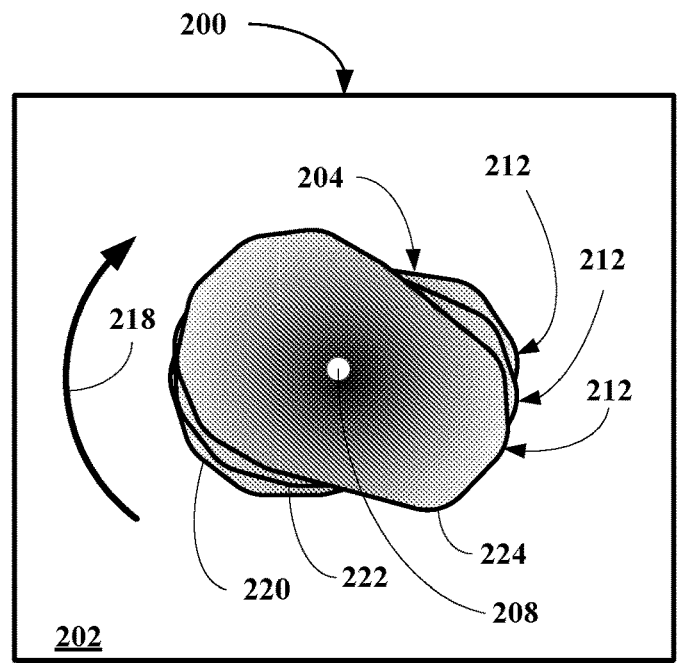

Looking at FIG. 2E, the area 204 is shown to undergo a clockwise rotationally movement 218 from an initial rotational orientation 220 to an intermediate rotational orientation 222, and to a final rotational orientation 224. These orientations 220, 222, and 224 have the same or substantially the same pressure distribution as the central pressure distribution 212. These changes in rotation orientation represented by orientations 220, 222 and 224 may represent very minute movements, i.e., movements sufficiently small and insufficient to result in a change of the centroid data, but may be sufficient from a blob data perspective to determine, analyze, and/or predict movement for use in the motion based control systems, apparatuses, and/or interfaces of this disclosure. Thus, subtle changes in the pressure distributions within the area 204 may result in movement and/or movement property determination, anticipation, and/or prediction. Again, the blob data with or without the centroid data may be used in the motion based control systems, apparatuses, and/or interfaces of this disclosure.

Figure 2F:
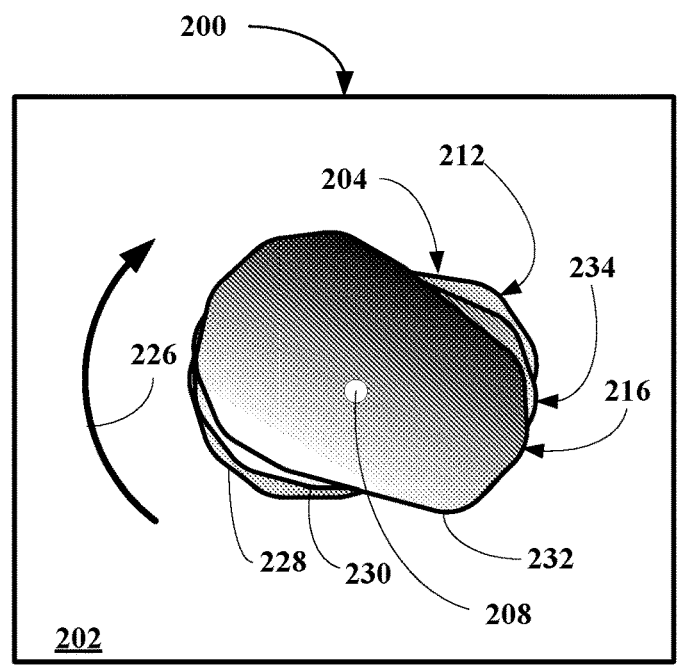

Looking at FIG. 2F, the area 204 is shown again to undergo a clockwise rotationally movement 226 from an initial rotational orientation 228 to an intermediate rotational orientation 230, and to a final rotational orientation 232 and simultaneous to undergo changes in pressure or density of activated element distributions from the central pressure or density of activated element or signal density distribution 212 to an intermediate pressures distribution 234, and finally to the top edge pressure distribution 216. Such compound blob data changes, e.g., rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 204 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure. It should be recognized that pressure is used here as an example of a sensor that have elements that are activate when a value of the element exceeds some threshold activation criterion or criteria. The sensors may be field sensors, image sensors, or any other sensor that include a plurality of elements that are activated via interaction with or detection of a body, body part, or member being controlled by a body or body part. Thus, pressure distribution may be replaced by any distribution of an output of property or characteristics of a sensor.

Figure 2G:
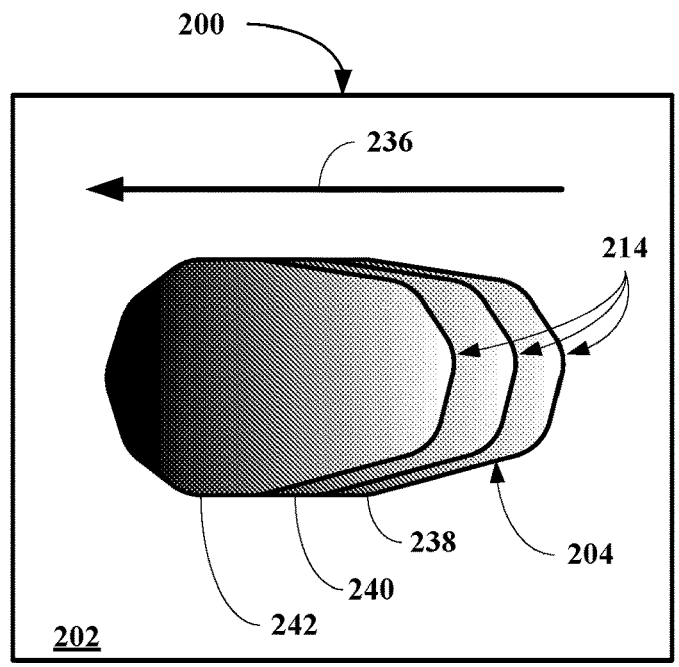

Looking at FIG. 2G, the area 204 is shown to undergo a left movement 236 from an initial location 238 to an intermediate location 240, and finally to a final location 242. In this case, all three of the locations 238, 240, and 242 had the same or substantially the same pressure distribution comprising the left edge distribution 214. These locations 238, 240, and 242 may represent very minute movements, i.e., movement is sufficiently small and insufficient to result in a change of the centroid data, but may be sufficient from a blob data perspective to determine, analyze, and/or predict movement for use in the motion based control systems, apparatuses, and/or interfaces of this disclosure. Thus, subtle changes in the pressure distribution within the area 204 may result in movement determination, anticipation, and/or prediction for use in the motion based control systems, apparatuses, and/or interfaces of this disclosure. Again, the blob data with or without the centroid data may be used to determine movement and movement properties for control of the systems of this disclosure.

Figure 2H:
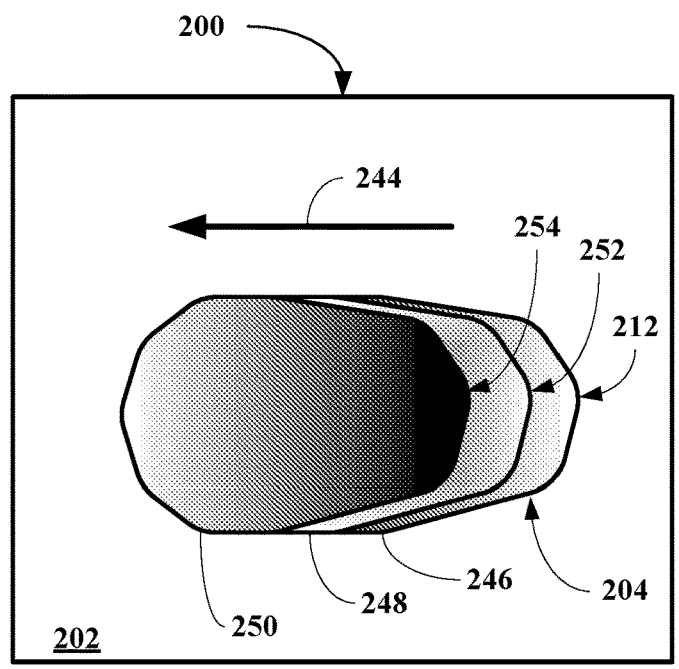

Looking at FIG. 2H, the area 204 is shown again to undergo a left movement 244 from an initial location 246 to an intermediate location 248, and finally to a final location 250 and simultaneous to undergoes changes in pressure distributions from the pressure distribution 212 to an intermediate pressure distribution 252, and finally to a backward pressure distribution 254. Such compound blob data changes, e.g., rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 204 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure.

Figure 2I:
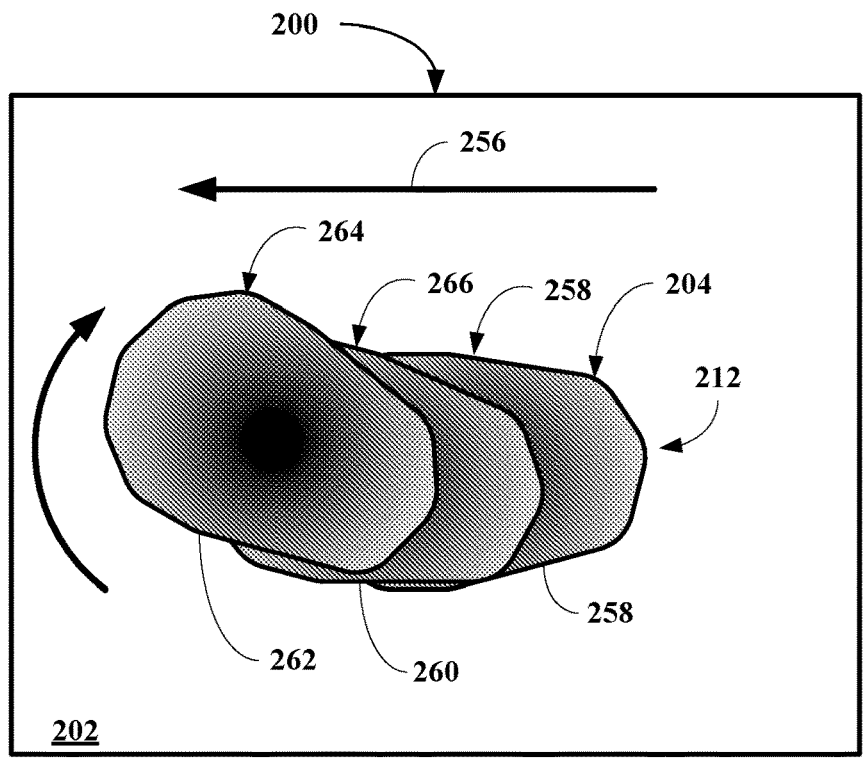

Looking at FIG. 2I, the area 204 is shown to undergo a left linear movement 256 from an initial location 258 to an intermediate location 260, and to a final location 262 and simultaneously to undergo a clockwise rotationally movement 264 from an initial rotational orientation 266 to an intermediate rotational orientation 268, and to a final rotational orientation 270, while maintaining the same or substantially the same central pressure distribution 212. Such compound blob data changes, e.g., linear movement coupled with rotational movement, may be used with or without the centroid data to analyze, determine and predict the movement and movement properties, especially if the movement is small resulting in insufficient movement of the centroid to indication any movement at all. Thus, subtle changes in the pressure distribution of the area 204 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure.

Figure 2J:
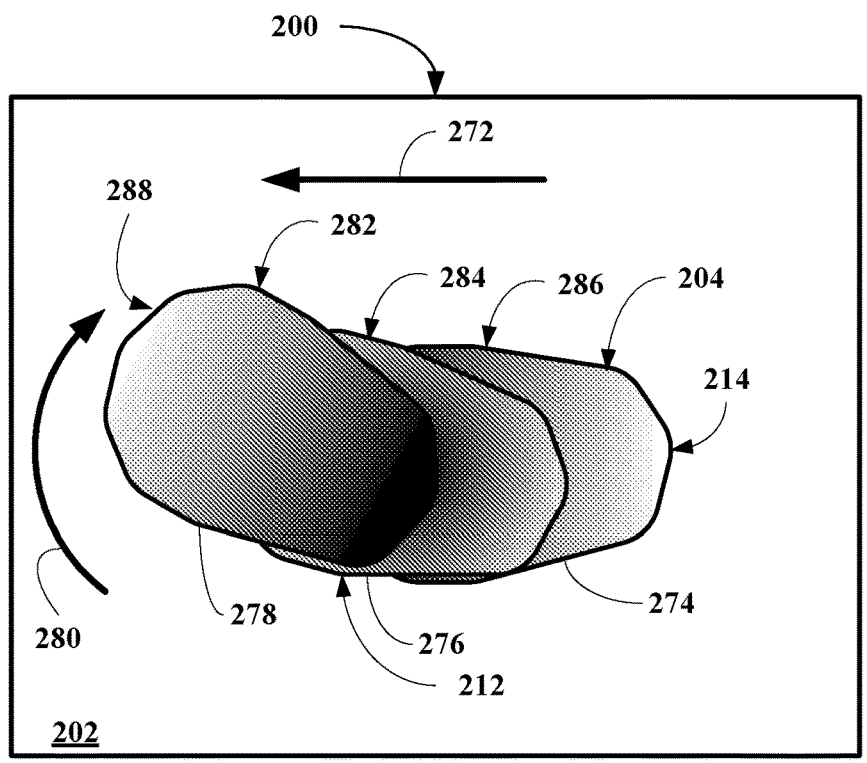

Looking at FIG. 2J, the area 204 is shown again to undergo a left linear movement 272 from an initial location 274 to an intermediate location 276, and to a final location 278, simultaneously to undergo a clockwise rotationally movement 280 from an initial rotational orientation 282 to an intermediate rotational orientation 284, and to a final rotational orientation 286, and simultaneously to undergo a change in a pressure distribution from the left edge pressure distribution 214 to the central pressure distribution 212, and to a right edge pressure distribution 288. Such compound blob data changes, e.g., linear movement and rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 204 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure.

Figure 3A:
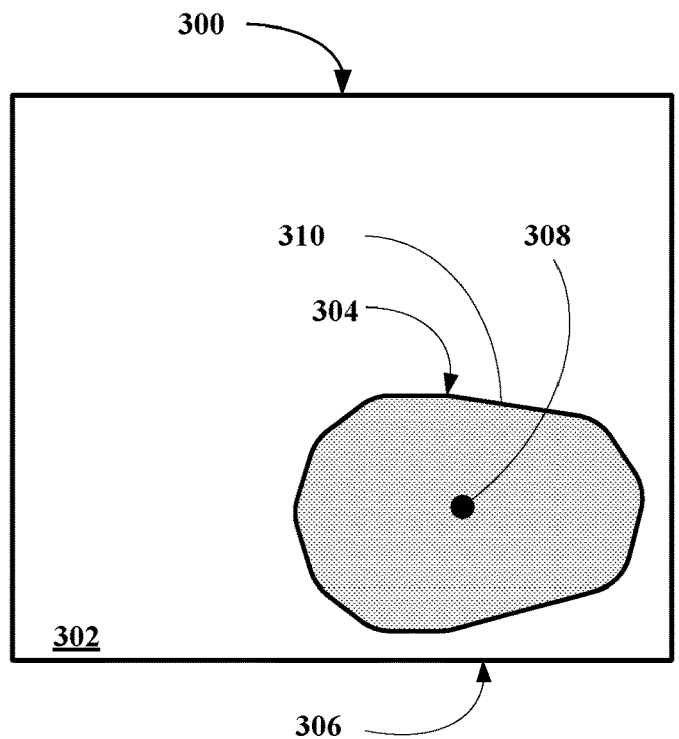

Referring now to FIG. 3A, an embodiment of a touch screen interface of this disclosure, generally 300, is shown to include a touch screen 302 having a touch area 304 corresponding to a user's thumb or finger in contact with the screen 302 located in a lower right portion 306 of the screen 302. The touch area 304 represent blob data associated with all touch screen elements activated (exceeding a threshold pressure value) by the user thumb or finger. The area 304 is shown to include a centroid 308, which represent the data normally used in systems to determine movement and an outer edge 310. The blob data with or without the centroid data may represent a unique identifier to determine user identity. Depending on the sensitive of the touch screen (number of elements per unit area and whether the elements are simply ON or OFF elements or pressure sensitive elements (i.e., output varies with pressure)), the blob data may not only include shape information, but may include pressure distribution information as well as underlying skeletal structure features and/or properties of the thumb or finger and/or a skin surface textural features or properties, which may add further uniqueness aspects for the purposes of user identification.

Figure 3B:
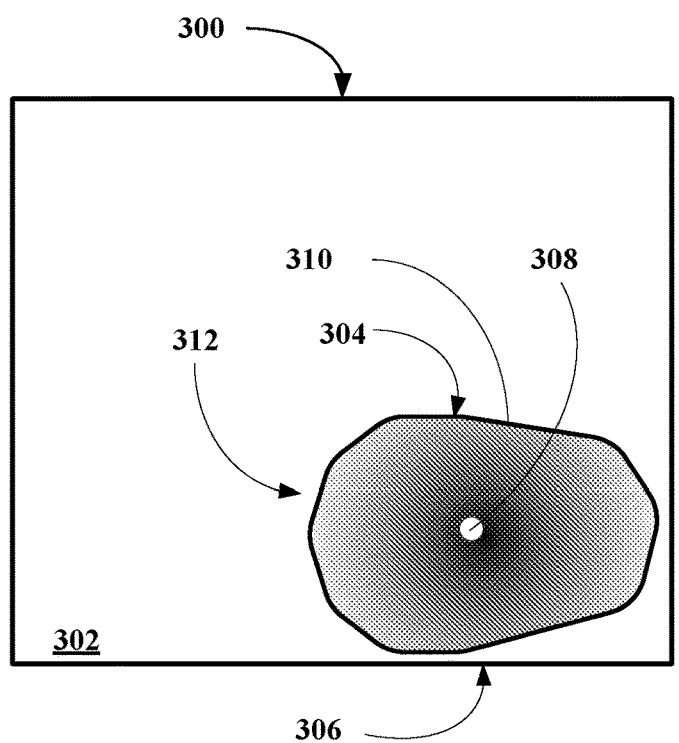
Figure 3C:
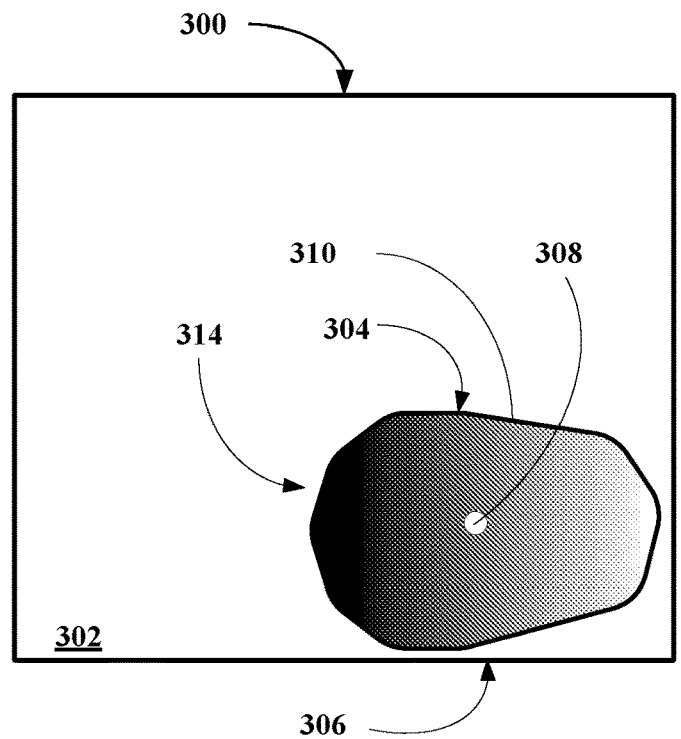
Figure 3D:
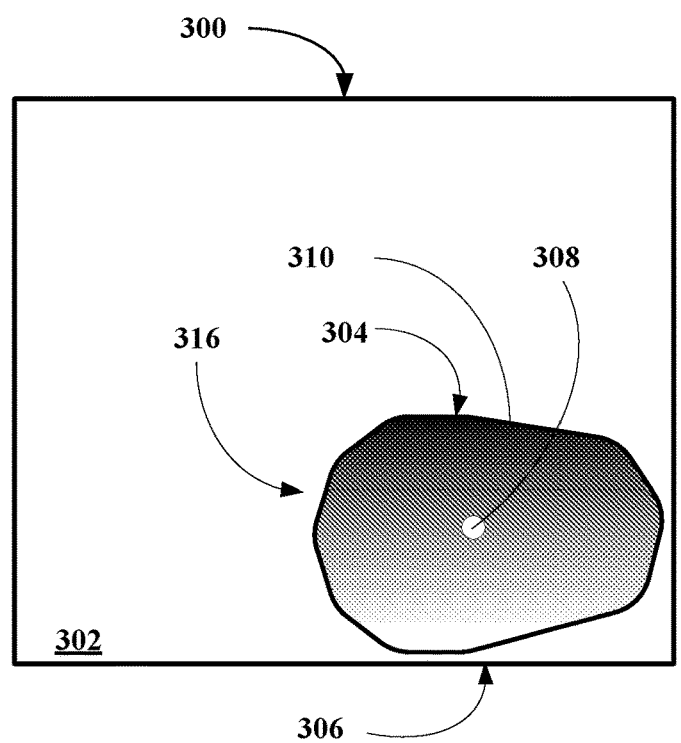

Looking at FIGS. 3B-D, the area 304 is illustrate having three different pressure distributions 312, 314, and 316. Looking at FIG. 3B, the first or central pressure distribution 310 represents an initial contact of the thumb or finger with the screen 302, while the other distributions 314 and 316 may represent changes in the pressure distribution over time due to the user changing contact pressure within the area 304. Looking at FIG. 3C, the central pressure distribution 312 changes to a left edge pressure distribution 314. Looking at FIG. 3D, the central pressure distribution 312 or the left edge pressure distribution 314 changes to the top edge pressure distribution 316. Each of these pressure distributions may cause the motion based control systems, apparatuses, and/or interfaces of this disclosure to transition between menu levels, change the orientation of displayed menu items, transition between pre-defined menu levels, etc. Additionally, the transition from the pressure distribution 312 to one of the other distributions 314 and 316 may be used as a movement by the motion based control systems, apparatuses, and/or interfaces of this disclosure.

Figure 3E:
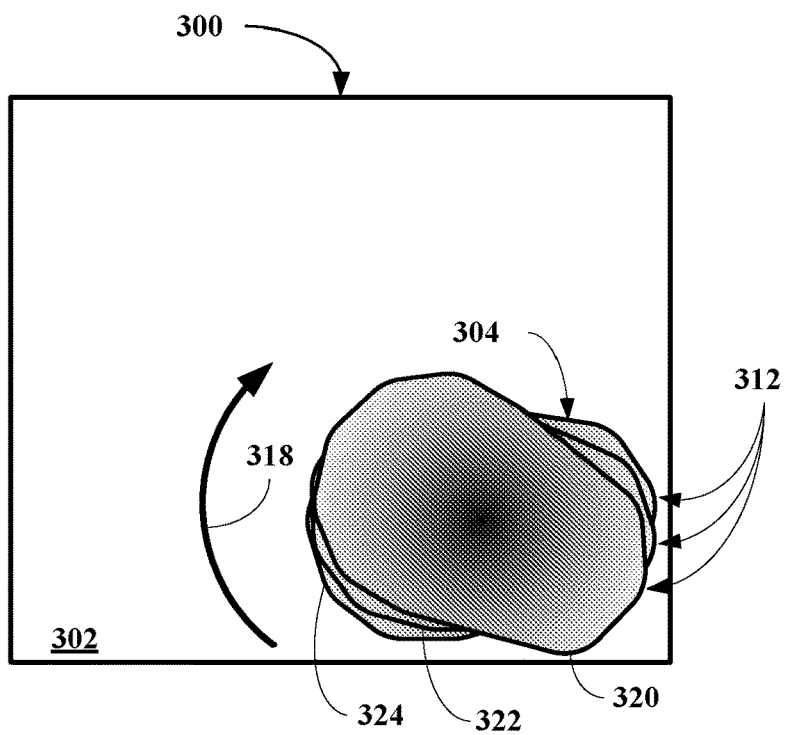

Looking at FIG. 3E, the area 304 is shown to undergo a clockwise rotationally movement 318 from an initial rotational orientation 320 to an intermediate rotational orientation 322, and to a final rotational orientation 324. These orientations 320, 322, and 324 have the same or substantially the same central pressure distribution 312. These changes in rotation orientation represented by orientations 320, 322 and 324 may represent very minute movements, i.e., movements sufficiently small and insufficient to result in a change of the centroid data, but may be sufficient from a blob data perspective to determine, analyze, and/or predict movement for use in the motion based control systems, apparatuses, and/or interfaces of this disclosure. Thus, subtle changes in the pressure distributions within the area 304 may result in movement and/or movement property determination, anticipation, and/or prediction. Again, the blob data with or without the centroid data may be used in the motion based control systems, apparatuses, and/or interfaces of this disclosure.

Figure 3F:
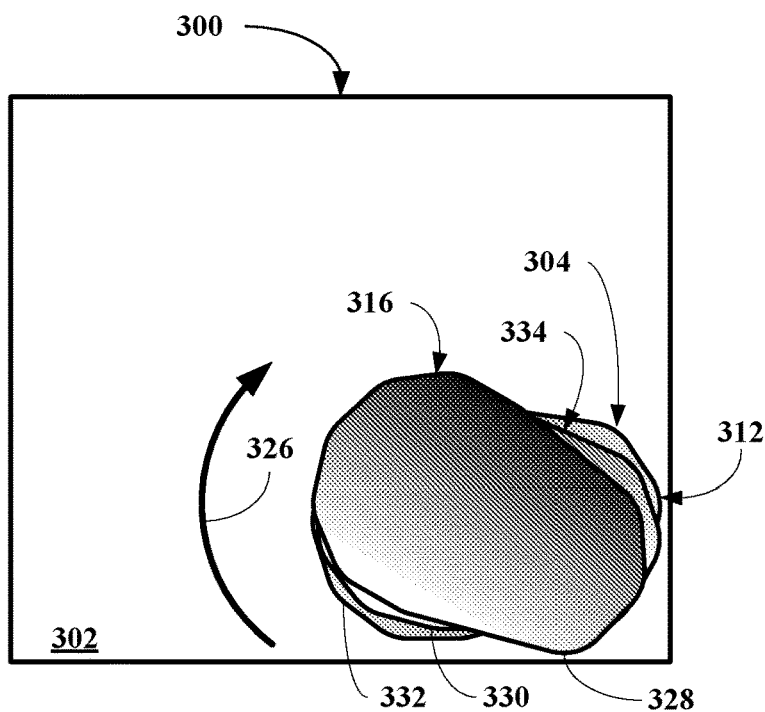

Looking at FIG. 3F, the area 304 is shown again to undergo a clockwise rotationally movement 326 from an initial rotational orientation 328 to an intermediate rotational orientation 330, and to a final rotational orientation 332 and simultaneous to undergo changes in pressure distributions from the central pressure distribution 312 to an intermediate pressures distribution 334, and finally to the top edge pressure distribution 316. Such compound blob data changes, e.g., rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 304 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure.

Figure 3G:
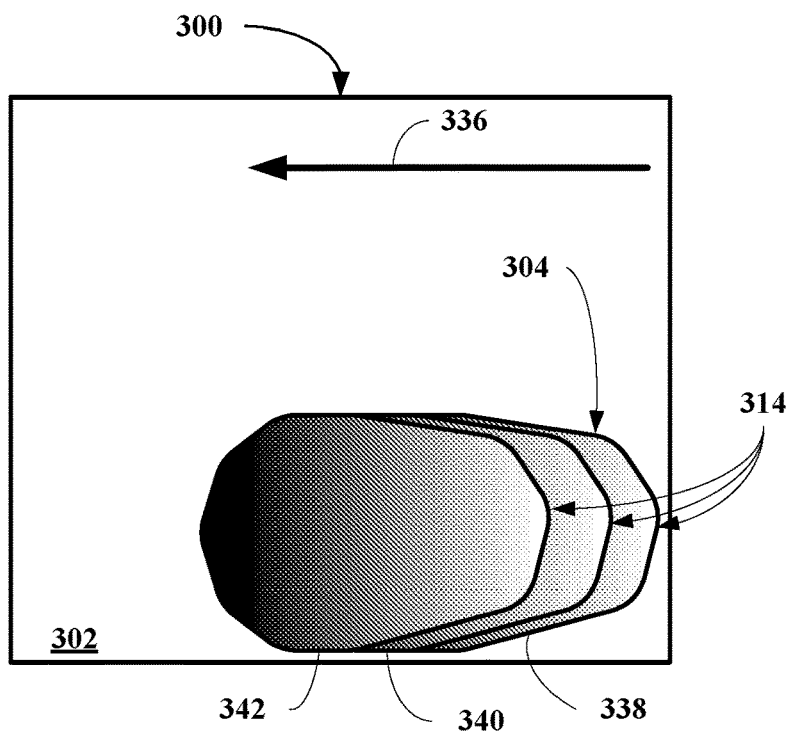

Looking at FIG. 3G, the area 304 is shown to undergo a left movement 336 from an initial location 338 to an intermediate location 340, and finally to a final location 342. In this case, all three of the locations 338, 340, and 342 had the same or substantially the same pressure distribution comprising the left edge distribution 314. These locations 238, 240, and 242 may represent very minute movements, i.e., movement is sufficiently small and insufficient to result in a change of the centroid data, but may be sufficient from a blob data perspective to determine, analyze, and/or predict movement for use in the motion based control systems, apparatuses, and/or interfaces of this disclosure. Thus, subtle changes in the pressure distribution within the area 304 may result in movement determination, anticipation, and/or prediction for use in the motion based control systems, apparatuses, and/or interfaces of this disclosure. Again, the blob data with or without the centroid data may be used to determine movement and movement properties for control of the systems of this disclosure.

Figure 3H:
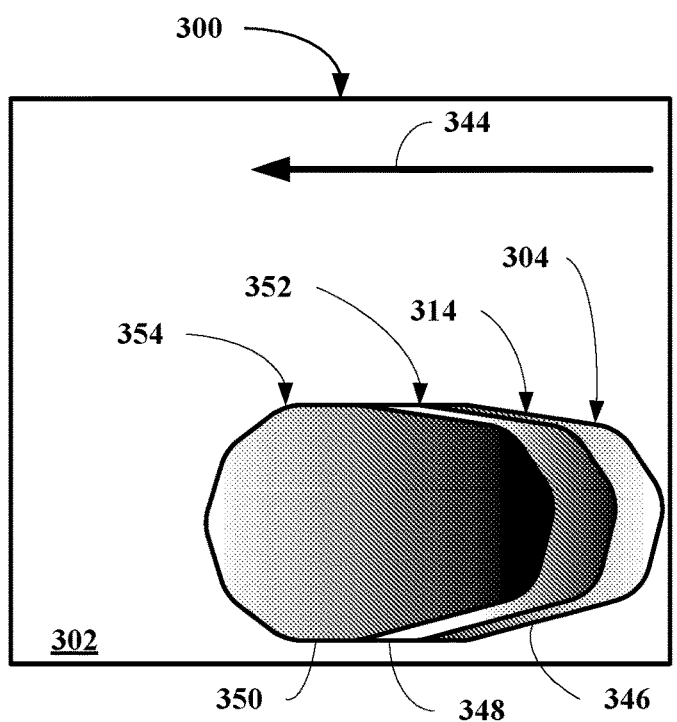

Looking at FIG. 3H, the area 304 is shown again to undergo a left movement 344 from an initial location 346 to an intermediate location 348, and finally to a final location 350 and simultaneous to undergo changes in pressure distributions from the left edge pressure distribution 314 to an intermediate pressure distribution 352, and finally to a right edge pressure distribution 354. Such compound blob data changes, e.g., rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 304 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure, including centroid data may then act as a verification of user intent, or to modify the non-centroid results.

Figure 3I:
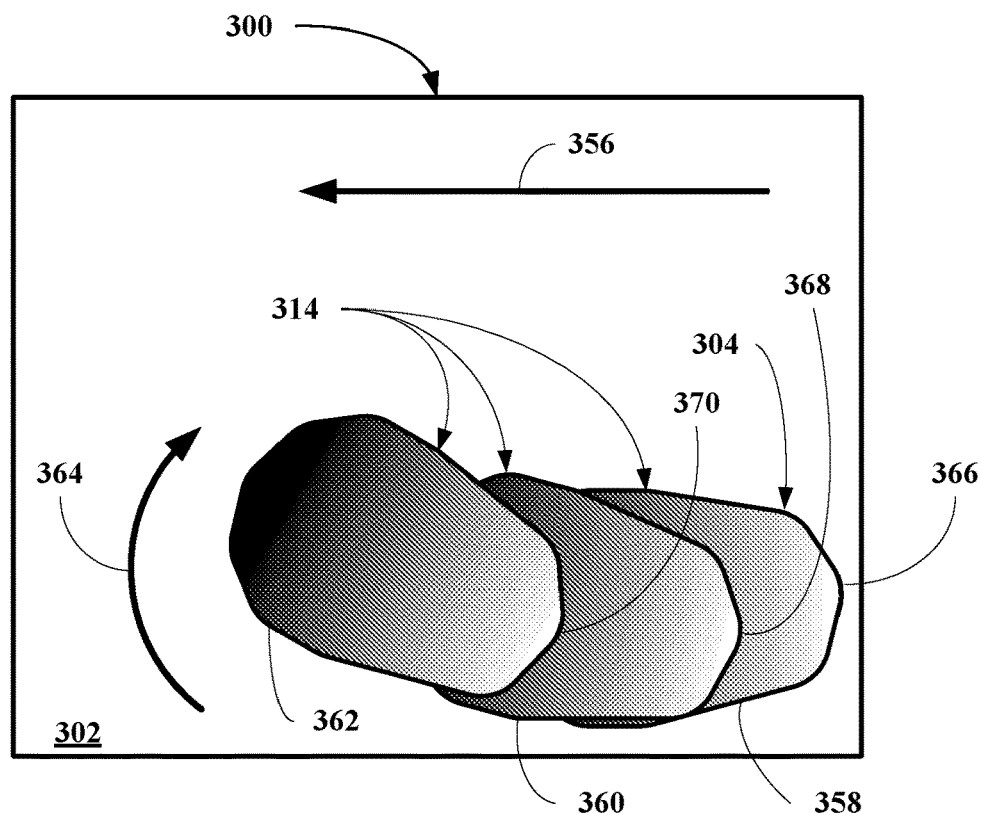

Looking at FIG. 3I, the area 304 is shown again to undergo a left movement 356 from an initial location 358 to an intermediate location 360, and finally to a final location 362 and simultaneously to undergo a clockwise rotationally movement 364 from an initial rotational orientation 366 to an intermediate rotational orientation 368, and to a final rotational orientation 370, while maintaining the same or substantially the same left edge pressure distribution 314. Such compound blob data changes, e.g., linear movement and rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 304 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure.

Figure 3J:
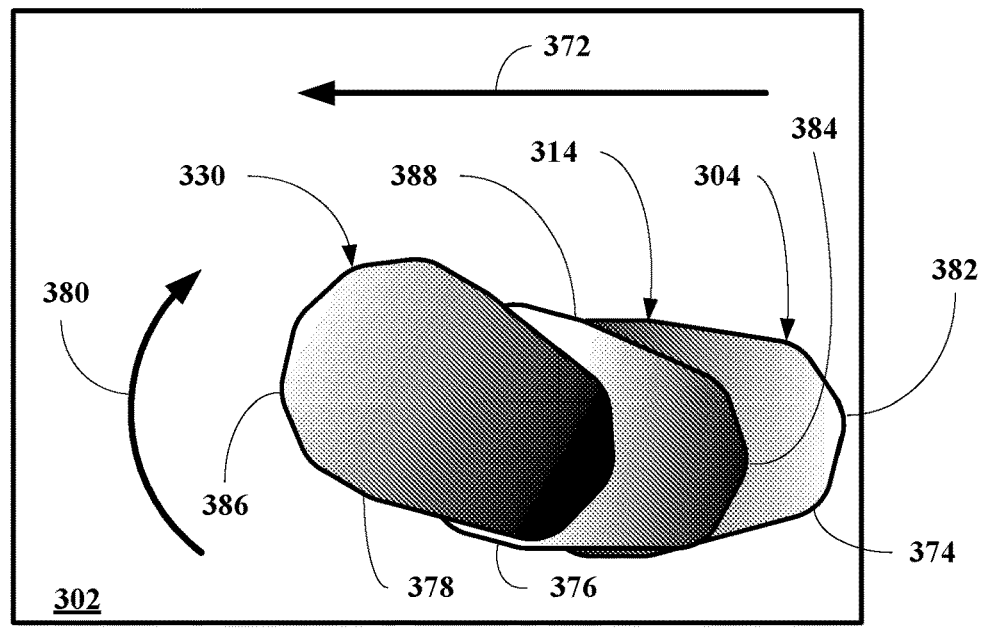

Looking at FIG. 3J, the area 304 is shown again to undergo a left movement 372 from an initial location 374 to an intermediate location 376, and to a final location 378, simultaneously to undergo a clockwise rotationally movement 380 from an initial rotational orientation 382 to an intermediate rotational orientation 384, and to a final rotational orientation 386, and simultaneously to undergo a change in a pressure distribution from the left edge pressure distribution 314 to an intermediate pressure distribution 388, and to a right edge pressure distribution 390. Such compound blob data changes, e.g., linear movement and rotational movement coupled with changes in the pressure distributions, again may be used with or without the centroid data to analyze, determine and predict the movement and movement properties, especially if the movement is small resulting in insufficient movement of the centroid to indication any movement at all. Thus, subtle changes in the pressure distribution of the area 304 may result in movement determination, anticipation and/or prediction for use in the motion based control systems, apparatuses, and/or interfaces of this disclosure. Moreover, this compound movement may be used to effect different levels of control within a given environment controlled by the motion based control systems, apparatuses, and/or interfaces of this disclosure.

CLOSING PARAGRAPH

All references cited herein are incorporated by reference for all purposes in accord with statues, rules and regulations of the United States Patent Laws, Rules, and Regulations. Although the invention has been disclosed with reference to its preferred embodiments, from reading this description those of skill in the art may appreciate changes and modification that may be made which do not depart from the scope and spirit of the invention as described above and claimed hereafter.

We claim:

1. An apparatus comprising:
a processing unit coupled with or to a display device, a camera, and a motion sensing device or array;
the processing unit configured to:
receive an image output from the camera and generate a display image corresponding to the image output;
identify (a) image objects and image object features, characteristics, properties, and/or attributes, and (b) image features, characteristics, properties, and/or attributes in the display image;
generate a 3D construct corresponding to the display image, wherein the 3D construct includes: (a) generated image features, characteristics, properties, and/or attributes, and (b) generated objects and generated object features, characteristics, properties, and/or attributes corresponding to the image objects, the image object features, characteristics, properties, and/or attributes, the image features, characteristics, properties, and/or attributes, wherein the 3D construct comprises a VR construct, an AR construct, a MR construct, or a XR construct;
display the display image with the 3D construct overlaid on the display image, wherein the generated image objects are located in locations in the 3D construct corresponding to locations in the display image and wherein one or more of the generated image objects are repositioned within the 3D construct to improve generated image object selectability;
sense a first motion via the motion sensing device or array;
determine a display location comprising (a) an initial location of the first motion on a touch sensitive device, or (b) an initial location of the first motion sensed by a non-touch sensitive motion sensing device;
generate and display on the display device a selection pointer emanating from the display location through the 3D construct to a corresponding display image location on the display image, wherein the selection pointer includes (a) a proximal end at the display location, and (b) a distal end at the display image location, wherein the distal end includes an offset based on the display image location that varies from a minimal offset to a maximum offset depending on the display image location within the display image to reduce obstruction of the image objects, image features, image properties, image characteristics, and/or image attributes, wherein the offset is minimal at edges of the display image and maximal in a central region of the display image, and wherein the selection pointer comprises a vector, a ray, a beam, or a disturbance pattern;
determine one or more image objects, image features, image properties, image characteristics, and/or image attributes in the display image contacted by the distal end of the selection pointer or closest to the distal end of the selection pointer;
select the one or more generated image objects, generated image features, generated image properties, generated image characteristics, and/or generated image attributes in the display image; and
indicate and activate generated image objects, generated image features, generated image properties, generated image characteristics, and/or generated image attributes in the 3D construct corresponding to the one or more selected image objects, image features, image properties, image characteristics, and/or image attributes,
wherein the motion sensing device or array comprises a body part sensor, a body part tracking sensor, a body sensor, a body tracking sensor, a camera, an optical sensor, an acoustic sensor, a field sensor, a motion sensor, or any combination thereof.

2. The apparatus of claim 1, wherein the processing unit is further configured to:
simultaneously or sequentially animate the generated image objects, generated image features, generated image properties, generated image characteristics, and/or generated image attributes; and/or
simultaneously or sequentially manipulate the generated image objects, generated image features, generated image properties, generated image characteristics, and/or generated image attributes.

3. The apparatus of claim 1, wherein:
the selection pointer has a volume and/or a bend and/or the distal end of the selection pointer comprises an area or a volume, and
the corresponding generated image objects, generated image features, generated image properties, generated image characteristics, and/or generated image attributes are: (a) contacted by the area or the volume, (b) within the area or the volume, or (c) closest to the area or the volume, and
the area or the volume is defined by a contact pressure, a contact pressure distribution, a contact area, a distance, a displacement, a time, a velocity, and/or acceleration associated with the first motion on the touch sensitive input device, wherein the greater the contact pressure, the pressure distribution, the contact area, the distance, the displacement, the time, the velocity, or the acceleration, the larger the area or the volume, or
the area or the volume is defined by a distance, a displacement, a time, a velocity, and/or an acceleration of the first motion of the non-touch sensitive motion sensing device, wherein the greater the distance, the displacement, the time, the velocity, or the acceleration, the larger the area or the volume.

4. The apparatus of claim 1, wherein, if there is more than one selected image object, image feature, property, characteristic, and/or attribute, then the processing unit is further configured to:
in response to a first level discrimination motion sensed via the motion sensing device or array:
select a particular generated image object, generated image feature, generated image property, generated image characteristic, or generated image attribute, wherein the first level discrimination motion (a) contacts the particular generated image object, generated image feature, generated image property, generated image characteristic, or generated image attribute, (b) contacts an active zone surrounding the particular generated image object, generated image feature, generated image property, generated image characteristic, or generated image attribute, or (c) the particular generated image object, generated image feature, generated image property, generated image characteristic, or generated image attribute is predicted to a threshold certainty greater than 50%.

5. The apparatus of claim 4, wherein the processing unit is further configured to:
animate the particular generated image object, generated image feature, generated image property, generated image characteristic, or generated image attribute; and/or
manipulate the particular generated image object, generated image feature, generated image property, generated image characteristic, or generated image attribute.

6. The apparatus of claim 4, wherein:
the move comprises moving toward or away from a direction to the first level discrimination motion,
the rearrange comprises spreading out,
the move and/or rearrange improves a capability to select the particular generated image object, generated image feature, generated image property, generated image characteristic, or generated image attribute, and
a speed of the first level discrimination motion controls a rate of moving and/or rearranging.

7. The apparatus of claim 4, wherein the processing unit is further configured to:
highlight the aligned generated image objects, generated image features, generated image properties, generated image characteristics, and/or generated image attributes, and
fade non-aligned generated image objects, generated image features, generated image properties, generated image characteristics, and/or generated image attributes; or
move the non-aligned generated image objects, generated image features, generated image properties, generated image characteristics, and/or generated image attributes away from the aligned generated image objects, generated image features, generated image properties, generated image characteristics, and/or generated image attributes.

8. The apparatus of claim 1, wherein, if there is more than one selected image object, image feature, property, characteristic, and/or attribute, then the processing unit is further configured to:
in response to the first level discrimination motion sensed via the motion sensing device or array:
move and/or rearrange the generated image objects, generated image features, generated image properties, generated image characteristics, and/or generated image attributes aligned or substantially aligned with direction of the first level discrimination motion properties; and
in response to a second level discrimination motion sensed via the motion sensing device or array:
select a particular generated image object, generated image feature, generated image property, generated image characteristic, or generated image attribute from the aligned generated image objects, generated image features, generated image properties, generated image characteristics, and/or generated image attributes based on the second level discrimination motion, wherein the second level discrimination motion (a) contacts the particular generated image object, generated image feature, generated image property, generated image characteristic, or generated image attribute, (b) contacts an active zone surrounding the particular generated image object, generated image feature, generated image property, generated image characteristic, or generated image attribute, or (c) the particular generated image object, generated image feature, generated image property, generated image characteristic, or generated image attribute is predicted to a threshold certainty greater than 50%.

9. The apparatus of claim 8, wherein the processing unit is further configured to:
animate the particular generated image object, generated image feature, generated image property, generated image characteristic, or generated image attribute; and/or
manipulate the particular generated image object, generated image feature, generated image property, generated image characteristic, or generated image attribute.

10. The apparatus of claim 8, wherein:
the move comprises moving toward or away from a direction to the first level discrimination motion,
the rearrange comprises spreading out,
the move and/or rearrange improves a capability to select the particular generated image object, generated image feature, generated image property, generated image characteristic, or generated image attribute, and a speed of the first level discrimination motion controls a rate of moving and/or rearranging.

11. The apparatus of claim 8, wherein the processing unit is further configured to:

highlight the aligned generated image objects, generated image features, generated image properties, generated image characteristics, and/or generated image attributes, and fade non-aligned generated image objects, generated image features, generated image properties, generated image characteristics, and/or generated image attributes; or move the non-aligned generated image objects, generated image features, generated image properties, generated image characteristics, and/or generated image attributes away from the aligned generated image objects, generated image features, generated image properties, generated image characteristics, and/or generated image attributes.

12. The apparatus of claim 1, wherein the processing unit is further configured to:

in response to a confirming output from an input device before or after selection, confirm the selection of the selected image objects, image features, image properties, image characteristics, and/or image attributes, wherein the input device is the motion sensing device or array or a different input device, and wherein the motion sensing device and the different input device comprise independently an eye tracking sensor, gloves, a body sensor, a camera, an optical sensor, a motion sensor, or a combination thereof.

13. An apparatus comprising:

a processing unit coupled with or to a display device, a camera, and a motion sensing device or array;

the processing unit is configured to:

receive an image output from the camera and generate a display image corresponding to the image output;

identify (a) image objects and image object features, characteristics, properties, and/or attributes, and (b) image features, characteristics, properties, and/or attributes in the display image;

generate a 3D construct corresponding to the display image, wherein the 3D construct includes: (a) generated image features, characteristics, properties, and/or attributes, and (b) generated objects and generated object features, characteristics, properties, and/or attributes corresponding to the image objects, the image object features, characteristics, properties, and/or attributes, the image features, characteristics, properties, and/or attributes, wherein the 3D construct comprises a VR construct, an AR construct, a MR construct, or a XR construct;

display the display image with the 3D construct overlaid on the display image, wherein the generated image objects are located in locations in the 3D construct corresponding to locations in the display image and wherein one or more of the generated image objects are repositioned within the 3D construct to improve generated image object selectability;

sense a first motion via the motion sensing device or array;

determine a display location comprising (a) an initial location of the first motion on a touch sensitive device, or (b) an initial location of the first motion sensed by a non-touch sensitive motion sensing device;

generate and display on the display device a selection pointer emanating from the display location through the 3D construct to a corresponding display image location on the display image, wherein the selection pointer includes (a) a proximal end at the display location, and (b) a distal end at the display image location, wherein the distal end includes an offset based on the display image location that varies from a minimal offset to a maximum offset depending on the display image location within the display image to reduce obstruction of the image objects, image features, image properties, image characteristics, and/or image attributes, wherein the offset is minimal at edges of the display image and maximal in a central region of the display image, and wherein the selection pointer comprises a vector, a ray, a beam, or a disturbance pattern;

determine one or more image objects, image features, image properties, image characteristics, and/or image attributes in the display image contacted by the distal end of the selection pointer or closest to the distal end of the selection pointer;

select the one or more generated image objects, generated image features, generated image properties, generated image characteristics, and/or generated image attributes in the display image;

indicate and activate generated image objects, generated image features, generated image properties, generated image characteristics, and/or generated image attributes in the 3D construct corresponding to the one or more selected image objects, image features, image properties, image characteristics, and/or image attributes; and simultaneously or sequentially animate the generated image objects, generated image features, generated image properties, generated image characteristics, and/or generated image attributes and/or manipulate the generated image objects, generated image features, generated image properties, generated image characteristics, and/or generated image attributes.

14. The apparatus of claim 13, wherein:

the selection pointer has a volume and/or a bend and/or the distal end of the selection pointer comprises an area or a volume, and the corresponding generated image objects, generated image features, generated image properties, generated image characteristics, and/or generated image attributes are: (a) contacted by the area or the volume, (b) within the area or the volume, or (c) closest to the area or the volume, and the area or the volume is defined by a contact pressure, a contact pressure distribution, a contact area, a distance, a displacement, a time, a velocity, and/or acceleration associated with the first motion on the touch sensitive input device, wherein the greater the contact pressure, the pressure distribution, the contact area, the distance, the displacement, the time, the velocity, or the acceleration, the larger the area or the volume, or the area or the volume is defined by a distance, a displacement, a time, a velocity, and/or an acceleration of the first motion of the non-touch sensitive motion sensing device, wherein the greater the distance, the displacement, the time, the velocity, or the acceleration, the larger the area or the volume.

15. The apparatus of claim 13, wherein, if there is more than one selected image object, image feature, property, characteristic, and/or attribute, then the processing unit is further configured to:
  in response to a first level discrimination motion sensed via the motion sensing device or array:
    select a particular generated image object, generated image feature, generated image property, generated image characteristic, or generated image attribute, wherein the first level discrimination motion (a) contacts the particular generated image object, generated image feature, generated image property, generated image characteristic, or generated image attribute, (b) contacts an active zone surrounding the particular generated image object, generated image feature, generated image property, generated image characteristic, or generated image attribute, or (c) the particular generated image object, generated image feature, generated image property, generated image characteristic, or generated image attribute is predicted to a threshold certainty greater than 50%.

16. The apparatus of claim 15, wherein the processing unit is further configured to:
  animate the particular generated image object, generated image feature, generated image property, generated image characteristic, or generated image attribute; and/or
  manipulate the particular generated image object, generated image feature, generated image property, generated image characteristic, or generated image attribute.

17. The apparatus of claim 15, wherein:
  the move comprises moving toward or away from a direction to the first level discrimination motion,
  the rearrange comprises spreading out,
  the move and/or rearrange improves a capability to select the particular generated image object, generated image feature, generated image property, generated image characteristic, or generated image attribute, and
  a speed of the first level discrimination motion controls a rate of moving and/or rearranging.

18. The apparatus of claim 15, wherein the processing unit is further configured to:
  highlight the aligned generated image objects, generated image features, generated image properties, generated image characteristics, and/or generated image attributes, and
  fade non-aligned generated image objects, generated image features, generated image properties, generated image characteristics, and/or generated image attributes; or
  move the non-aligned generated image objects, generated image features, generated image properties, generated image characteristics, and/or generated image attributes away from the aligned generated image objects, generated image features, generated image properties, generated image characteristics, and/or generated image attributes.

19. The apparatus of claim 13, wherein, if there is more than one selected image object, image feature, property, characteristic, and/or attribute, then the processing unit is further configured to:
  in response to the first level discrimination motion sensed via the motion sensing device or array:
    move and/or rearrange the generated image objects, generated image features, generated image properties, generated image characteristics, and/or generated image attributes aligned or substantially aligned with direction of the first level discrimination motion properties; and
  in response to a second level discrimination motion sensed via the motion sensing device or array:
    select a particular generated image object, generated image feature, generated image property, generated image characteristic, or generated image attribute from the aligned generated image objects, generated image features, generated image properties, generated image characteristics, and/or generated image attributes based on the second level discrimination motion, wherein the second level discrimination motion (a) contacts the particular generated image object, generated image feature, generated image property, generated image characteristic, or generated image attribute, (b) contacts an active zone surrounding the particular generated image object, generated image feature, generated image property, generated image characteristic, or generated image attribute, or (c) the particular generated image object, generated image feature, generated image property, generated image characteristic, or generated image attribute is predicted to a threshold certainty greater than 50%.

20. The apparatus of claim 19, wherein the processing unit is further configured to:
  animate the particular generated image object, generated image feature, generated image property, generated image characteristic, or generated image attribute; and/or
  manipulate the particular generated image object, generated image feature, generated image property, generated image characteristic, or generated image attribute.

21. The apparatus of claim 19, wherein:
  the move comprises moving toward or away from a direction to the first level discrimination motion,
  the rearrange comprises spreading out,
  the move and/or rearrange improves a capability to select the particular generated image object, generated image feature, generated image property, generated image characteristic, or generated image attribute, and
  a speed of the first level discrimination motion controls a rate of moving and/or rearranging.

22. The apparatus of claim 19, wherein the processing unit is further configured to:
  highlight the aligned generated image objects, generated image features, generated image properties, generated image characteristics, and/or generated image attributes, and
  fade non-aligned generated image objects, generated image features, generated image properties, generated image characteristics, and/or generated image attributes; or
  move the non-aligned generated image objects, generated image features, generated image properties, generated image characteristics, and/or generated image attributes away from the aligned generated image objects, generated image features, generated image properties, generated image characteristics, and/or generated image attributes.

23. The apparatus of claim 13, wherein the processing unit is further configured to:
  in response to a confirming output from an input device before or after selection, confirm the selection of the selected image objects, image features, image properties, image characteristics, and/or image attributes, wherein the input device is the motion sensing device or array or a different input device, and wherein the motion sensing device and the different input device comprise independently an eye tracking sensor, gloves, a body sensor, a camera, an optical sensor, a motion sensor, or a combination thereof.

\* \* \* \* \*